(12) United States Patent  
Morgan-Mar et al.

(10) Patent No.: US 9,117,277 B2  
(45) Date of Patent: Aug. 25, 2015

(54) DETERMINING A DEPTH MAP FROM IMAGES OF A SCENE

(71) Applicant: CANON KABUSHIKI KAISHA, Tokyo (JP)

(72) Inventors: David Peter Morgan-Mar, Wollstonecraft (AU); Kieran Gerard Larkin, Putney (AU); Matthew Raphael Arnison, Umina Beach (AU); Peter Alleine Fletcher, Rozelle (AU); Tuan Quang Pham, Epping (AU)

(73) Assignee: Canon Kabushiki Kaisha, Tokyo (JP)

( * ) Notice: Subject to any disclaimer, the term of this patent is extended or adjusted under 35 U.S.C. 154(b) by 217 days.

(21) Appl. No.: 13/855,285

(22) Filed: Apr. 2, 2013

(65) Prior Publication Data

US 2013/0266210 A1    Oct. 10, 2013

(30) Foreign Application Priority Data

Apr. 4, 2012  (AU) ................................. 2012201969  
Nov. 2, 2012  (AU) ................................. 2012244373

(51) Int. Cl.
*G06K 9/00* (2006.01)
*G06T 7/00* (2006.01)

(52) U.S. Cl.
CPC .............. *G06T 7/0051* (2013.01); *G06T 7/0069* (2013.01); *G06T 2207/10016* (2013.01); *G06T 2207/10148* (2013.01)

(58) Field of Classification Search
None
See application file for complete search history.

(56) References Cited

U.S. PATENT DOCUMENTS

| | | | |
|---|---|---|---|
| 5,109,425 A * | 4/1992 | Lawton | 382/107 |
| 5,193,124 A | 3/1993 | Subbarao | |
| 5,231,443 A | 7/1993 | Subbarao | |
| 5,576,975 A | 11/1996 | Sasaki et al. | |
| 2003/0123713 A1 * | 7/2003 | Geng | 382/118 |
| 2008/0036576 A1 * | 2/2008 | Stein et al. | 340/425.5 |
| 2008/0212838 A1 * | 9/2008 | Frigerio | 382/107 |
| 2009/0279790 A1 * | 11/2009 | Burge et al. | 382/209 |
| 2013/0063566 A1 | 3/2013 | Morgan-Mar et al. | |

FOREIGN PATENT DOCUMENTS

JP         2001-208524 A        8/2001

OTHER PUBLICATIONS

Subbarao;"Depth from defocus and rapid autofocusing: a practical approach";1992 IEEE Computer Society Conference on Computer Vision and Pattern Recognition (CVPR 1992), Champaign, IL, Jun. 1992; IEEE Computer Sciety: Champaign, Jun. 1992; p. 773-776.

(Continued)

*Primary Examiner* — Vikkram Bali
(74) *Attorney, Agent, or Firm* — Canon U.S.A., Inc. IP Division

(57) ABSTRACT

Methods for determining a depth measurement of a scene which involve capturing at least two images of the scene with different camera parameters, and selecting corresponding image patches in each scene. A first approach calculates a plurality of complex responses for each image patch using a plurality of different quadrature filters, each complex response having a magnitude and a phase, assigns, for each quadrature filter, a weighting to the complex responses in the corresponding image patches, the weighting being determined by a relationship of the phases of the complex responses, and determines the depth measurement of the scene from a combination of the weighted complex responses.

27 Claims, 27 Drawing Sheets

(56) References Cited

OTHER PUBLICATIONS

Pentland; "Simple Real-Time Range Camera"; IEEE Computer Society Conference, San Diego, CA, USA, Jun. 1989; IEEE Computer Society; p. 256-261.

Hoge; "A subspace identification extension to the phase correlation method"; IEEE Transactions on Medical Imaging Feb. 2003, 22, pp. 277-280.

Pentland, "A New Sense for Depth of Field"; IEEE Transactions on Pattern Analysis and Machine Intelligence, vol. PAMI-9, No. 4, Jul. 1987, pp. 523-531.

McCloskey, et. al.; "The Reverse Projection Correlation Principle for Depth from Defocus"; IEEE Computer Society in the Proceedings of the Third International Symposium on 3D Data Processing, Visualization, and Transmission, Jun. 2006, pp. 607-614.

Aydin; "An occlusion insensitive adaptive focus measurement method"; Optics Express, vol. 18, Jun. 2010, pp. 14212-14224.

Xiong; "Variable window Gabor filters and their use in focus and correspondence"; IEEE Computer Society in the Proceedings of the International Conference on Computer Vision and Pattern Recognition, Jun. 1994, pp. 668-671.

Gokstorp; "Computing depth from out-of-focus blur using a local frequency representation"; IEEE in the Proceedings of the 12th International Conference on Pattern Recognition, Oct. 1994, pp. 153-158.

Stone; "Fast Direct Fourier-based Algorithm for Subpixel Registration of Images"; IEEE Proceedings of Trans Geoscience and Remote Sensing, vol. 39, Issue 10, Oct. 2001, pp. 2235-2243.

\* cited by examiner

DETERMINING A DEPTH MAP FROM IMAGES OF A SCENE

REFERENCE TO RELATED PATENT APPLICATION(S)

This application claims the benefit under 35 U.S.C. §119 of the filing date of Australian Patent Application No 2012201969, filed 4 Apr. 2012, and of the filing date of Australian Patent Application No 2012244373, filed 2 Nov. 2012, hereby incorporated by reference in their entirety as if fully set forth herein.

TECHNICAL FIELD

The current invention relates to digital image processing and, in particular, to determining the distance to objects in a scene from images of the scene.

BACKGROUND

In many applications of image capture, it can be advantageous to determine the distance from the image capture device to objects within the field of view of the image capture device. A collection of such distances to objects in an imaged scene is sometimes referred to as a depth map. A depth map of an imaged scene may be represented as an image, which may be of a different pixel resolution to the image of the scene itself, in which the distance to objects corresponding to each pixel of the depth map is represented by a greyscale or colour value.

A depth map can be useful in the field of consumer photography, as it enables several desirable post-capture image processing capabilities for photographs. For example, a depth map can be used to segment foreground and background objects to allow manual post-processing, or the automated application of creative photographic effects. A depth map can also be used to apply depth-related photographic effects such as simulating the aesthetically pleasing graduated blur of a high-quality lens using a smaller and less expensive lens.

Several features are desirable in any method of acquiring a depth map of a photographic scene. Depth accuracy is important, otherwise the resulting depth map may suggest that objects are at distances significantly different to their true distances. Depth resolution is important to allow the separation of objects that may be spatially close to one another in the scene and also to allow for accurate post-processing operations such as depth-dependent blurring. Spatial resolution of the depth map is also important in many applications, in particular, depth maps approaching the resolution of the photographic images themselves are useful for pixel-wise segmentation and avoiding visually obvious object boundary errors in many post-processing operations. Depth mapping methods should ideally be independent of the physical properties of the objects in the scene, such as reflectance, colour, texture, and orientation. This property is often referred to as scene independence. It is also desirable that depth mapping methods be tolerant of motion of objects in the scene and of motion of the image capture device. It is also desirable that depth mapping methods can be realised in practical devices such as consumer cameras with minimal additional cost, bulk, weight, image capture and processing time, and power consumption.

Several methods are known for determining a depth map from images of a scene. These can be classified into active and passive methods. Active depth mapping methods involve projecting beams or patterns of light or other radiation on to a scene. Distances can be measured either by timing the return of reflected rays, or by analysing the geometrical distortions of the patterns as they reflect off three-dimensional structures in the scene. Active methods require projection optics, which creates significant cost, weight, and power problems for applications such as consumer photography. In addition, active methods have limited range. For these reasons, passive depth mapping methods are more suitable than active methods for photography applications.

A known class of passive depth mapping methods involves capturing images of the scene from different viewpoints. The images of the scene can then be analysed to determine the apparent shifts in position of objects in the images of the scene caused by the stereoscopic effect. In general, stereoscopic methods suffer from the disadvantage of requiring multiple viewpoints. This necessitates either capturing images sequentially and moving the camera between shots, or capturing images using either multiple cameras or a camera with multiple lenses. In the case of capturing images sequentially, the time taken to move the camera may be problematic, especially for moving subjects, and precise alignment or calibration of the camera motion is needed. In the case of simultaneous capture, the requirement of multiple cameras or lenses increases the expense and difficulty of construction of the capture device.

Another class of passive depth mapping methods uses multiple shots taken by a single camera from a single viewpoint. These methods can be further split into two classes, named depth from focus (DFF), and depth from defocus (DFD). DFF methods use multiple shots taken of the scene at a large range of different focus positions. Analysis of image patches from each shot can then determine which shot corresponds to the best focus position for the object shown in a given image patch, which can in turn be associated with a calibrated depth. The main disadvantage of DFF methods is the requirement of taking a large number of images, resulting in long capture times, significant alignment problems for moving scenes, and long processing times.

DFD techniques attempt to measure the depths to objects in a scene by capturing a small number of images using different camera or capture parameters such as focus or aperture, and then comparing the images to analyse the difference in the amount of blurring of scene objects. Existing techniques then attempt to relate some measure of this blur difference to the depth of the imaged object by various theoretical calculations or empirical calibrations. DFD methods can estimate depths from as few as two images.

In addition to the desirable features for all depth mapping methods already mentioned—namely depth accuracy, depth resolution, spatial resolution, scene independence, motion tolerance, and low cost, weight, bulk, processing time, and power consumption—DFD methods in particular have further desirable feature requirements. DFD methods rely on quantification of blur difference to establish depth. Therefore it is desirable for DFD methods to operate well when the amount of blur difference achievable is limited by practical considerations of camera design. In particular, compact cameras typically have small lenses and sensors in order to keep costs low and produce a conveniently sized product. These constraints on the imaging system result in relatively small differences in blur (compared to larger cameras) because of the large depth of field of small optical systems. For example, typical blur differences achievable between two shots taken with a compact camera are of the order of a pixel or less. Another desirable feature of DFD methods is that they are based on a realistic model of the camera optical system. This allows a clear theoretical connection to be made between the measure of blur difference and the parameters of the image capture optical system. This further allows a thorough understanding of the connection between the blur difference measure and object depth so that appropriate consideration may be given to different imaging scenarios or difficult imaging conditions.

An example DFD method is given by Pentland in a paper titled "A New Sense for Depth of Field", published in July 1987 in *IEEE Transactions on Pattern Analysis and Machine Intelligence*, Vol. PAMI-9, No. 4, pp. 523-531, hereafter "Pentland". This method attempts to quantify the difference in amount of blur between two images taken with different apertures by estimating a blur radius for each image based on the assumption of a symmetrical Gaussian point spread function (PSF). This assumption assumes the lens optical transfer function (OTF) is a real Gaussian function, which is unrealistic for typical camera lenses, and consequently this assumption causes errors in the depth estimate. In addition, the Pentland method of calculating the blur radius is very sensitive to variations in scene texture and imaging noise. This sensitivity makes the method unsuitable for use with cameras taking photos of natural scenes.

Another example DFD method is given in U.S. Pat. No. 5,231,443 (Subbarao), granted in 1993. This method attempts to quantify the difference in amount of blur between two images taken with different camera parameters by summing rows or columns within an image region, performing a one-dimensional (1D) Fourier transform and then examining a small subset of the Fourier components. By the projection-slice theorem, this method is equivalent to examining a 1D slice through the two-dimensional (2D) Fourier transform of the image region. In photographs of a natural scene, there are usually a wide variety of textures. Two-dimensional Fourier transforms of these textures will have a variety of dominant orientations. Typical textures will have low energy along the spatial frequency axes, which means that the method of Subbarao will be sensitive to imaging noise and produce large errors in the depth estimate. This variation of errors with orientation of scene texture is highly undesirable for a depth mapping method.

An example DFD method using a different theoretical principle is given by McCloskey, et. al. in a paper titled "The Reverse Projection Correlation Principle for Depth from Defocus", published by the IEEE Computer Society in June 2006 in the *Proceedings of the Third International Symposium on 3D Data Processing, Visualization, and Transmission*, pp. 607-614. This method attempts to quantify the blur difference between two images by independently estimating the amount of blur in each image using a measure based on pixel auto-correlations, and then comparing this measure between the images. In this method there is no clear theoretical connection between the correlation measures and the physical optics principles that produce the blurring. It is therefore difficult to establish the accuracy of the method under a wide range of imaging conditions. Sample depth results from this method are noisy.

Another example DFD method is given by Aydin & Akgul in a paper titled "An occlusion insensitive adaptive focus measurement method", published in June 2010 in *Optics Express*, Vol. 18, pp. 14212-14224. This method attempts to quantify the blur difference between two images by calculating a cross-correlation between corresponding patches of the images. This produces a measure of similarity between the image patches, which is then related to object depth. A problem here is that an object with low contrast can appear more similar at high blur differences than an object with high contrast at a lower blur level, resulting in spurious depth assignments.

An example of spatial-domain DFD method using Gabor filters is given by Xiong and Shafer in a paper titled "Variable window Gabor filters and their use in focus and correspondence", published by the IEEE Computer Society in June 1994 in the *Proceedings of the International Conference on Computer Vision and Pattern Recognition*, pp. 668-671. Gabor filters are known to produce a response of the input image at and around a corresponding tuning frequency. Xiong and Shafer used a set of 120 Gabor filters over 12 orientations and 10 radial frequencies that covered most of the image spectrum. The difference in the amount of blur between two input images was then estimated from the difference in the logarithm of the amplitudes of the corresponding Gabor filter responses. Because the large number of Gabor filters used by Xiong and Shafer was implemented using non-separable 2D filters, the Xiong and Shafer method requires a lot of computation.

Another example of a spatial-domain DFD method using Gabor filters is given by Gokstorp in a paper titled "Computing depth from out-of-focus blur using a local frequency representation", published by the IEEE in October 1994 in the *Proceedings of the 12$^{th}$ International Conference on Pattern Recognition*, pp. 153-158. Gokstorp used a set of Gabor filters along 0- and 90-degree orientations. Although these axis-aligned Gabor filters can be implemented very efficiently due to their separability, they respond mainly to vertical and horizontal structures. This limits the usefulness of Gokstorp's method in natural images where the scene content can appear in any orientation. Both Xiong and Gokstorp used local phase stability to weigh the confidence of the Gabor responses. Local phase is unstable around texture boundaries. Unfortunately, these boundaries often coincide with edges where the blur difference across the two input images is most discernible. By weighing down the filter response around edges, both Xiong's and Gokstorp's methods discount the majority of useful information for DFD.

These examples are illustrative of the shortcomings of existing DFD approaches. A disadvantage of DFD methods in general is the fact that depth estimates are prone to error because of the relatively small amount of data used, the effects of scene texture variations and imaging noise, any misalignment between objects in the images caused by camera or subject motion, and the fact that the relationship between object distance and blur is complicated. For many DFD algorithms there is a poor link between the quantitative measure extracted from analysing the images and the actual depth in the scene, because of camera calibration methods which use inaccurate models of camera lenses, weak or absent theoretical connections between the depth estimate and physical optics theory, and high depth estimation sensitivities to one or more of imaging noise, image misalignment, exposure difference, and the variation of textures of objects in the scene.

DFD methods are particularly problematic when applied to images taken with compact cameras. The small lens and sensor size restricts the amount of blur difference that can be achieved between two shots of a scene and a small sensor is more prone to imaging noise than a larger sensor. These make it difficult to quantify the blur difference accurately.

SUMMARY

According to one aspect of the present disclosure, there is provided a method of determining a depth measurement of a scene. The method captures at least two images of the scene with different camera parameters and selects corresponding image patches in each scene. A plurality of complex responses are calculated for each image patch using a plurality of different quadrature filters, each complex response having a magnitude and a phase. The method assigns, for each quadrature filter, a weighting to the complex responses in the corresponding image patches, the weighting being determined by a relationship of the phases of the complex responses, and then determines the depth measurement of the scene from a combination of the weighted complex responses.

Desirably the different quadrature filters are configured to operate in the spatial domain and at least one of radial frequency, orientation and bandwidth vary across the plurality of quadrature filters. Preferably the quadrature filters are Gabor filters, and particularly the orientations of the Gabor filters are one of 0°, 45°, 90°, 135°. The Gabor filters may be implemented separably using one-dimensional filters. Typically the quadrature filters are one of log-Gabor filters, Gaussian derivative filters, difference-of-Gaussian filters, or Cauchy filters. In some implementations the quadrature filters are the filters used in a complex wavelet transform such as the dual-tree complex wavelet transform. Preferably the weightings assigned to the pixel values are either 0 or 1. Most preferably the weighting for each pixel is assigned to be 1 if the absolute value of the phase of the pixel value is less than a threshold, and 0 otherwise. Alternatively, the weighting for each pixel is assigned to be the value of a function of the phase of the pixel value. Typically the depth measurement is determined from the weighted pixel values by performing a weighted fit to a functional form with a free parameter, and the depth measurement is determined by the fitted value of the free parameter. In one implementation the functional form approximates the weighted pixel values of the combined function. In another implementation the functional form is a paraboloid, or a Gaussian, or a Bessel function. In another the phase of each spectral ratio is multiplied by 2 and wrapped, with this multiplied and wrapped phase then being used to determine the weightings. In a further implementation, a confidence measure of the depth measurement is also calculated from the weighted pixel values of the combined function.

According to another aspect of the present disclosure there is provided a method of determining a shift estimation between two images. This method selects corresponding image patches in each image and calculates an output set of pixel values from a combined complex response of the image patches to a set of quadrature filters, each pixel value in the output set of pixel values having a magnitude and a phase. The method assigns a weighting to each of the pixel values in the output set of pixel values, the weighting being determined by the phase of at least some of the output set of pixel values and at least some of the pixel values being assigned a weighting different to the weighting assigned to other pixel values, and determines the shift estimation between the two images from the weighted pixel values of the combined function. Typically the shift estimate is calculated by forming a weighted phase correlation. More particularly the shift estimate is calculated by fitting a planar ramp to the phase of the pixels of the spectral ratio.

According to another aspect of the present disclosure there is provided a method of determining a depth measurement of a scene comprising capturing at least two images of the scene with different camera parameters and selecting corresponding image patches in each scene. The method then calculates an output set of pixel values from a combined complex-valued function of Fourier transforms of the image patches, with each pixel value in the output set of pixel values having a magnitude and a phase. A weighting is assigned to each of the pixel values in the output set of pixel values, with the weighting being determined by the phase of at least some of the output set of pixel values and at least some of the pixel values being assigned a weighting different to the weighting assigned to other pixel values. The method then determines the depth measurement of the scene from the weighted pixel values of the combined function.

Desirably the weightings assigned to the pixel values are either 0 or 1. Preferably the weighting for each pixel is assigned to be 1 if the absolute value of the phase of the pixel value is less than a predetermined threshold, and 0 otherwise. Each pixel may defined to have a set of neighbouring pixels and the weighting for each pixel is assigned to be 1 if the absolute value of the difference between the phase of the pixel value and the phase of each neighbouring pixel value is less than a predetermined threshold, and 0 otherwise. Desirably the curvature of the phase at each pixel is estimated from the phase of the pixel value and the phases of neighbouring pixel values, and the weighting for each pixel is assigned to be 1 if the absolute value of the curvature is less than a predetermined threshold, and 0 otherwise.

Preferably, the weighting for each pixel is assigned to be the value of a function of the phase of the pixel value.

In one implementation each pixel is defined to have a set of neighbouring pixels and the weighting for each pixel is assigned to be the value of a function of the phase of the pixel values and of the phases of the neighbouring pixel values.

Desirably the depth measurement is determined from the weighted pixel values by performing a weighted fit to a functional form with a free parameter, and the depth measurement is determined by the fitted value of the free parameter.

Preferably the functional form is one of a paraboloid, a Gaussian or a Bessel function.

Preferably the phase of each pixel value is multiplied by 2 and wrapped, with this multiplied and wrapped phase then being used to determine the weightings.

Desirably a confidence measure of the depth measurement is also calculated from the weighted pixel values of the combined function.

According to another aspect of the present disclosure, there is provided a method of determining a shift estimation between two images. This method selects corresponding image patches in each image and calculates an output set of pixel values from a combined complex-valued function of Fourier transforms of the image patches, each pixel value in the output set of pixel values having a magnitude and a phase. The method assigns a weighting to each of the pixel values in the output set of pixel values, with the weighting being determined by the phase of at least some of the output set of pixel values and at least some of the pixel values being assigned a weighting different to the weighting assigned to other pixel values, and determines the shift estimation between the two images from the weighted pixel values of the combined function.

Preferably the shift estimate is calculated by forming a weighted phase correlation.

Alternatively the shift estimate is calculated by fitting a planar ramp to the phase of the pixels of the spectral ratio.

The methods are desirably computer-implemented, typically within computerised apparatus, such as a camera or computer. Other aspects, including a computer readable storage medium having a program recorded thereon, the program being executable by computerized apparatus to perform the methods, are also disclosed.

BRIEF DESCRIPTION OF THE DRAWINGS

At least one embodiment of the present invention will now be described with reference to the following drawings, in which.

DETAILED DESCRIPTION INCLUDING BEST MODE

1. Introduction

The present disclosure is directed to providing methods of extracting a depth map from two images of a scene taken using a single camera with different camera capture parameters and substantially located at the same position. The methods seek to offer one or more of improved accuracy, greater tolerance to image misalignment, better tolerance to image exposure, improved tolerance to imaging noise, better tolerance to differences of object texture in the image, and faster calculation speed.

2. Context

2.1 Thin Lens Equation, Basic Geometry

The technical details of depth estimation rely on key aspects of the geometry and optics of imaging devices. Most scenes that are captured using an imaging device, such as a camera, contain multiple objects, which are located at various distances from the lens of the device. Commonly, the imaging device is focused on an object of interest in the scene. The object of interest shall be referred to as the subject of the scene.

Figure 1:
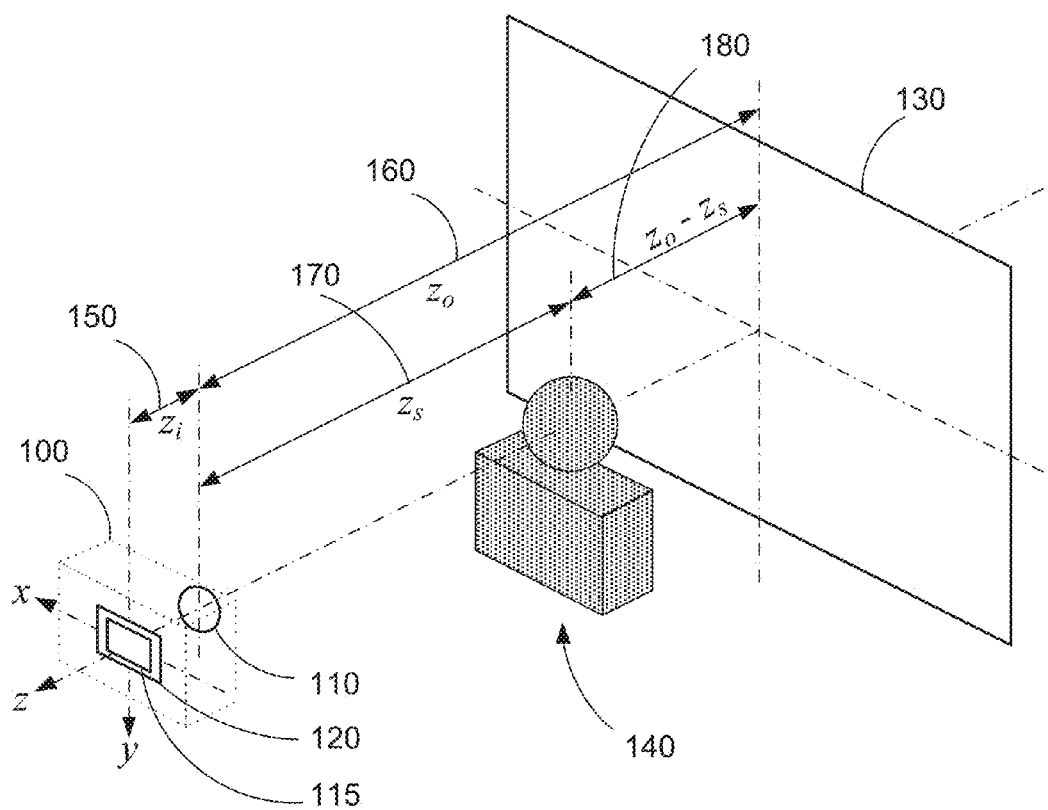
FIG. 1 is a schematic diagram of a scene and an image capture device positioned to capture an image of the scene.

FIG. 1 is a schematic diagram showing the geometrical relationships between key parts of an imaging device and objects in a scene to be captured. FIG. 1 shows an imaging device (e.g. a camera) 100 which includes a lens 110, and a sensor 115. FIG. 1 also shows an in-focus plane 130 and a general object 140 formed by sphere positioned upon a rectangular prism, forming part of the scene but not necessarily the subject of the scene to be captured. The image plane 120 of the imaging device 100, also referred to as the focal plane, is defined to be at the location of the sensor 115. When projected through the lens 110, the image plane 120 forms the in-focus plane 130, which can be considered to be a virtual plane in the geometrical region of the object 140. A distance 150 from the lens 110 to the image plane 120 is related to a distance 160 from the lens 110 to the in-focus plane 130, by the thin lens law according to the equation $$\frac{1}{z_i} + \frac{1}{z_o} = \frac{1}{f} \qquad (1)$$

where f is the focal length of the lens 110, $z_i$ is the lens-to-sensor distance 150, and $z_o$ is the distance 160 from the lens 110 to the in-focus plane 130. The general scene object 140 is located at a distance 170 from the lens 110 and at a distance 180 from the in-focus plane 130. This distance 170 is referred to as $z_s$. The distance 180 from the object 140 to the in-focus plane 130 is given by $z_s-z_o$ and may be positive, zero, or negative. If the object 140 is focused onto the image plane 120, then $z_s=z_o$ and the object 140 is located in the in-focus plane 130. If $z_s$ is less than or greater than $z_o$, then the object 140 is located behind or in front of the in-focus plane 130 respectively, and the image of the object 140 will appear blurred on the image plane 120.

FIG. 1 illustrates a relatively simple geometrical optics model of imaging. This model relies on approximations including the thin lens approximation, paraxial imaging rays, and a lens free of aberrations. These approximations ignore some aspects of the optics that are inherent in actual imaging systems, but are sufficient for general understanding of imaging behaviour, as is understood by those skilled in the art.

Focusing is carried out either manually by the user or by using an autofocus mechanism that is built into the imaging device 100. Focusing typically manipulates the lens-to-sensor distance 150 in order to place the in-focus plane 130 such that the distance $z_o$ 160 is equal to the distance $z_s$ 170 to a specific object of interest, i.e. to place the subject in the in-focus plane 130. Other objects in the scene that have a distance $z_s$ from the lens 110 that is different from that of the subject are located either behind or in front of the in-focus plane 130. These other objects will appear blurred to some degree on the image plane 120 and thus in the image captured on the sensor 115. This blur is referred to as defocus blur.

2.2 Defocus Blur—Single Image

The amount of defocus blurring of an imaged object 140 increases with the distance 180 of the object 140 from the in-focus plane 130. The amount of defocus blur present in a given patch or portion of a captured 2D image can be characterised by the point spread function (PSF). The PSF is the response of the imaging system to a point source, defined such that the integral of the PSF over the image plane is equal to unity. The PSF of an optical system is generally a spatially restricted two-dimensional function of spatial coordinates (x, y) that approaches zero beyond a certain radial distance from the origin. The amount of blur can be characterised by measures of the shape of the PSF. Typical measures of the amount of blur are the full-width-at-half-maximum (FWHM) of the PSF, or the standard deviation of the PSF.

A basic understanding of the principles behind DFD may be gained by assuming a mathematically simple model for the PSF of a camera lens 110. To achieve this simplicity, prior art analyses often model the PSF as a two-dimensional Gaussian function. This assumption is followed in the present description for explanatory purposes only, noting that the PSFs of physical optical systems are typically not well approximated by Gaussian functions. Under this assumption, the standard deviation σ of the Gaussian can be regarded as a blur radius, providing a convenient quantitative measure of the concept of "amount of blur". It can be shown that the relationship of the Gaussian blur radius σ, object distance $z_s$, and the camera image capture parameters of focal length f and lens aperture $A_V$ is given by $$z_s = \frac{fz_i}{z_i - f - 2\sigma A_V} \quad (2)$$

where $A_V$ is the relative aperture (also known as the f-number) of the lens 110. If the blur radius σ of a point located at pixel coordinates $(x_i, y_i)$ in a captured image of a scene can be measured, the distance $z_s$ to an object at the corresponding point in the scene can be determined using equation (2), provided the remaining quantities in equation (2) are known.

However, determining depth from a single image of a scene without detailed prior knowledge of the scene to be imaged is known to be an unsolvable problem. This is because determining the blur radius σ is not possible from a single image unless details of the unblurred scene image are known. For example, an image feature resembling a blurred disc may be caused by a disc of some indeterminate smaller size that has been blurred by some unknown amount, or by an object in the scene that resembles a blurred disc, rendered in sharp focus. Given this ambiguity, it is impossible to determine the blur radius σ. Thus, in terms of equation (2), even if the parameters $z_i$, f, and $A_V$ are known, it is not possible to determine depth from a single image of an unconstrained scene.

In the majority of circumstances, scenes are imaged without detailed knowledge of the structure of the objects in the scene. It is a general requirement for many imaging applications to work with unconstrained scenes, and even under carefully controlled imaging environments, such as portrait studios, it is very difficult to estimate the required information needed to obtain a depth map from a single image. However, referring to equation (2), it is theoretically possible to extract depth information using two captured images of the same scene, provided that the value of at least one of the parameters, in addition to blur radius σ, differs between the two captured images. This is the basic principle that underpins depth from defocus (DFD) methods, which rely on calculating the relative defocus blur between two images of a scene.

2.3 Defocus Blur—Two Images—Aperture Difference

Consider two images taken by a camera of the same scene with different relative apertures $A_V$, but with all other parameters remaining constant. Further, consider a small image patch taken from the first image, and a small image patch taken from the second image such that the patches show generally the same region of the scene being imaged. As is well known, the amount of defocus blur present in a patch of an image depends on two parameters: the distance $z_s-z_o$ 180 of the object 140 shown in the patch from the in-focus plane 130, and the relative aperture $A_V$ of the lens 110.

Firstly, if the object 140 shown in the patch is in the in-focus plane 130, then the object 140 appears in focus. The defocus blur radius a increases as the absolute value of the distance 180 of the object from the in-focus plane $|z_s-z_o|$ increases. Secondly, the defocus blur radius σ increases as the relative aperture $A_V$ decreases. It can be shown that in this case the defocus blur radius σ increases monotonically with increasing absolute distance 180 of the object 140 from the in-focus plane 130, $|z_s-z_o|$. This means that if the defocus blur radius $\sigma_1$ of the patch from the first image and the defocus blur radius $\sigma_2$ of the patch from the second image can be estimated, these estimates can be used in equation (2) to determine the distance of the object 140 shown in the patches from the in-focus plane 130, with an ambiguity over whether the object 140 is in front of, or behind, the in-focus plane 130.

Furthermore, it can be shown that the absolute value of the difference in the two blur radii $|\sigma_2-\sigma_1|$ increases monotonically with increasing absolute distance 180 of the object 140 from the in-focus plane 130, $|z_s-z_o|$. This means that if the difference in the two blur radii $|\sigma_2-\sigma_1|$ can be estimated from the two images, then this estimate can be used to estimate the distance of the object 140 shown in the patches from the in-focus plane 130, with an ambiguity over whether the object 140 is in front of or behind the in-focus plane 130.

Alternatively, some other measure of the difference in the amount of blur may be estimated from the two images. This other measure may not be an attempt to estimate the difference in blur radii, but rather some other quantification of the concept of "blur difference". It may be necessary in this case to calibrate the measure of blur difference empirically to a distance measure.

2.4 Defocus Blur—Two Images—Focus Difference

Alternatively, consider two images taken by a camera of the same scene with different lens-to-sensor distance $z_i$ 150, but all other parameters remaining constant. Further consider a small image patch taken from the first image, and a small image patch taken from the second image such that the patches show generally the same region of the scene being imaged.

Figure 2:
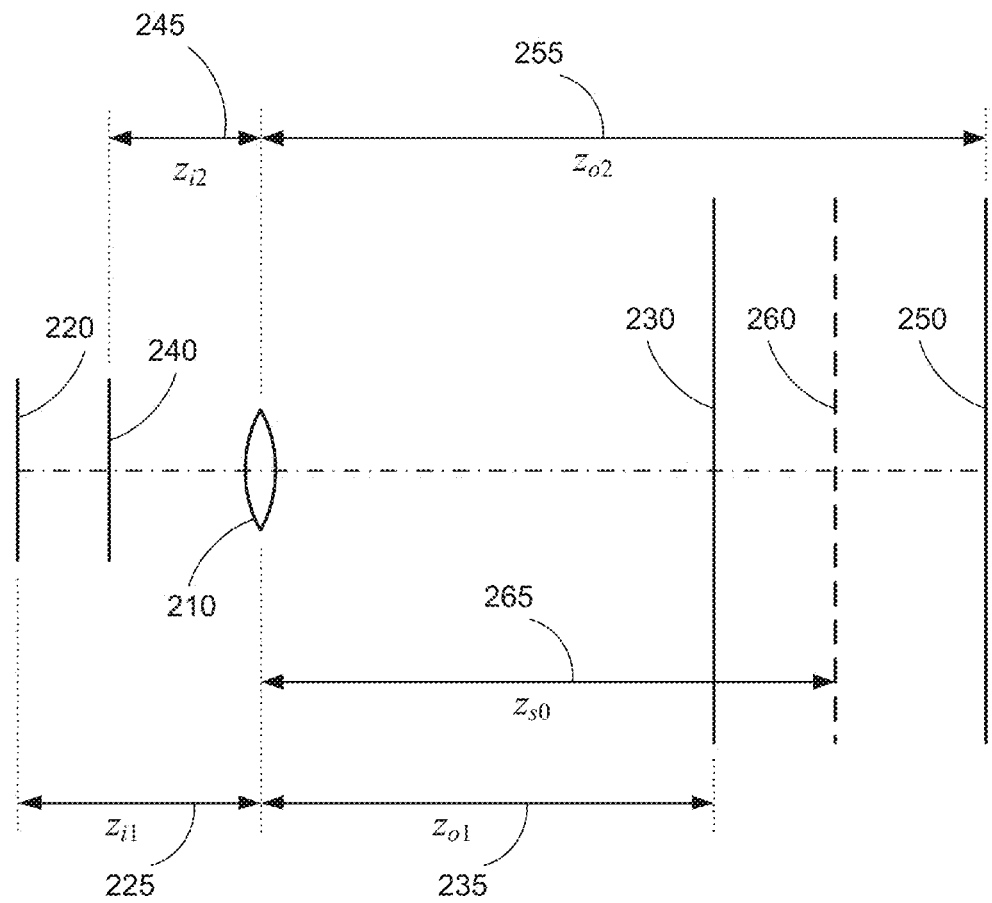
FIG. 2 is a schematic diagram illustrating the geometry of a lens forming two different images at two different focal planes.

FIG. 2 illustrates the geometry of two images taken with the lens-to-sensor distance $z_i$ 150 set to two different focus positions. FIG. 2 is drawn showing positions relative to a lens 210 via which the images are captured. A first image is captured with the sensor at a first position 220, a distance $z_{i1}$ 225 from the lens 210. The first in-focus plane 230 is at a distance $z_{o1}$ 235 from the lens 210. A second image is captured with the sensor at a second position 240, a distance $z_{i2}$ 245 from the lens 210. The second in-focus plane 250 is at a distance $z_{o2}$ 255 from the lens 210. Without loss of generality $z_{o1} < z_{o2}$ and, by equation (1), $z_{i1} > z_{i2}$.

Similar principles to the aperture difference case apply, but in this focus difference case the two images have different in-focus plane distances $z_{o1}$ 235 and $z_{o2}$ 255. A scene object will appear equally blurred in both images when its distance $z_s$ 170 from the lens falls at some specific distance $z_{s0}$ 265 somewhere in between the first in-focus plane 230 and the second in-focus plane 250, i.e. such that $z_{o1} < z_{s0} < z_{o2}$. A plane 260 parallel to the in-focus planes and at the distance $z_{s0}$ from the lens shall be referred to as the intermediate in-focus plane.

Objects farther from the lens 210 than the intermediate in-focus plane 260 will appear more blurred in the first image while objects closer to the lens 210 than the intermediate in-focus plane 260 will appear more blurred in the second image.

It can be shown in this case that (a) the difference in the two blur radii $|\sigma_2 - \sigma_1|$ increases monotonically with increasing distance between the object 140 and the intermediate in-focus plane 260, and that (b) the position of the object 140 either in front of or behind the intermediate in-focus plane 260 can be determined by determining which of the two image patches is less blurred (i.e. more focussed). This means that if the difference in the two blur radii $|\sigma_2 - \sigma_1|$ can be estimated, and it can be determined which of the two image patches is less blurred, this information can be used to estimate the distance of the object shown in the patches from the intermediate in-focus plane 260, including disambiguating whether the object is in front of or behind the intermediate in-focus plane 260.

Alternatively, some other measure of the difference in the amount of blur may be estimated from the two images. This measure may not be an attempt to estimate the difference in blur radii, but rather some other quantification of the concept of "blur difference". It may be necessary in this case to calibrate the measure of blur difference empirically to a distance measure.

2.5 Practical Considerations

In practice, images of a scene are captured with some amount of imaging noise. This affects the accuracy of any measurements made by processing the image data. The simple optical models such as Gaussian PSFs used to derive the principles of many prior art DFD methods are also not realistic. Real lenses contain aberrations other than defocus, objects are imaged with large field angles, and diffraction effects can be important. There are also considerations of the amount of visual texture in the scene objects. For example, if an area of an object is uniform in colour and reflectivity, then it is impossible to distinguish any amount of blurring within this area. Further, the combination of different visual textures with varying amounts of imaging noise produces widely varying responses for many DFD methods. Particularly problematical is when different visual textures at the same depth produce different depth signals.

For combinations of these reasons, DFD methods in practice have shown limited success at determining depth maps from realistic photographic scenes. Much of the reported success of DFD methods has been restricted to highly constrained test scenes. Furthermore, the relationship between blur radius and object distance given by equation (2) has proven to be of limited accuracy, requiring methods to be empirically calibrated to achieve useful results.

3. Overview

The arrangements presently described improve on the prior art by utilising more realistic theoretical modelling of the behaviour of lens optics in real world conditions, and by providing a more robust means of estimating depth from defocus in a scene independent manner and in the presence of imaging noise.

Figure 3:
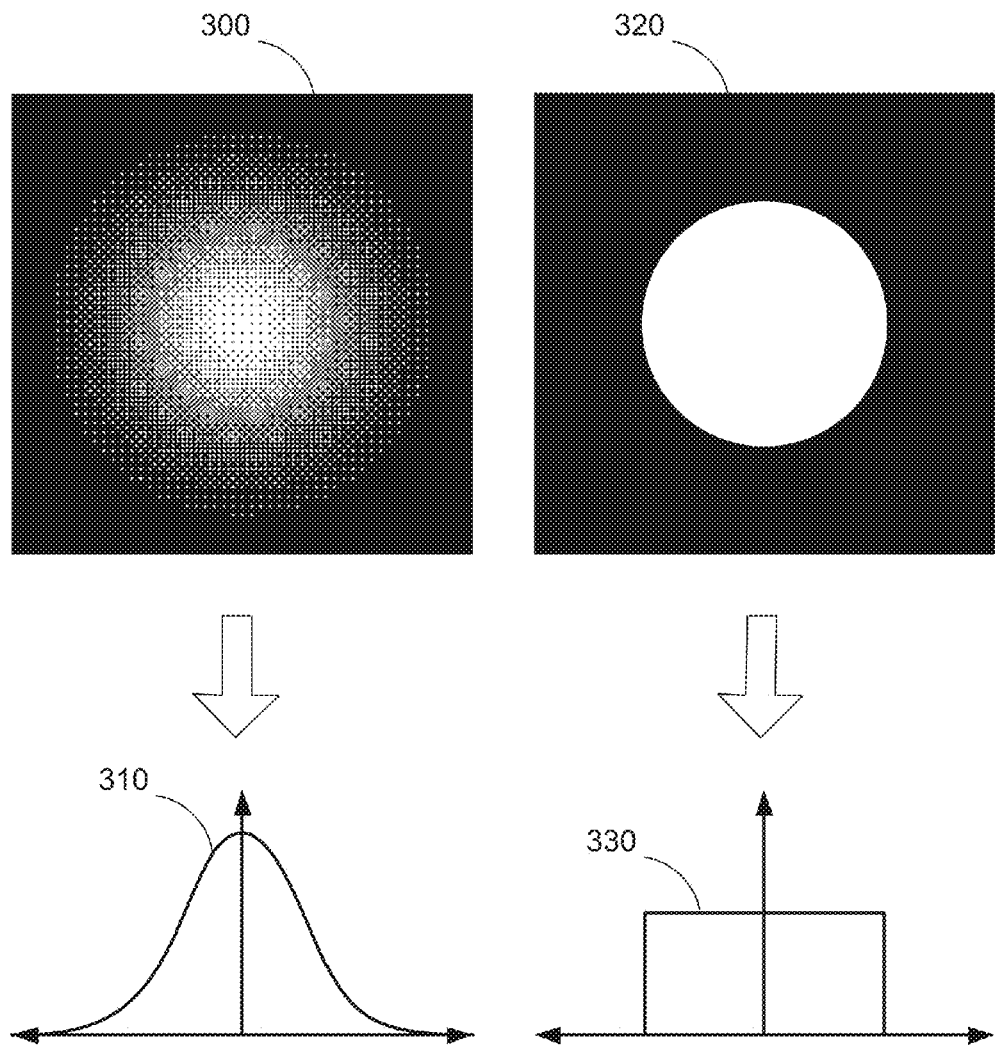
FIGS. 3A and 3B illustrate a two-dimensional Gaussian function and a two-dimensional pillbox function, and one-dimensional cross-sections thereof.

FIGS. 3A and 3B illustrates two simple two-dimensional functions that are commonly assumed as approximations to lens PSFs. FIG. 3A shows a two-dimensional Gaussian function 300, whose one-dimensional cross section is a one-dimensional Gaussian function 310. The two-dimensional Gaussian function 300 is illustrated schematically in a dithered fashion. FIG. 3B shows a circular pillbox function 320, whose one-dimensional cross section is a square function 330.

Prior art modelling of the lens behaviour in the context of DFD commonly assumes that the PSF of defocus blur is well modelled by a two-dimensional Gaussian function 300. In general this is not true. The defocus blur PSF of a photographic camera lens often more closely resembles a circular pillbox 320, with relatively sharp edges compared to the gradual fall-off of a Gaussian function. In reality, the shape of the defocus blur PSF is more complex than either of these approximations, and varies significantly from lens to lens and with different camera parameters for a single lens. The PSF also varies with field angle such that the PSF in one region of the image plane 120 may be different to the PSF in some other region of the image plane 120.

Also in particular, prior art modelling of the lens behaviour in the context of DFD assumes that consideration of the modulation transfer function (MTF), which is the modulus of the optical transfer function (OTF), is adequate to determine accurate depths from a comparison of two images. This assumption neglects the important contribution of the phase of the OTF, effectively disregarding half of the available data. By fully utilising the phase information, the arrangements presently disclosed can achieve significantly more accurate depth results than the prior art.

The presently disclosed arrangements facilitate a depth measure from a pair of images taken of the same scene with different camera parameters. This is performed without making assumptions about the shape of the defocus blur PSF and without discarding information present in the phases of the image spectrum and OTF. The presently disclosed arrangements use an improved method of characterising the relative blur between two image patches which is less sensitive to imaging noise than prior methods. These features will be explained in detail in the following sections.

4. Spectral Ratio
4.1. Theory

A method of determining depth from two images of the same scene can be developed by considering the theory of image formation. Consider a patch $f_0$ of the scene to be imaged, the patch being small enough such that any variation in object depth or PSF of the imaging system within the patch is small and thus can be ignored. The two-dimensional intensity distribution of the corresponding patch of an image $f_1$ of the intensity distribution of the patch $f_0$ can be modelled using a fully general point spread function (PSF) by a spatial convolution operation as follows:

$$f_1(x,y) = f_0(x,y) \otimes \text{PSF}_1(x,y) \quad (3)$$

where $\text{PSF}_1$ is the defocus blur PSF of the scene patch $f_0$ when it is projected on to the image patch $f_1$. Taking the Fourier transform of both sides of equation (3) gives $$F_1(u,v) = F_0(u,v) \text{OTF}_1(u,v) \quad (4)$$

where (u, v) are spatial frequency coordinates, $F_1$ is the Fourier transform of $f_1$, $F_0$ is the Fourier transform of $f_0$, and $\text{OTF}_1$ is the Fourier transform of $\text{PSF}_1$. By the Fourier convolution theorem the spatial convolution operation has become a product. The function $\text{OTF}_1$ is known as the optical transfer function (OTF). The OTF is a complex-valued function, with modulus and phase components.

Assume we have two images of the same scene taken with different camera parameters, but without moving the camera or any objects in the scene so that the images are in alignment with one another. Then the second image patch $f_2$ of the same scene patch $f_0$ may be modelled in the same way as equation (3), replacing the 1 subscripts with 2 subscripts. Taking the ratio of the Fourier transforms of corresponding patches in the two images gives $$\frac{F_1(u,v)}{F_2(u,v)} = \frac{\text{OTF}_1(u,v)}{\text{OTF}_2(u,v)} \quad (5)$$

where the Fourier transform $F_0(u, v)$ of the scene is common to the numerator and denominator of the right hand side and has been cancelled from the ratio. This ratio may be called the spectral ratio. When no noise is present, the spectral ratio is scene independent because all contributions of the scene have been cancelled out. In the presence of imaging or quantisation noise, the cancellation may not be perfect, and the spectral ratio may be biased by the noise.

The spectral ratio can be formed with an arbitrary assignment of the image patches as $f_1$ and $f_2$. However, as explained further below, it is advantageous to use asymmetric patch selection, based on which of the two image patches $f_1$ and $f_2$ is less blurred than the other image patch. Such a determination can be made by, for example, calculating the variance of the pixel intensities or brightness in each image patch, with the patch with the higher variance deemed to be less blurred, and thus the most focussed representation of the scene. Other methods of determining which patch is less blurred may be used, for example if the images are taken at different apertures and diffraction can be ignored, the patch captured with the narrower aperture may be deemed to be less blurred.

Once determination has been made of which patch is less blurred, the less blurred patch may be assigned as patch $f_2$, with the patch deemed to be more blurred assigned as $f_1$. This assignment allows an interpretation in which it is possible to consider $f_1$ as a more blurred version of $f_2$, related by a relative optical transfer function $\text{OTF}_r$ given by the spectral ratio:

$$F_1(u,v) = F_2(u,v) \frac{\text{OTF}_1(u,v)}{\text{OTF}_2(u,v)} \quad (6)$$

$$= F_2(u,v) \text{OTF}_r(u,v)$$

Taking the inverse Fourier transform of equation (6) gives the following relationship $$f_1(u,v) = f_2(u,v) \otimes \text{PSF}_r(u,v) \quad (7)$$

where $\text{PSF}_r$ is defined to be the relative point spread function (relative PSF) which when convolved with the image patch $f_2$ produces the image patch $f_1$. The relative point spread function $\text{PSF}_r$ is not simply related to $\text{PSF}_1$ and $\text{PSF}_2$, but is the result of a non-linear combination of the two. The relative point spread function $\text{PSF}_r$ varies with parameters of the imaging system such as focus and aperture, with the depth of the object imaged in patch $f_0$, and with field angle across the image plane 120.

4.2 Application to Depth Mapping

Figure 4:
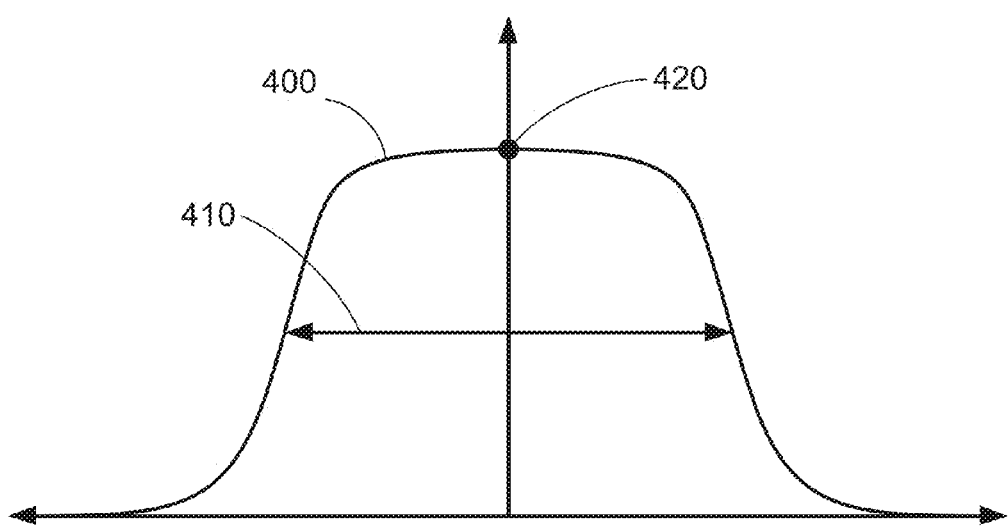
FIG. 4 is a diagram illustrating a one-dimensional cross-section of a general form of a two-dimensional point spread function.

An illustrative example of the shape of a relative PSF is shown in FIG. 4. FIG. 4 shows the shape 400 of a PSF, a measure of the width 410 of the PSF, and the peak value 420 of the PSF. In the absence of imaging noise, the relative PSF for physical optical systems will typically be a function with a value at the origin 420 that is maximal or near-maximal, and that falls to zero away from the origin. The measure of the width 410 may be a FWHM, a standard deviation, or some other measure of the width of the function.

For typical photographic situations, the Fourier spectrum $F_0$ of a scene patch $f_0$ will depend on the texture in the scene patch. Typically $F_0$ will have an envelope approximating a power law distribution with respect to the radial spatial frequency coordinate, with many regions within $F_0$ having low values. $\text{OTF}_1$ and $\text{OTF}_2$ will also often have low values if there is significant defocus for a given image patch.

In the presence of imaging noise, determining the spectral ratio using equation (5) will result in noisy estimates for any spatial frequency coordinates where $F_0$, $\text{OTF}_1$, or $\text{OTF}_2$ have low values. Noise in the spectral ratio estimate also results in a noisy estimate of the relative PSF. In addition, the relative PSF calculated from two image patches will be sampled on the pixel grid of the image patches and will be windowed by the size of the patches. The windowing will produce artefacts in the Fourier transforms of the patches.

The artefacts produced by windowing may be reduced by applying a window function that falls off towards the edges of the square patch window, as is known by those skilled in the art. Such a window function will spread the energy of the DC frequency into other frequencies, resulting in loss of accuracy. To avoid this, the image patches may have their DC component removed prior to windowing, by subtracting the mean value of each patch from its corresponding patch. When forming the spectral ratio, this produces a division by zero at the DC pixel in the Fourier transforms. This can be treated as a special case and the value one may be assigned to the spectral ratio at the DC pixel, based on the assumption that the patches are equivalent in brightness or intensity. Alternatively, the DC pixel of the spectral ratio may be assigned a value equal to the ratio of the means of the image patches prior to DC removal.

Figure 5:
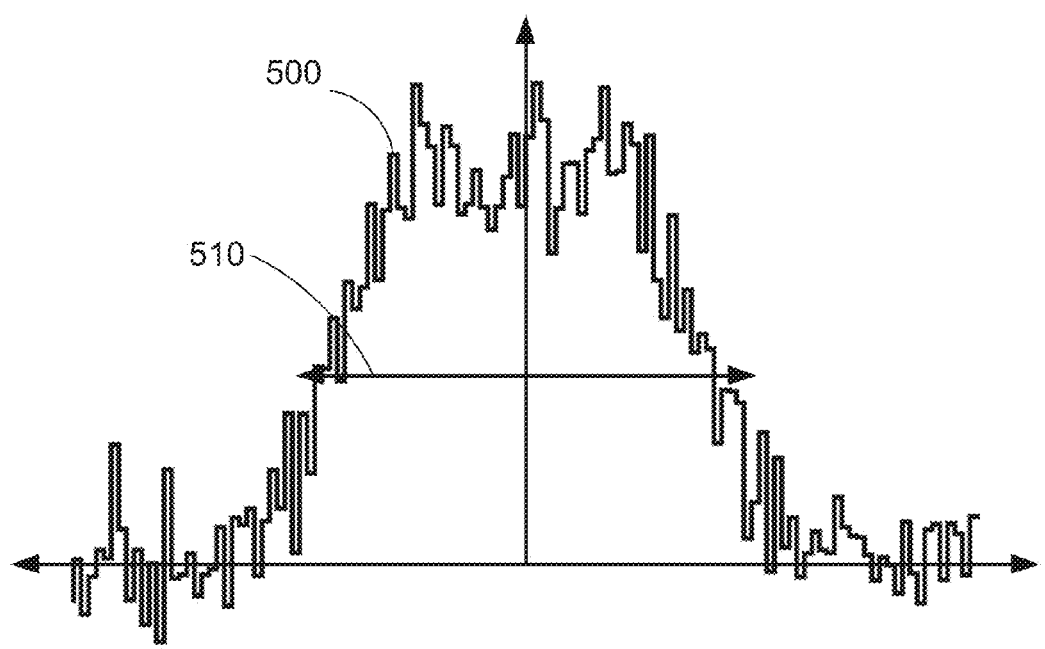
FIG. 5 is a diagram illustrating a one-dimensional cross-section of a general form of a two-dimensional point spread function as estimated from a digital image in the presence of imaging noise.

An illustrative example of a relative PSF obtained using the spectral ratio of two noisy image patches is shown in FIG. 5. FIG. 5 shows the shape 500 of a noisy, sampled PSF, and an estimated measure of the underlying width 510 of the noisy, sampled PSF 500. In this case, any empirical measure of the width 510 of the relative PSF is likely to be biased to some degree by the noise. In particular, an estimate of the FWHM would generally rely on assuming a functional form for the underlying shape of the relative PSF, fitting a curve to the noisy data, determining the maximum value of the curve, then taking the width of the curve at half that value. Each of these steps is susceptible to error because of the noise in the measurement.

4.3 Spectral Ratio Fitting

A method of extracting a depth score from the spectral ratio is to fit a two-dimensional function to the spectral ratio values in each pixel of the spectral ratio patch, thus giving a functional form. The function may be fit to either the real part of the spectral ratio values, or the modulus of the spectral ratio values.

In an idealised case of a symmetrical lens and no imaging noise, the spectral ratio would form a smooth two-dimensional curve, circularly symmetrical about the origin. For small differences in focus between image patches $f_1$ and $f_2$, the underlying shape of the spectral ratio may be approximated by a paraboloid, with value at the origin fixed to be 1 and no linear term. The equation of such a paraboloid p is given by $$p(u,v)=1+a(u^2+v^2). \tag{11}$$

where a is a free parameter determined by the shape of the spectral ratio. To determine the value of the free parameter a, a fitting method such as least squares fitting of the spectral ratio values may be used. If the pixels of the spectral ratio have been assigned weights, then a fitting method such as weighted least squares fitting of the spectral ratio values may be used.

Other functional forms may be used. Another example of a functional form is a Gaussian function given by $$p(u,v)=\exp(-a(u^2+v^2)). \tag{12}$$

A further example of a functional form is a Bessel function given by $$p(u,v)=J_0(a(u^2+v^2)). \tag{13}$$

In reality, the underlying shape of the spectral ratio will not be a paraboloid or a Gaussian or a Bessel function, but the free parameter a still provides a distinctive measure of the shape of the spectral ratio that may be related to the depth of the object in the image patch. The free parameter a may further be used to estimate the FWHM of the PSF as described above, but the free parameter a in itself provides a measure of object depth without any further processing.

Furthermore, the asymmetric patch selection determination provides a binary discriminator of which image patch is more focused, which is related directly to whether the object shown in the image patch is in front of or behind either the in-focus plane 130 or the intermediate in-focus plane 260. Combining this information with the distance determination uniquely identifies the distance of the object shown in the image patch from the camera.

The free parameter of a functional form fitted to the spectral ratio is generally a more robust measure of the relative blur than a direct estimate of the width of the relative PSF, because the fitting tends to cancel the effects of random noise and produces a depth score without requiring any assumption about the shape of the relative PSF. On the other hand, estimating the width of the relative PSF from a noisy, sampled PSF 500 requires assuming a functional form for the shape of the relative PSF, estimating multiple parameters to fit the shape to the noisy data, and then extracting the width parameter 510 from the fit.

Another advantage of fitting a functional form to the real part of the complex spectral ratio over many prior art methods is that it does not rely on an assumption that the relative OTF between two images depends only on the change in the amount of defocus blur between the images. Many prior art methods neglect the effects of other lens aberrations, implicitly assuming that they are either negligible or that any change in defocus is not accompanied by a change in other lens aberrations. Both of these assumptions are false for typical optical systems because of the relation between the optical pupil function and the OTF. The pupil function is a complex-valued function describing the amplitude and phase modulation of light passing through the pupil plane of the optical system. As is known to those skilled in the art, defocus can be described as a Zernike polynomial component of the pupil function. Lens aberrations such as spherical aberration, coma, or other aberrations can be described as Zernike polynomials orthogonal to the defocus polynomial. This means that, in terms of the pupil function, defocus can be separated from other aberrations and measured independently. However, the OTF is the autocorrelation of the pupil function and this autocorrelation mixes the orthogonal polynomials so they are no longer separable. This means that the relative OTF between two images captured at different focus is a mixture of relative defocus blur and blur caused by other lens aberrations, and that the two cannot be disambiguated. DFD models which ignore this effect are prone to mismatches between theory and experiment, potentially resulting in erroneous depth assignments. This can be particularly important in the case of compact cameras, which typically have lenses with significant aberrations. The mean spectral ratio method is general enough to avoid this assumption. If the lens aberrations are known they can be included in theoretical calibrations of mean spectral ratio to depth. For experimental calibration, the measured mapping from mean spectral ratio to depth will automatically include any effects of lens aberrations.

Another variant of the spectral ratio may be formed by replacing the complex division of equation (5) by an operation based on the arctangent function. Division by values close to zero produces large results, and some values in the Fourier transforms of image patches may be close to zero and also affected by imaging noise. This may result in arbitrarily large spurious values in the spectral ratio. Therefore it is advantageous to use a mathematical function that maps arbitrarily large values to values within a finite range. A suitable function is the arctangent, which maps the range 0 to infinity to the range 0 to $\pi/2$. In practice, the well-known a tan 2(y, x) version of the arctangent function can be used, which takes two arguments x and y and returns the arctangent of the ratio y/x. This function returns the finite value $\pi/2$ in cases where the division in equation (5) would produce an error because of a zero in the denominator. A complication arises because the a tan 2( ) function operates on real numbers, whereas the values in the Fourier transforms $F_1$ and $F_2$ and complex. Simply taking the arctangent of the ratio of the moduli of $F_1$ and $F_2$ would discard the phase information, leading to errors in interpreting the result as a depth measure, as explained above for the spectral ratio. A variant a tan 2complex( ) of the a tan 2( ) function can be defined to return a value with the modulus of the arctangent of the ratio of the two arguments, and a phase component equal to the difference in the phase components of the two arguments:

$$a\tan 2\text{complex}(y,x)=a\tan 2(|y|,|x|)\exp(i(\arg(y)-\arg(x))). \tag{9}$$

A value OTF$_{arctan}$, called the arctan spectral ratio, can then be defined by $$\text{OTF}_{arctan}(u,v) = a\tan 2\text{complex}(\text{OTF}_2(u,v), \text{OTF}_1(u,v)). \quad (10)$$

The arctan spectral ratio can then be treated similarly to the spectral ratio in further operations involving fitting a functional form in order to derive a measure related to the depth of an object shown in the image patch. The resulting fit to the arctan spectral ratio will be less affected by random imaging noise than a fit to the spectral ratio, thus providing an advantage.

4.4 Spectral Support and Noise

An additional consideration when calculating depth estimates based on the spectral ratio is the amount of spectral support for the ratio. For typical image textures in a photographic scene, the Fourier transform will show significant amplitudes at low frequencies, but near-zero amplitudes at most high frequencies, where the signal will instead be dominated by imaging noise. Additionally, the OTF of a lens is typically high at low spatial frequencies, but falls to zero at high spatial frequencies because of the diffraction limit of the lens. Above this diffraction limit, the signal will be zero, and all that will be seen is noise. This implies that the spectral ratio OTF$_r$ will have most of its meaningful signal concentrated in the low frequency region, with higher frequencies being noisier. At some frequencies the denominator of the spectral ratio may be very close to zero, making the spectral ratio at that frequency arbitrarily large. Fitting a function to a spectral ratio which includes such values can produce spurious results. Indeed, the distribution of the ratio of two Gaussian noise distributions is a Cauchy distribution, which does not converge to a well-defined mean. The resulting noise can bias the spectral ratio by arbitrary amounts.

This problem can be addressed by filtering the image patch data before forming the spectral ratio, or by weighting or filtering of the spectral ratio data before fitting the functional form, or both. One implementation of this aspect of the present disclosure is to apply a low-pass smoothing filter to the image patches before taking the Fourier transforms. Another implementation is to apply a band pass filter to the image patches before taking the Fourier transforms. Another implementation is to apply a Wiener filter or similar noise reducing filter to the spectral ratio to reduce the impact of pixels with large values caused by a division by a near-zero number. Yet another implementation is to weight the spectral ratio image with a radial function, such as a function proportional to some power of $1/(u^2+v^2)$.

Another implementation of image patch filtering is to assign weights of zero or one to the pixels by thresholding the signal-to-noise ratio of the Fourier spectrum of one of the image patches, preferably the patch in the denominator of the spectral ratio. Assuming that the noise amplitude in the image patch has a flat spectrum, the signal to noise ratio in each pixel of the spectral ratio can be estimated as proportional to the modulus of the Fourier transform in that pixel. A threshold can then be applied to assign a weight of one to a predetermined fraction of the pixels with the highest estimated signal-to-noise ratios and a weight of zero to all other pixels. By properties of the Fourier transform, the selected subset of the pixels will have Hermitian symmetry, so the mean spectral ratio calculated over these selected pixels will be a real number. Similar filtering can also be applied to the arctan spectral ratio variant.

Another consideration when analysing the spectral ratio calculated from images taken with a digital camera is that the diffraction limit of the lens may occur at a spatial frequency less than the Nyquist frequency of the sensor. In this case, no scene information is present at spatial frequencies greater than the diffraction limit, and pixels in the Fourier transform $F_1$ of an image patch $f_1$ with $\sqrt{u^2+v^2}$ greater than the diffraction limit will contain only noise. If this is the case, these pixels can be discarded from consideration when calculating and fitting a functional form to the spectral ratio. This can save processing time and the functional form fitting result will be less influenced by imaging noise without losing accuracy.

4.5 Adaptive Spectral Weighting

The above-mentioned arrangements for filtering the spectral ratio data are motivated by a desire to reduce the effects of noise on the underlying shape of the spectral ratio. They are attempts to filter out spectral ratio pixel values in which the imaging noise is so great that it prevents the value from being representative of the true spectral ratio of the optics at the given pixel. However none of the filtering methods mentioned above addresses the problem in a way that is based on a per-pixel measurement that provides a direct estimate of the signal-to-noise ratio in specific pixels.

Figure 6A:
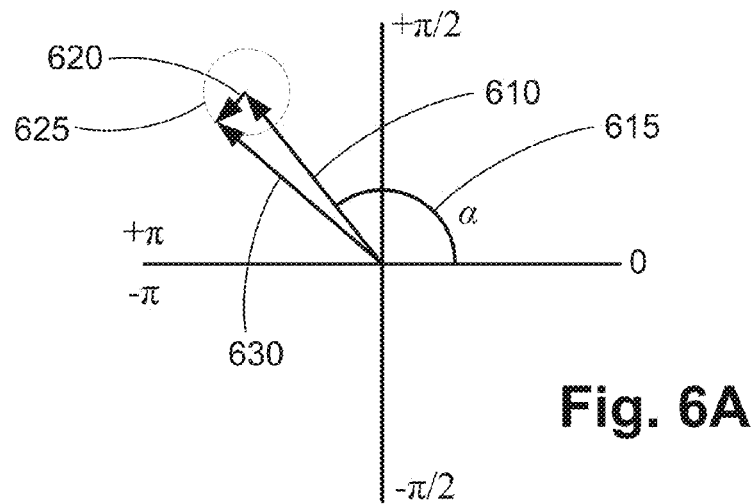
FIGS. 6A, 6B, and 6C illustrate the combination of signal and noise in the spectral ratio for a pixel with a high signal-to-noise-ratio.
Figure 6B:
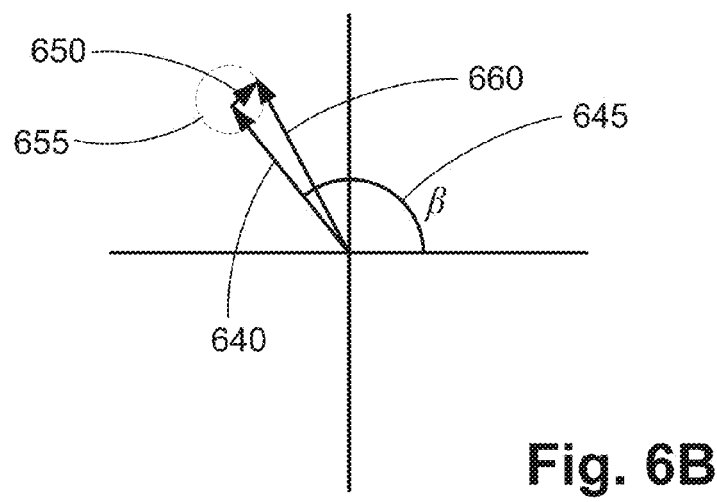
Figure 6C:
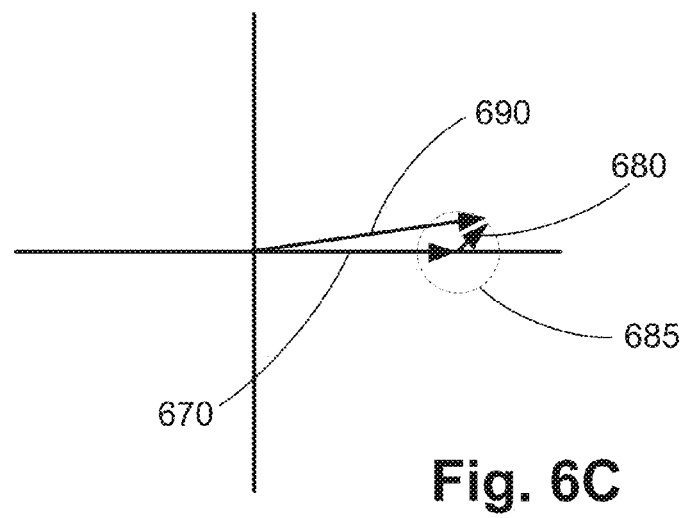

By considering the interactions of signal and noise in the complex number plane, we can gain an understanding of properties of the spectral ratio that allow a better distinction of signal from noise. FIGS. 6A to 6C illustrate the construction of the spectral ratio in a pixel where the signal is stronger than the noise. FIG. 6A shows an example first Fourier transform value 630 of one pixel in the Fourier transform $F_1$ of a first image patch $f_1$ 840 (see FIG. 8), plotted on an Argand diagram. The first Fourier transform value 630 is the sum $s_1+n_1$ of a first signal value $s_1$ 610 and a first noise value $n_1$ 620. The magnitude of the first noise value $n_1$ 620 is substantially smaller than the magnitude of the first signal value $s_1$ 610. The phase of the first signal value $s_1$ 610 may be designated by the angle $\alpha$ 615. The phase of random noise is random, and its range of variation is shown by the dashed circle 625 drawn centred at the first signal value $s_1$ 610. The phase (not labelled) of the first Fourier transform value 630 is close to the angle $\alpha$ 615, because the contribution of the first noise value $n_1$ 620 to the sum $s_1+n_1$ is relatively small.

FIG. 6B shows an example second Fourier transform value 660 of one pixel in the Fourier transform $F_2$ of a second image patch $f_2$ 850 (see FIG. 8), plotted on an Argand diagram. The second Fourier transform value 660 is the sum $s_2+n_2$ of a second signal value $s_2$ 640 and a second noise value $n_2$ 650. The magnitude of the second noise value $n_2$ 650 is substantially smaller than the magnitude of the second signal value $s_2$ 640. The phase of the second signal value $s_2$ 640 may be designated by the angle $\beta$ 645. The phase of random noise is random, and its range of variation is shown by the dashed circle 655 drawn centred at the second signal value $s_2$ 640. The phase (not labelled) of the second Fourier transform value 660 is close to the angle $\beta$ 645, because the contribution of the second noise value $n_2$ 650 to the sum $s_2+n_2$ is relatively small.

FIG. 6C shows the spectral ratio value 690 of one pixel in the spectral ratio formed from Fourier transforms $F_1$ and $F_2$ of the image patches $f_1$ 840 and $f_2$ 850, respectively. The spectral ratio value 690 is determined from the sum of the noise-free spectral ratio value $s_1/s_2$ 670 and a noise value n 680, in which the noise value is given by the expression $$n = \frac{s_1 n_2 - s_2 n_1}{s_2(s_2 + n_2)}. \quad (14)$$

By examination of the relative magnitudes of the numerator and denominator in equation (14), the magnitude of the noise value n 680 is in general substantially smaller than the magnitude of the spectral ratio value 690. The phase of the noise-free spectral ratio value $s_1/s_2$ 670 is given by the angle $(\alpha-\beta)$. For the case where the image patches $f_1$ and $f_2$ are formed with a small change in focus of a camera lens, keeping all other imaging variables constant, the angles $\alpha$ 615 and $\beta$ 645 will be either be equal, or will differ by $\pi$ radians, because defocus changes only the magnitude of the OTF, leaving the phase unchanged—except in the case where the magnitude crosses zero, which results in the phase changing by $\pi$ radians. In most cases a small change in the magnitude of the OTF produced by defocus will result in the angles $\alpha$ 615 and $\beta$ 645 being equal, meaning that the phase of the noise-free spectral ratio value $s_1/s_2$ 670 will be zero. In a small fraction of cases, the angles $\alpha$ 615 and $\beta$ 645 will differ by $\pi$ radians, meaning that the phase of the noise-free spectral ratio value $s_1/s_2$ 670 will be $\pi$. The phase of the noise value n is essentially random, and its range of variation is shown by the dashed circle 685 drawn centred at the noise-free spectral ratio value $s_1/s_2$ 670. The phase (not labelled) of the spectral ratio value 690 is close to the phase angle $(\alpha-\beta)$, because the contribution of the noise value n 680 to the sum is relatively small.

Figure 7A:
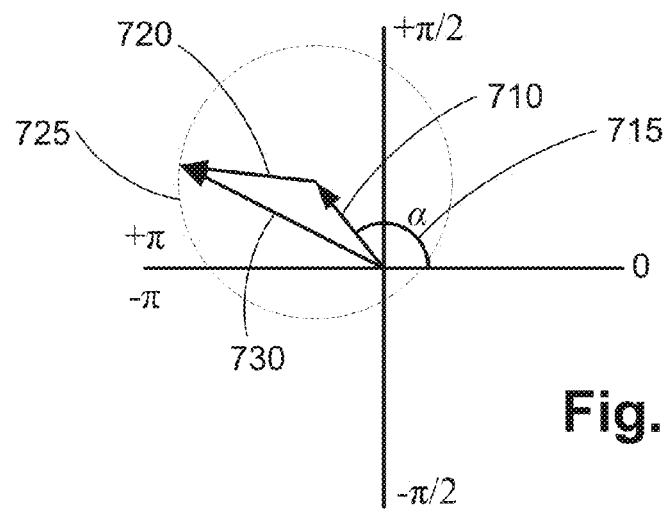
FIGS. 7A, 7B, and 7C illustrate the combination of signal and noise in the spectral ratio for a pixel with a low signal-to-noise-ratio.

In contrast to the high signal-to-noise case shown in FIGS. 6A to 6C, FIGS. 7A to 7C shows the construction of the spectral ratio in a pixel where the noise is comparable to or stronger than the signal, being a low signal-to-noise case. FIG. 7A shows an example first Fourier transform value 730 of one pixel in the Fourier transform $F_1$ of a first image patch $f_1$ 840, plotted on an Argand diagram. The first Fourier transform value 730 is the sum $s_1+n_1$ of a first signal value $s_1$ 710 and a first noise value $n_1$ 720. The magnitude of the first noise value $n_1$ 720 is of similar magnitude or larger than the magnitude of the first signal value $s_1$ 710. The phase of the first signal value $s_1$ 710 may be designated by the angle $\alpha$ 715. The phase of random noise is random, and its range of variation is shown by the dashed circle 725 drawn centred at the first signal value $s_1$ 710. The phase (not labelled) of the first Fourier transform value 730 is also effectively random, because the contribution of the first noise value $n_1$ 720 to the sum $s_1+n_1$ is large and thus the phase of the first signal value $s_1$ 710 has only a relatively small influence on the phase of the sum.

Figure 7B:
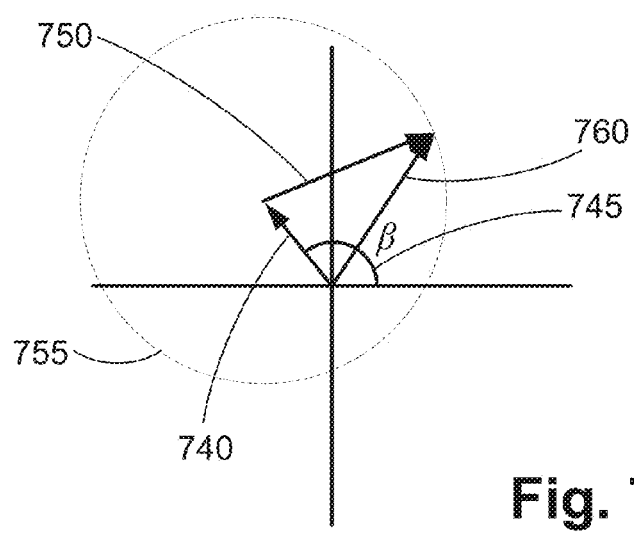

FIG. 7B shows an example second Fourier transform value 760 of one pixel in the Fourier transform $F_2$ of a second image patch $f_2$ 850, plotted on an Argand diagram. The second Fourier transform value 760 is the sum $s_2+n_2$ of a second signal value $s_2$ 740 and a second noise value $n_2$ 750. The magnitude of the second noise value $n_2$ 750 is of similar magnitude or larger than the magnitude of the second signal value $s_2$ 740. The phase of the second signal value $s_2$ 740 may be designated by the angle $\beta$ 745. The phase of random noise is random, and its range of variation is shown by the dashed circle 755 drawn centred at the second signal value $s_2$ 740. The phase (not labelled) of the second Fourier transform value 760 is also effectively random, because the contribution of the first noise value $n_2$ 750 to the sum $s_2+n_2$ is large and thus the phase of the first signal value $s_1$ 740 has only a relatively small influence on the phase of the sum.

Figure 7C:
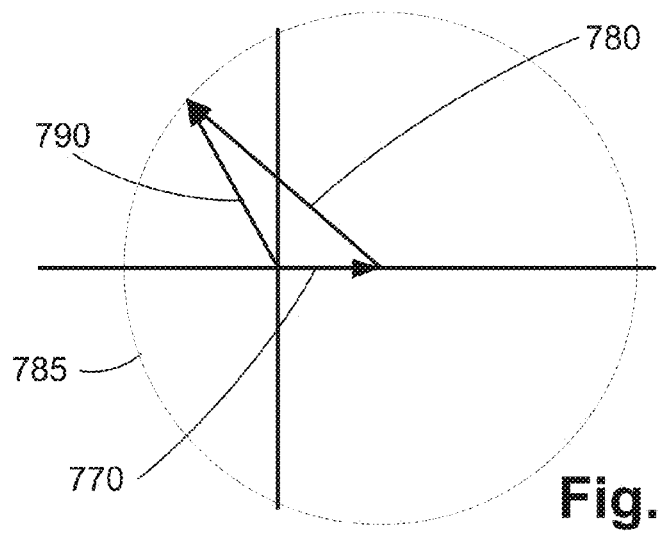

FIG. 7C shows the spectral ratio value 790 of one pixel in the spectral ratio formed from Fourier transforms $F_1$ and $F_2$ of the image patches $f_1$ 840 and $f_2$ 850, respectively. The spectral ratio value 790 is the sum of the noise-free spectral ratio value $s_1/s_2$ 770 and a noise value n 780, which the noise value is given by the expression $$n = \frac{s_1 n_2 - s_2 n_1}{s_2(s_2 + n_2)}. \tag{15}$$

By examination of the relative magnitudes of the numerator and denominator in equation (15), the magnitude of the noise value n 780 is in general of similar magnitude or larger than the magnitude of the spectral ratio value 790. The phase of the noise-free spectral ratio value $s_1/s_2$ 770 is given by the angle $(\alpha-\beta)$. For the case where the image patches $f_1$ and $f_2$ are formed with a small change in focus of a camera lens, keeping all other imaging variables constant, the angles $\alpha$ 715 and $\beta$ 745 will be either be equal or will differ by $\pi$ radians, because defocus changes only the magnitude of the OTF, leaving the phase unchanged—except in the case where the magnitude crosses zero, which results in the phase changing by $\pi$ radians. (High order lens aberrations may have some other effect on the phase, but in most cases such effects should be negligible.) In most cases a small change in the magnitude of the OTF produced by defocus will result in the angles $\alpha$ 715 and $\beta$ 745 being equal, meaning that the phase of the noise-free spectral ratio value $s_1/s_2$ 770 will be zero. In a small fraction of cases, the angles $\alpha$ 715 and $\beta$ 745 will differ by $\pi$ radians, meaning that the phase of the noise-free spectral ratio value $s_1/s_2$ 770 will be $\pi$. The phase of the noise value n is essentially random, and its range of variation is shown by the dashed circle 785 drawn centred at the noise-free spectral ratio value $s_1/s_2$ 770. The phase (not labelled) of the spectral ratio value 790 is also effectively random, because the contribution of the noise value n 780 to the sum $s_1/s_2+n$ is large and thus the phase of the noise-free spectral ratio value $s_1/s_2$ 770 has only a relatively small influence on the phase of the sum.

From this analysis, it can be seen that pixels of the spectral ratio which have a good signal and relatively low noise may be expected to have phase angles close to 0 or $\pm\pi$ radians (using the convention that phase angles wrap from $-\pi$ to $+\pi$), while pixels of the spectral ratio in which noise is of comparable magnitude to the signal or higher will have phase angles more randomly distributed through the entire range $-\pi$ to $+\pi$.

Additionally, typical image patches taken from photographic scenes tend to contain spatial frequency information concentrated at low frequencies or clustered around harmonics of strong repeating patterns. In practice this manifests as clusters of pixels in the Fourier transform with high signal, surrounded by regions of pixels where the imaging noise dominates. When a spectral ratio is calculated from image tiles, it tends to contain clusters of pixels with phase close to zero, surrounded by regions of pixels with random phase. Therefore, a noise-dominated pixel is likely to have some neighbouring pixels which are also noise-dominated, so the pixel is unlikely to be surrounded by pixels with phase angle of the spectral ratio close to zero.

Figure 18:
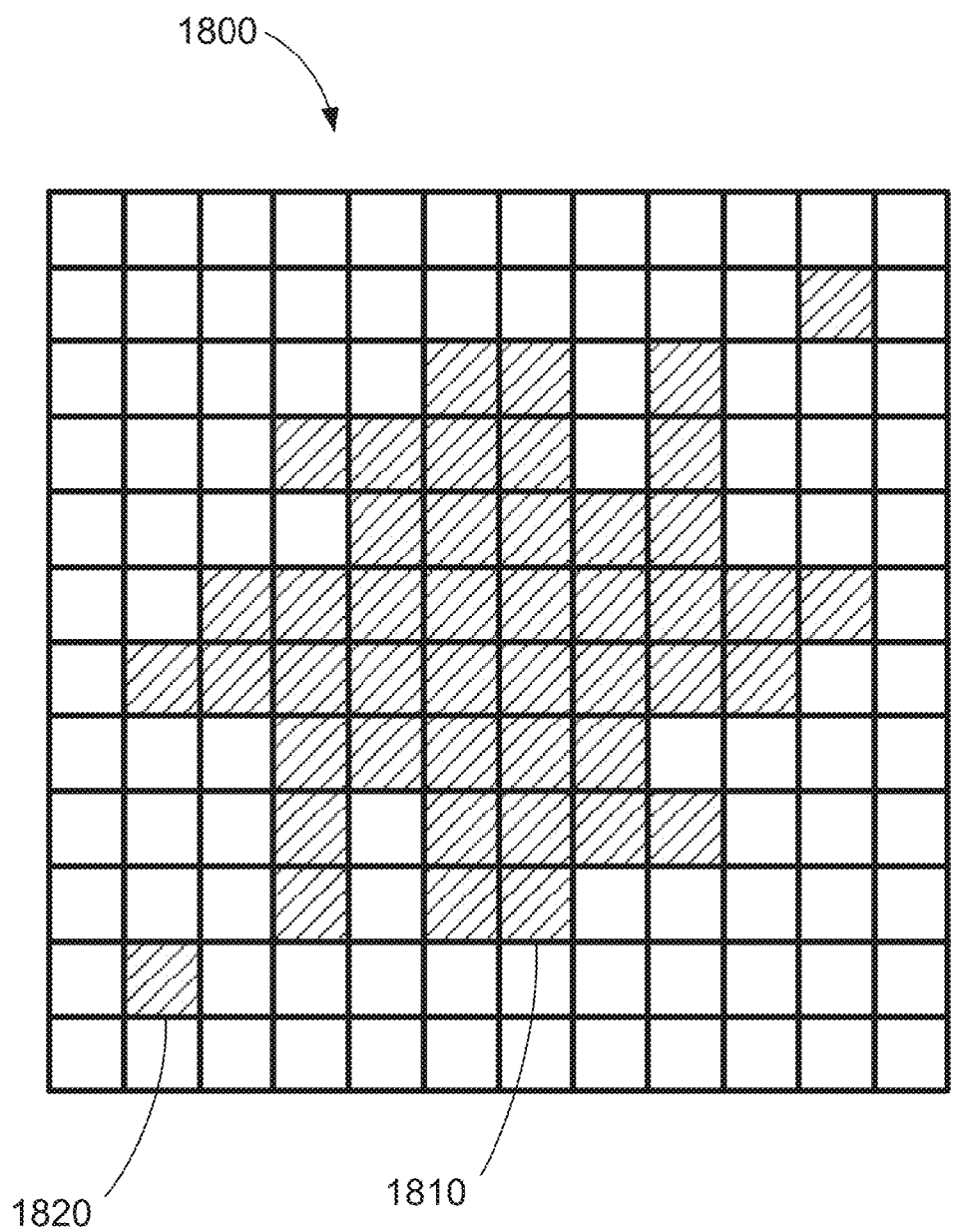
FIG. 18 illustrates an arrangement of pixels in a spectral ratio patch.

Therefore, a pixel with phase close to zero, but which has several neighbouring pixels with phase not close to zero is likely to be a noise-dominated pixel with phase close to zero by random chance. This situation is illustrated in FIG. 18, which shows an example collection of pixels 1800 forming a spectral ratio. The shaded blocks represent pixels which have complex phase within some threshold $\epsilon$ of zero, while the unshaded blocks represent pixels which have complex phase with absolute value greater than $\epsilon$. A cluster of shaded blocks 1810 represents the region in which the spectral ratio has a good signal-to-noise ratio. Pixels outside the cluster 1810 have poor signal-to-noise ratio and so should be ignored when fitting a functional form to the spectral ratio values. A rogue shaded block 1820 represents a pixel dominated by noise, but for which the phase is within the threshold ϵ of zero by chance. A pixel such as that represented by the rogue shaded block 1820 can be excluded from the fitting by considering the phases of neighbouring pixels.

A refinement of this observation is that a translational misalignment between the image patches used to form the spectral ratio will, by properties of the Fourier transform, manifest as a gradient in the phase of the spectral ratio across the patch. In this case, the spectral ratio of a typical image patch will tend to contain clusters of pixels which have a smoothly varying phase gradient, surrounded by regions of pixels with random phase. Additionally, for translational misalignment, the phase gradient will be linear, which means that any curvature in the phase gradient is small or zero.

Figure 21:
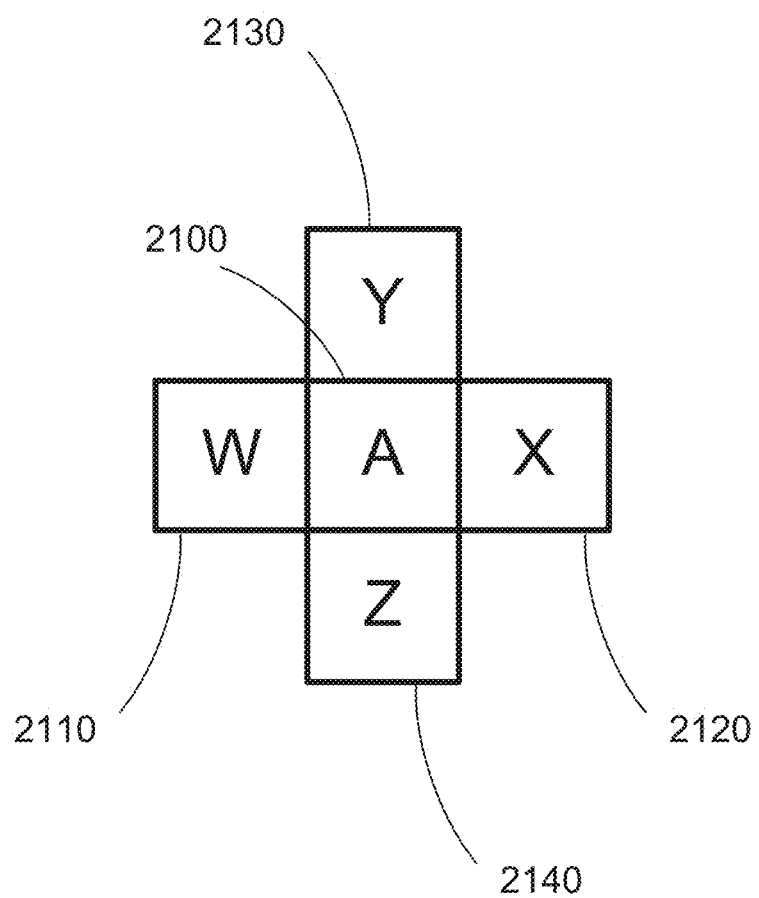
FIG. 21 illustrates a method of defining the neighbours of a given pixel.

One method of defining neighbouring pixels of a given pixel is illustrated in FIG. 21. In FIG. 21, a given pixel A 2100 is shown with neighbouring pixels W 2110 and X 2120 being adjacent to pixel A 2100 in the x direction, and neighbouring pixels Y 2130 and Z 2140 being adjacent to pixel A 2100 in the y direction. In this scheme the pixel A 2100 has four neighbouring pixels.

One method of assigning weights to pixels of the spectral ratio is to assign a weight of zero to any given pixel for which the absolute value of the phase of the spectral ratio is greater than a threshold value ϵ. All other pixels (i.e. pixels with the absolute value of the phase of the spectral ratio less than or equal to ϵ) are assigned a weight of one. The weighted pixels can then be used to calculate a depth measure, preferably by fitting a functional form such as a paraboloid. The number of pixels selected by this method may vary as patches are taken from different parts of an image, as the object textures in the images and the noise characteristics of the image vary spatially.

Another method of assigning weights to pixels of the spectral ratio is to assign a weight of zero to any given pixel which does not have at least a pre-specified number of neighbouring pixels with phase angle of their spectral ratio value within a threshold value ζ of the phase angle of the spectral ratio of the given pixel. All other pixels are assigned a weight of one. This criterion addresses the fact that some noise-dominated pixels may have phase angles of the spectral ratio close to 0 by chance. It also addresses the fact that in the case of a translational misalignment of the image patches used to form the spectral ratio, the high signal-to-noise pixels may not necessarily have phases close to zero, but will have phases close to the phase values of their neighbouring pixels, because of the smooth phase gradient produced by the misalignment, so long as the translation is small. For example, with reference to FIG. 21, the pixel A may be assigned a weight of one if all of the following conditions are true, and a weight of zero otherwise:

$|\phi_A - \phi_W| < \zeta,$ $|\phi_A - \phi_X| < \zeta,$ $|\phi_A - \phi_Y| < \zeta,$ $|\phi_A - \phi_Z| < \zeta,$ (16)

where $\phi_A$ is the phase of pixel A, $\phi_W$ is the phase of pixel W, $\phi_X$ is the phase of pixel X, $\phi_Y$ is the phase of pixel Y, and $\phi_Z$ is the phase of pixel Z.

Another method of assigning weights to pixels of the spectral ratio is to assign a weight of zero to any given pixel for which a phase curvature condition is violated. With reference to FIG. 21, the phase curvature at pixel A can be estimated in the x direction by forming the value $|\phi_W + \phi_X - 2\phi_A|$ and in the y direction by forming the value $|\phi_Y + \phi_Z - 2\phi_A|$. In the case where some translation shift might be expected between the two image patches 840 and 850, there may be a phase gradient across the spectral ratio, but any curvature should be minimal. Therefore, for example, the pixel A may be assigned a weight of one if all of the following conditions are true and a weight of zero otherwise:

$|\phi_W + \phi_X - 2\phi_A| < \eta,$ $|\phi_Y + \phi_Z - 2\phi_A| < \eta,$ (17)

for a particular threshold value η.

Another method of assigning weights to pixels of the spectral ratio is to assign a weight of zero to any given pixel which does not fulfil all conditions of any specified subset of the criteria based on the threshold value ϵ, the threshold value ζ, and the threshold value η, and to assign a weight of one to all other pixels of the spectral ratio.

Another method of assigning weights to pixels of the spectral ratio is to assign a weight to any given pixel A whose value is calculated by some weighting function $w(\phi_A)$ of the wrapped phase $\phi_A$ of the given pixel A. An example weighting function is given by $$w(\phi_A) = \left(\frac{\pi - |\phi_A|}{\pi}\right)^k,$$ (18)

where $\phi_A$ is the phase of a given pixel A and k is a predetermined number. The number k may be 1, or 2, or some other real number. Other weighting functions $w(\phi_A)$ evaluating to real numbers are possible. Preferably the weighting function $w(\phi_A)$ evaluates to 1 for $\phi_A=0$, to 0 for $\phi_A=\pm\pi$, and to intermediate values for intermediate values of $\phi_A$. In a variation, the weighting function w may also take the phases of pixels other than pixel A as parameters, for example the phases of pixels neighbouring pixel A. In a further variation, the weighting function w may also take the magnitude of the pixel A or other pixels as parameters.

Further methods of assigning weights to pixels of the spectral ratio may be defined with respect to criteria based on the phase values of pixels of the spectral ratio, and are within the scope of the present disclosure. The present inventors consider all such methods may be termed adaptive spectral weighting methods.

A modification of the above adaptive spectral weighting methods deals with high signal-to-noise pixels in which the OTF has changed sign because of the differing focus between the two image patches. In this case, as described above, the phase of the spectral ratio value in the relevant pixel is close to ±π rather than 0. To deal with this, the spectral ratio can be modified by multiplying the phase by 2, while leaving the magnitude unchanged. Because of the wrapping of phase angle, values close to ±π will be mapped to values close to 0, while phase values close to 0 will remain close to 0. Phase angles far from either 0 or ±π, such as those associated with spectral ratio pixels dominated by noise, will be far from 0 after multiplication by 2. With this arithmetic modification to the spectral ratio, the above-mentioned weighting methods may be carried out with a greater degree of accurate discrimination between spectral ratio pixels with good signal-to-noise ratio and those dominated by noise. In an alternative arrangement, the weighting methods may be carried out without modifying the spectral ratio phase values, but instead with the threshold ϵ applying to spectral ratio phase values close to 0 or ±π, rather than just 0.

All of the above-mentioned theory and adaptive spectral weighting methods apply both to the spectral ratio and the arctan spectral ratio, as by construction the phase information in the arctan spectral ratio is identical to the phase information in the spectral ratio. Additionally, the phase of the spectral ratio $F_1/F_2$ is identical to the phase of the product $F_1F_2^*$, where $F_2^*$ is the complex conjugate of $F_2$. Therefore all of the above-mentioned theory and adaptive spectral weighting methods also apply to the product $F_1F_2^*$. In the present disclosure, the concept of "phase of the spectral ratio" may be understood to also refer to the phase of the arctan spectral ratio, or to the phase of the product $F_1F_2^*$, or to any other numerically equivalent formulation.

To further improve the accuracy of the adaptive spectral weighting methods, some pre-processing may be applied to the images before calculations of the spectral ratio. An example pre-processing step is the removal of fixed pattern sensor noise by subtraction of a fixed pattern noise image. Another example of a pre-processing step is downsampling of the images.

4.6 Confidence Estimation

The adaptive spectral weighting and functional form fitting procedures described above can also provide statistics which may be interpreted as confidence measures. These confidence measures are estimates of the reliability of the depth scores calculated from the various image patches. Several confidence measures may be defined.

One example of a confidence measure is the number of pixels that are assigned a weight of 1 by the adaptive spectral masking procedure. Another example of a confidence measure is the RMS residual of the functional form fitted to the pixels of the spectral ratio. The residuals may be weighted by the weights assigned to the pixels by the adaptive spectral masking procedure.

4.7 Shift Estimation

The adaptive spectral weighting procedures described above can also be applied to the problem of image alignment, in particular shift estimation between two images. In a typical scenario, two images such as photographs of a scene may be misaligned. Image patches taken at the same pixel coordinates from each image may be cross-correlated, giving a peak in the correlation magnitude. The pixel coordinates of the peak may be measured to subpixel accuracy and these coordinates give the amount of translation shift between the image patches. Various implementations of this shift estimation method are known in the art.

The accuracy of shift estimation can be improved by the application of adaptive spectral weighting as described herein. In this method, the image patches to be aligned are Fourier transformed, then the complex ratio of the Fourier transforms is calculated to give a spectral ratio. The phase of the spectral ratio can be used to assign weights to the pixels in the Fourier domain, using any of the methods described above. These weights can then be used when forming the cross-correlation between the image patches, for example by setting to zero all pixels in the Fourier transforms of the image patches that correspond to pixels of the spectral ratio that have been assigned zero weight, and performing the cross-correlation in the Fourier domain. In another example, the cross-correlation can be performed by forming the product of the complex conjugate of the Fourier transform of one image patch with the Fourier transform of the second image patch, then setting the magnitude values of this product to the corresponding weight values assigned according to the phase of the spectral ratio, then taking the inverse Fourier transform of the weighted product, resulting in a masked phase correlation.

In a further application of adaptive spectral weighting, depth measurement and shift estimation may be performed on the same pair of image patches extracted from a pair of unaligned photographs of the same scene. The phase of the spectral ratio could be used to weight both the functional form fit used to estimate depth and the cross-correlation used to estimate translational shift between the patches. The weights may be determined by the phase of the spectral ratio using the same method, or different weighting methods may be used for the depth measurement and the shift estimation.

5. Process Implementation, Variations, and Applications

The arrangements presently disclosed may be implemented on a variety of hardware platforms, including in an imaging device such as a camera, or on a general purpose computer (PC).

Figure 16A:
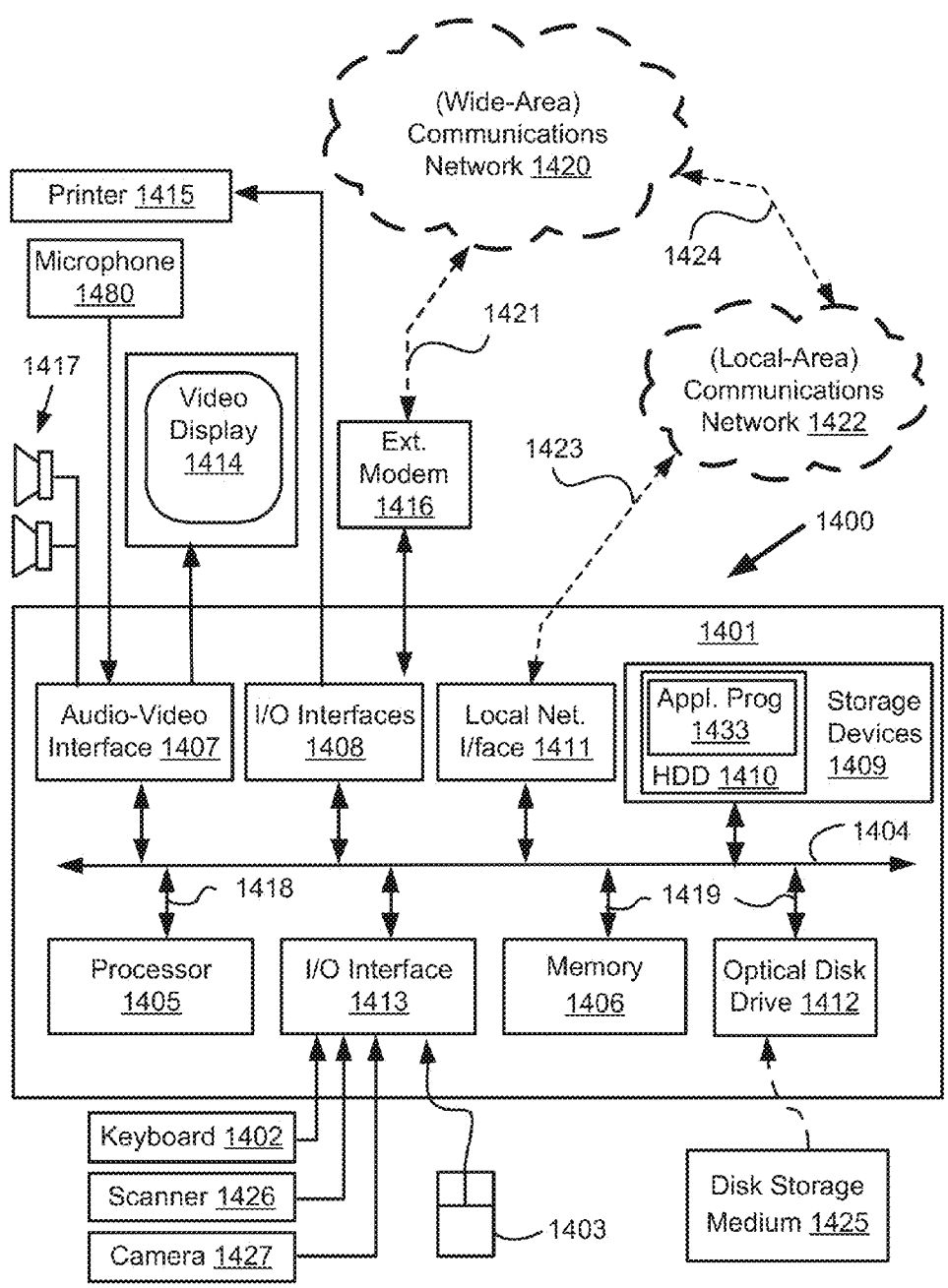
FIGS. 16A and 16B collectively form a schematic block diagram of a general purpose computer on which the embodiments of the invention may be practised.
Figure 16B:
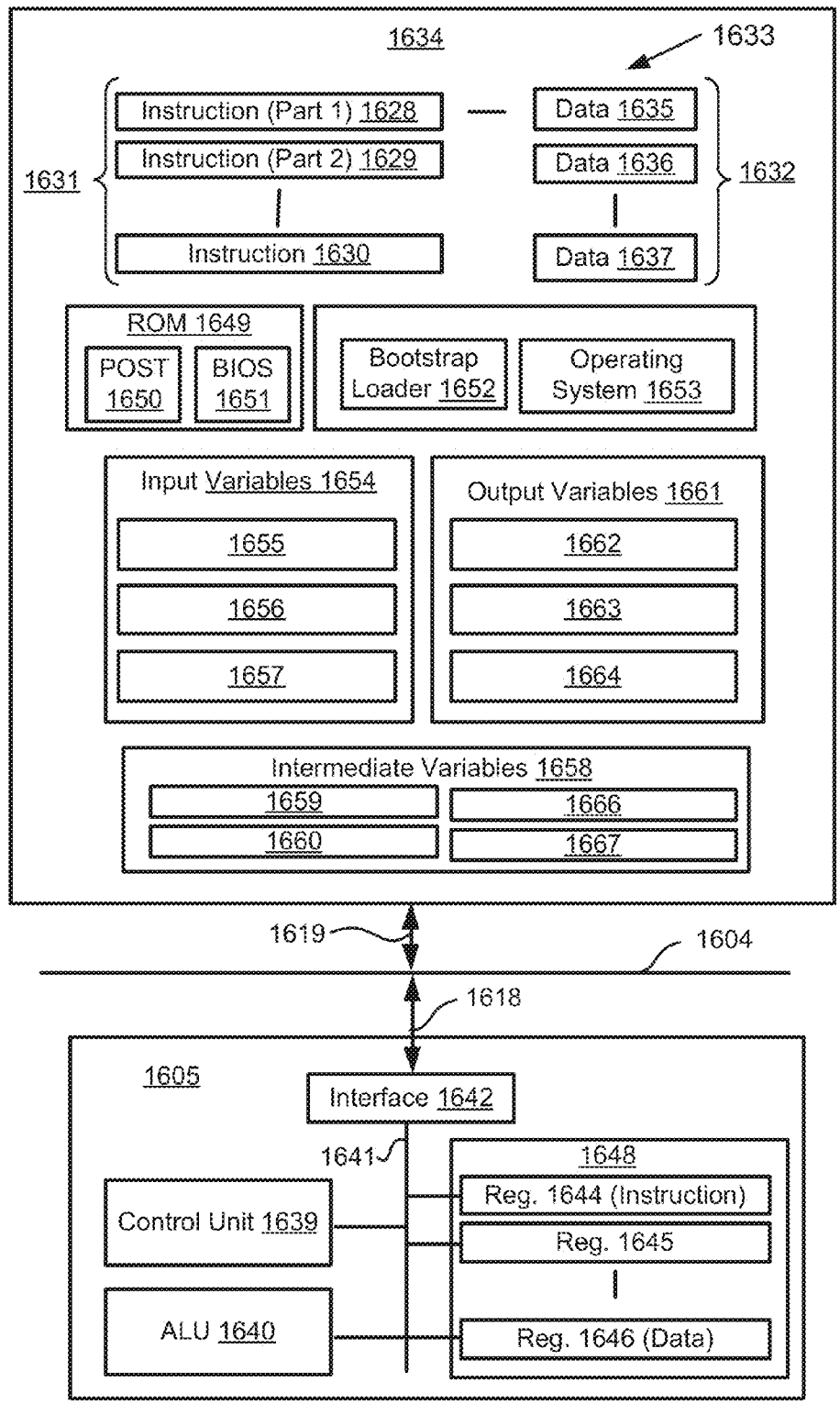

FIGS. 16A and 16B depict a general-purpose computer system 1600, upon which the various arrangements described can be practiced.

As seen in FIG. 16A, the computer system 1600 includes: a computer module 1601; input devices such as a keyboard 1602, a mouse pointer device 1603, a scanner 1626, a camera 1627, and a microphone 1680; and output devices including a printer 1615, a display device 1614 and loudspeakers 1617. An external Modulator-Demodulator (Modem) transceiver device 1616 may be used by the computer module 1601 for communicating to and from a communications network 1620 via a connection 1621. The communications network 1620 may be a wide-area network (WAN), such as the Internet, a cellular telecommunications network, or a private WAN. Where the connection 1621 is a telephone line, the modem 1616 may be a traditional "dial-up" modem. Alternatively, where the connection 1621 is a high capacity (e.g., cable) connection, the modem 1616 may be a broadband modem. A wireless modem may also be used for wireless connection to the communications network 1620.

The computer module 1601 typically includes at least one processor unit 1605, and a memory unit 1606. For example, the memory unit 1606 may have semiconductor random access memory (RAM) and semiconductor read only memory (ROM). The computer module 1601 also includes an number of input/output (I/O) interfaces including: an audio-video interface 1607 that couples to the video display 1614, loudspeakers 1617 and microphone 1680; an I/O interface 1613 that couples to the keyboard 1602, mouse 1603, scanner 1626, camera 1627 (representative of the image capture device 100) and optionally a joystick or other human interface device (not illustrated); and an interface 1608 for the external modem 1616 and printer 1615. In some implementations, the modem 1616 may be incorporated within the computer module 1601, for example within the interface 1608. The computer module 1601 also has a local network interface 1611, which permits coupling of the computer system 1600 via a connection 1623 to a local-area communications network 1622, known as a Local Area Network (LAN). As illustrated in FIG. 16A, the local communications network 1622 may also couple to the wide network 1620 via a connection 1624, which would typically include a so-called "firewall" device or device of similar functionality. The local network interface 1611 may comprise an Ethernet circuit card, a Bluetooth® wireless arrangement or an IEEE 802.11 wireless arrangement; however, numerous other types of interfaces may be practiced for the interface 1611.

The I/O interfaces 1608 and 1613 may afford either or both of serial and parallel connectivity, the former typically being implemented according to the Universal Serial Bus (USB) standards and having corresponding USB connectors (not illustrated). Storage devices 1609 are provided and typically include a hard disk drive (HDD) 1610. Other storage devices such as a floppy disk drive and a magnetic tape drive (not illustrated) may also be used. An optical disk drive 1612 is typically provided to act as a non-volatile source of data. Portable memory devices, such optical disks (e.g., CD-ROM, DVD, Blu-ray Disc™), USB-RAM, portable, external hard drives, and floppy disks, for example, may be used as appropriate sources of data to the system 1600.

The components 1605 to 1613 of the computer module 1601 typically communicate via an interconnected bus 1604 and in a manner that results in a conventional mode of operation of the computer system 1600 known to those in the relevant art. For example, the processor 1605 is coupled to the system bus 1604 using a connection 1618. Likewise, the memory 1606 and optical disk drive 1612 are coupled to the system bus 1604 by connections 1619. Examples of computers on which the described arrangements can be practised include IBM-PC's and compatibles, Sun Sparcstations, Apple Mac™ or a like computer systems.

The methods of image depth measurement may be implemented using the computer system 1600 wherein the DFD processes of FIGS. 8 to 13, to be described, may be implemented as one or more software application programs 1633 executable within the computer system 1600. In particular, the steps of the method of depth measurement are effected by instructions 1631 (see FIG. 16B) in the software 1633 that are carried out within the computer system 1600. The software instructions 1631 may be formed as one or more code modules, each for performing one or more particular tasks. The software may also be divided into two separate parts, in which a first part and the corresponding code modules performs the depth measurement methods and a second part and the corresponding code modules manage a user interface between the first part and the user.

The software may be stored in a computer readable medium, including the storage devices described below, for example. The software is loaded into the computer system 1600 from the computer readable medium, and then executed by the computer system 1600. A computer readable medium having such software or computer program recorded on the computer readable medium is a computer program product. The use of the computer program product in the computer system 1600 preferably effects an advantageous apparatus for image depth measurement.

The software 1633 is typically stored in the HDD 1610 or the memory 1606. The software is loaded into the computer system 1600 from a computer readable medium, and executed by the computer system 1600. Thus, for example, the software 1633 may be stored on an optically readable disk storage medium (e.g., CD-ROM) 1625 that is read by the optical disk drive 1612. A computer readable medium having such software or computer program recorded on it is a computer program product. The use of the computer program product in the computer system 1600 preferably effects an apparatus for depth measurement for imaging.

In some instances, the application programs 1633 may be supplied to the user encoded on one or more CD-ROMs 1625 and read via the corresponding drive 1612, or alternatively may be read by the user from the networks 1620 or 1622. Still further, the software can also be loaded into the computer system 1600 from other computer readable media. Computer readable storage media refers to any non-transitory tangible storage medium that provides recorded instructions and/or data to the computer system 1600 for execution and/or processing. Examples of such storage media include floppy disks, magnetic tape, CD-ROM, DVD, Blu-ray™ Disc, a hard disk drive, a ROM or integrated circuit, USB memory, a magneto-optical disk, or a computer readable card such as a PCMCIA card and the like, whether or not such devices are internal or external of the computer module 1601. Examples of transitory or non-tangible computer readable transmission media that may also participate in the provision of software, application programs, instructions and/or data to the computer module 1601 include radio or infra-red transmission channels as well as a network connection to another computer or networked device, and the Internet or Intranets including e-mail transmissions and information recorded on Websites and the like.

The second part of the application programs 1633 and the corresponding code modules mentioned above may be executed to implement one or more graphical user interfaces (GUIs) to be rendered or otherwise represented upon the display 1614. Through manipulation of typically the keyboard 1602 and the mouse 1603, a user of the computer system 1600 and the application may manipulate the interface in a functionally adaptable manner to provide controlling commands and/or input to the applications associated with the GUI(s). Other forms of functionally adaptable user interfaces may also be implemented, such as an audio interface utilizing speech prompts output via the loudspeakers 1617 and user voice commands input via the microphone 1680.

FIG. 16B is a detailed schematic block diagram of the processor 1605 and a "memory" 1634. The memory 1634 represents a logical aggregation of all the memory modules (including the HDD 1609 and semiconductor memory 1606) that can be accessed by the computer module 1601 in FIG. 16A.

When the computer module 1601 is initially powered up, a power-on self-test (POST) program 1650 executes. The POST program 1650 is typically stored in a ROM 1649 of the semiconductor memory 1606 of FIG. 16A. A hardware device such as the ROM 1649 storing software is sometimes referred to as firmware. The POST program 1650 examines hardware within the computer module 1601 to ensure proper functioning and typically checks the processor 1605, the memory 1634 (1409, 1606), and a basic input-output systems software (BIOS) module 1651, also typically stored in the ROM 1649, for correct operation. Once the POST program 1650 has run successfully, the BIOS 1651 activates the hard disk drive 1610 of FIG. 16A. Activation of the hard disk drive 1610 causes a bootstrap loader program 1652 that is resident on the hard disk drive 1610 to execute via the processor 1605. This loads an operating system 1653 into the RAM memory 1606, upon which the operating system 1653 commences operation. The operating system 1653 is a system level application, executable by the processor 1605, to fulfil various high level functions, including processor management, memory management, device management, storage management, software application interface, and generic user interface.

The operating system 1653 manages the memory 1634 (1409, 1606) to ensure that each process or application running on the computer module 1601 has sufficient memory in which to execute without colliding with memory allocated to another process. Furthermore, the different types of memory available in the system 1600 of FIG. 16A must be used properly so that each process can run effectively. Accordingly, the aggregated memory 1634 is not intended to illustrate how particular segments of memory are allocated (unless otherwise stated), but rather to provide a general view of the memory accessible by the computer system 1600 and how such is used.

As shown in FIG. 16B, the processor 1605 includes a number of functional modules including a control unit 1639, an arithmetic logic unit (ALU) 1640, and a local or internal memory 1648, sometimes called a cache memory. The cache memory 1648 typically includes a number of storage registers 1644-1646 in a register section. One or more internal busses 1641 functionally interconnect these functional modules. The processor 1605 typically also has one or more interfaces 1642 for communicating with external devices via the system bus 1604, using a connection 1618. The memory 1634 is coupled to the bus 1604 using a connection 1619.

The application program 1633 includes a sequence of instructions 1631 that may include conditional branch and loop instructions. The program 1633 may also include data 1632 which is used in execution of the program 1633. The instructions 1631 and the data 1632 are stored in memory locations 1628, 1629, 1630 and 1635, 1636, 1637, respectively. Depending upon the relative size of the instructions 1631 and the memory locations 1628-1630, a particular instruction may be stored in a single memory location as depicted by the instruction shown in the memory location 1630. Alternately, an instruction may be segmented into a number of parts each of which is stored in a separate memory location, as depicted by the instruction segments shown in the memory locations 1628 and 1629.

In general, the processor 1605 is given a set of instructions which are executed therein. The processor 1605 waits for a subsequent input, to which the processor 1605 reacts to by executing another set of instructions. Each input may be provided from one or more of a number of sources, including data generated by one or more of the input devices 1602, 1603, data received from an external source across one of the networks 1620, 1622, data retrieved from one of the storage devices 1606, 1609 or data retrieved from a storage medium 1625 inserted into the corresponding reader 1612, all depicted in FIG. 16A. The execution of a set of the instructions may in some cases result in output of data. Execution may also involve storing data or variables to the memory 1634.

The disclosed depth measurement arrangements use input variables 1654, which are stored in the memory 1634 in corresponding memory locations 1655, 1656, 1657. The arrangements produce output variables 1661, which are stored in the memory 1634 in corresponding memory locations 1662, 1663, 1664. Intermediate variables 1658 may be stored in memory locations 1659, 1660, 1666 and 1667.

Referring to the processor 1605 of FIG. 16B, the registers 1644, 1645, 1646, the arithmetic logic unit (ALU) 1640, and the control unit 1639 work together to perform sequences of micro-operations needed to perform "fetch, decode, and execute" cycles for every instruction in the instruction set making up the program 1633. Each fetch, decode, and execute cycle comprises:

(a) a fetch operation, which fetches or reads an instruction 1631 from a memory location 1628, 1629, 1630;

(b) a decode operation in which the control unit 1639 determines which instruction has been fetched; and (c) an execute operation in which the control unit 1639 and/or the ALU 1640 execute the instruction.

Thereafter, a further fetch, decode, and execute cycle for the next instruction may be executed. Similarly, a store cycle may be performed by which the control unit 1639 stores or writes a value to a memory location 1632.

Each step or sub-process in the processes of FIGS. 8 to 13 is associated with one or more segments of the program 1633 and is performed by the register section 1644, 1645, 1647, the ALU 1640, and the control unit 1639 in the processor 1605 working together to perform the fetch, decode, and execute cycles for every instruction in the instruction set for the noted segments of the program 1633.

The method of depth measurement incorporating DFD techniques may alternatively be implemented in whole or part in dedicated hardware such as one or more integrated circuits performing the functions or sub functions to be described. Such dedicated hardware may include graphic processors, digital signal processors, or one or more microprocessors and associated memories.

For example, a camera 1627 may implement the DFD algorithmic processes to be described in hardware or firmware in order to capture pairs of images with different camera parameters and to process the captured images to provide a depth map for various purposes. Such purposes may include artificially blurring the background of portrait photos to achieve a pleasing aesthetic, or attaching depth information as image metadata to enable various post-processing operations. In this case, the camera hardware can capture multiple images of a scene, the images being suitable for application of the DFD processing, processing occurs in the camera's embedded devices, and results would be retained in a memory of the camera or written to a memory card or other memory storage device connectable to the camera.

The capture of multiple images of a scene with different capture parameters may be performed by capturing multiple images with a single user operation (a single depression of a capture button of the camera 1627) which causes one image to be captured and stored, the parameter to be changed, and a further image to be then captured and stored. Such capturing may occur within approximately 0.001-0.5 seconds causing both images to include substantially the same if not identical content and thus substantial common image content upon which image depth processing may then be performed.

In another example, a desktop computer or the like may implement the DFD processing in software to enable post-capture processing of photos to generate depth maps, which a user can use for image segmentation or further image processing operations. In this case, the camera 1627 would capture multiple images of a scene in a traditional fashion, the images being suitable for application of the DFD process, and the images would be retained in memory or written to a memory card or other memory storage device. At a later time, the images would be transferred to the computer (e.g. 1601), where subsequent steps of the DFD process would use them as input.

Other implementations may capture two images with different camera parameters, the varying parameters being one or more of: focus, zoom, aperture, or any other camera setting that influences the amount of blur in the captured image. In the case of some parameters, such as zoom in particular but also focus and potentially other parameters, the magnification of the captured images may be different. In this case one or more of the images may be scaled to bring the images substantially into registration before applying the DFD algorithm to determine depths.

Figure 17A:
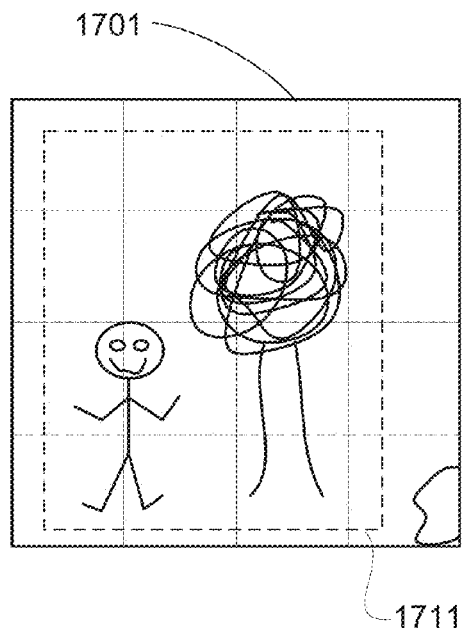
FIGS. 17A, 17B and 17C illustrate example images upon which depth measurements according to the present disclosure may be performed.
Figure 17B:
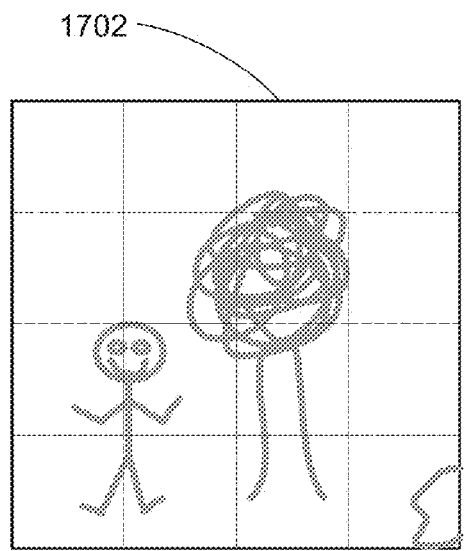

FIGS. 17A and 17B illustrate a first pair of exemplary images 1701 and 1702 respectively upon which the DFD processing may be performed. The scene content captured by the images 1701 and 1702 is identical, but the images 1701 and 1702 capture different image content in view of the image 1702 being captured with at least one camera parameter different to the capture of image 1701. For example, image 1702 may be differently focused relative to the image 1701.

Figure 17C:
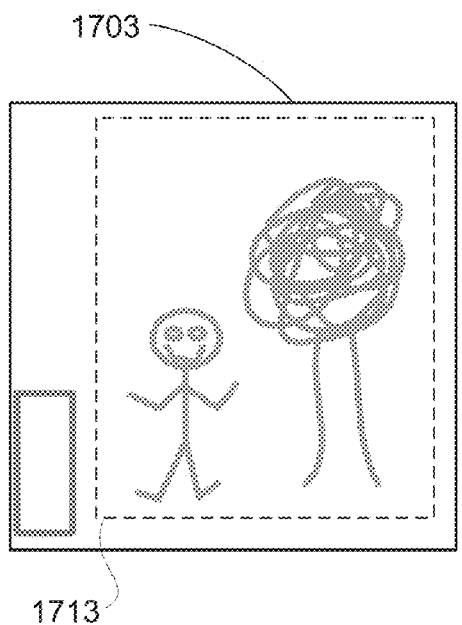

FIGS. 17A and 17C illustrate a second pair of exemplary images 1701 and 1703 respectively upon which DFD processing may also be performed. The scene content captured by the images 1701 and 1703 is not identical in total content, however the images 1701 and 1703 capture a scene that is common, or includes common scene content, to both images.

That common scene content is indicated by dashed rectangles 1711 and 1713 in FIGS. 17A and 17C respectively and shows a person standing adjacent to a tree. The common scene content may appear at different positions within the images 1701 and 1703. The differences in position of the common scene content between the images 1701 and 1703 may result from, for example, slight camera movement between capture of the two images. The image content of images 1701 and 1703 within the regions 1711 and 1713 capturing common scene content may further be different in view of image 1703 being captured with at least one camera parameter different to the capture of image 1701. For example, image 1703 may be differently focused relative to image 1701.

Significantly, in each of FIGS. 17A-17C, a common part of the scene content (being the person adjacent the tree) is captured in each image. Depth map processing may therefore be performed on pairs of the images to determine a depth map for the common part. Note that FIGS. 17B and 17C may also represent an image pair upon which DFD processing may be performed.

Certain implementations may capture more than two images, with one or more pairs of the images used to derive depth using the DFD algorithm.

6. Depth from Defocus Process

Figure 8:
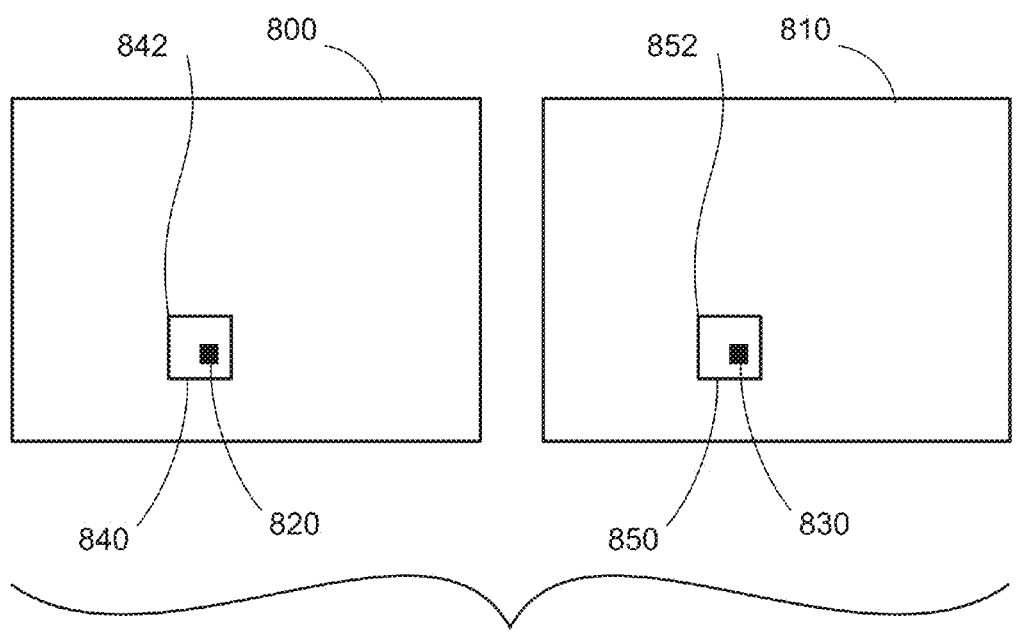
FIG. 8 is a diagram illustrating the correspondence between pixels and image patches within a first image and a second image of a scene.

A method of extracting a depth map from two images of a scene will now be described in detail with reference to FIG. 8 and FIG. 9 and the arrangements of FIGS. 16A and 16B where substantive processing occurs within the computer 1601. FIG. 8 illustrates a first image 800 of a scene and a second image 810 of the same scene (not illustrated). A selected pixel 820 in the first image 800 is highlighted and a corresponding selected pixel 830 in the second image 810 is highlighted. The correspondence is such that the selected pixel 820 in the first image 800 and the selected pixel 830 in the second image 810 largely correspond to the same point in the scene being imaged. This may be achieved in practice by ensuring that no objects in the scene move in the time between the exposures used to capture the first image 800 and the second image 810 and also that the camera 1627 which captures the images 800 and 810 does not move in the time between the exposures, and then selecting pixels from the same (x, y) coordinates on the image sensor. It may also be achieved by an alignment process which explicitly determines which pixels in the first image 800 correspond to pixels in the second image 810. This alignment may address issues such as motion of objects within the scene between the two exposures, motion of the camera 1627 between the two exposures, and changes in the magnification or distortion or both between the two exposures. The alignment may be global across the entire images 800 and 810, local within subregions of the images 800 and 810, or both. Many such alignment processes are known to those skilled in the art.

Also shown in FIG. 8 are two image patches, which are subsets of the pixels in each image. The first image patch 840 is from the first image 800 and is referred to as $f_1$. The second image patch 850 is from the second image 810 and is referred to as $f_2$. The first patch $f_1$ 840 is defined with reference to the first selected pixel 820 in the first image 800 such that the first selected pixel 820 occurs at coordinates $(x_1, y_1)$ with respect to a pixel 842 at the upper left corner of the first patch $f_1$ 840. The second patch $f_2$ 850 is defined with reference to the selected pixel 830 in the second image 810 such that the selected pixel 830 occurs at coordinates $(x_2, y_2)$ with respect to a pixel 852 at the upper left corner of the second patch $f_2$ 850, where $(x_2, y_2) = (x_1, y_1)$. In alternative implementations it may be the case that $(x_2, y_2) \neq (x_1, y_1)$. The patches should be the same size to ensure appropriate comparison of image content contained therein.

In an alternative implementation, the image patches 840 and 850 may be defined such that the pixels 842 and 852 are located at the same pixel coordinates (x, y) within the images 800 and 810 respectively, regardless of any misalignment of the image content of the images.

Returning to FIGS. 17A to 17C, the patches may be formed by simple division of the images or parts of the images into blocks. In the example of the image pair 1701 and 1702 shown in FIGS. 17A and 17B respectively, the image content is sufficiently aligned that the patches may be formed by dividing the images into a 4×4 configuration of blocks. In the example of the image pair 1701 and 1703 shown in FIGS. 17A and 17C respectively, the regions 1711 and 1713 showing common scene content may be divided into patches in a similar blockwise manner (not illustrated). Alternatively, the patches may be formed in a manner such that the patches vary in size across the images.

Figure 9:
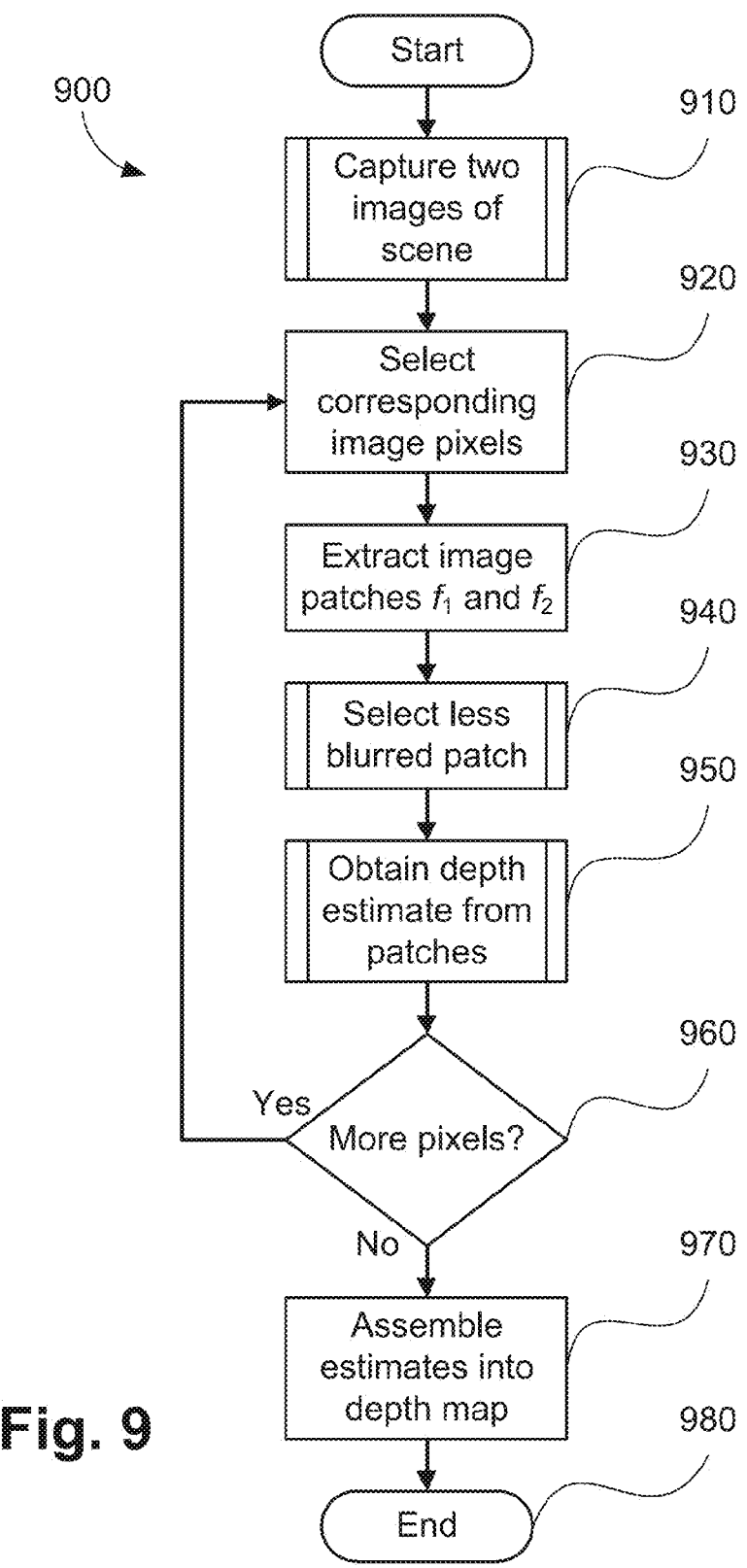
FIG. 9 is a schematic flow diagram illustrating an exemplary method of determining a depth map from two images of a scene, according to the present disclosure.

FIG. 9 illustrates a depth mapping process 900 in which a depth map is determined using a DFD method. In an image capture step 910, two images 800 and 810 of a scene are captured by an image capture device 100, such as the camera 1627. The images 800 and 810 should include image content of a common part of the scene content. For example, with reference to FIG. 1 the common part could be the object 140. In FIGS. 17A and 17C the common part is the person next to the tree, whereas in FIGS. 17A and 17B, the common part is the entirety of the images. The images are captured with at least one of the camera parameters of focus, aperture, zoom, or some other parameter that influences the amount of blur in the image, being different between the images. Ideally the images are captured such that any motion of the objects in the scene and any relative motion of the camera 1627 with respect to the scene is minimised. For example, with reference to FIGS. 17A and 17C, which are representative of such relative motion, an alignment process may be performed on the two images to provide that the common parts as found in each image are appropriately aligned prior to DFD processing. This may involve, for example, aligning the image data within the rectangles 1711 and 1713 with each other, or cropping the images to those rectangles.

Figure 10:
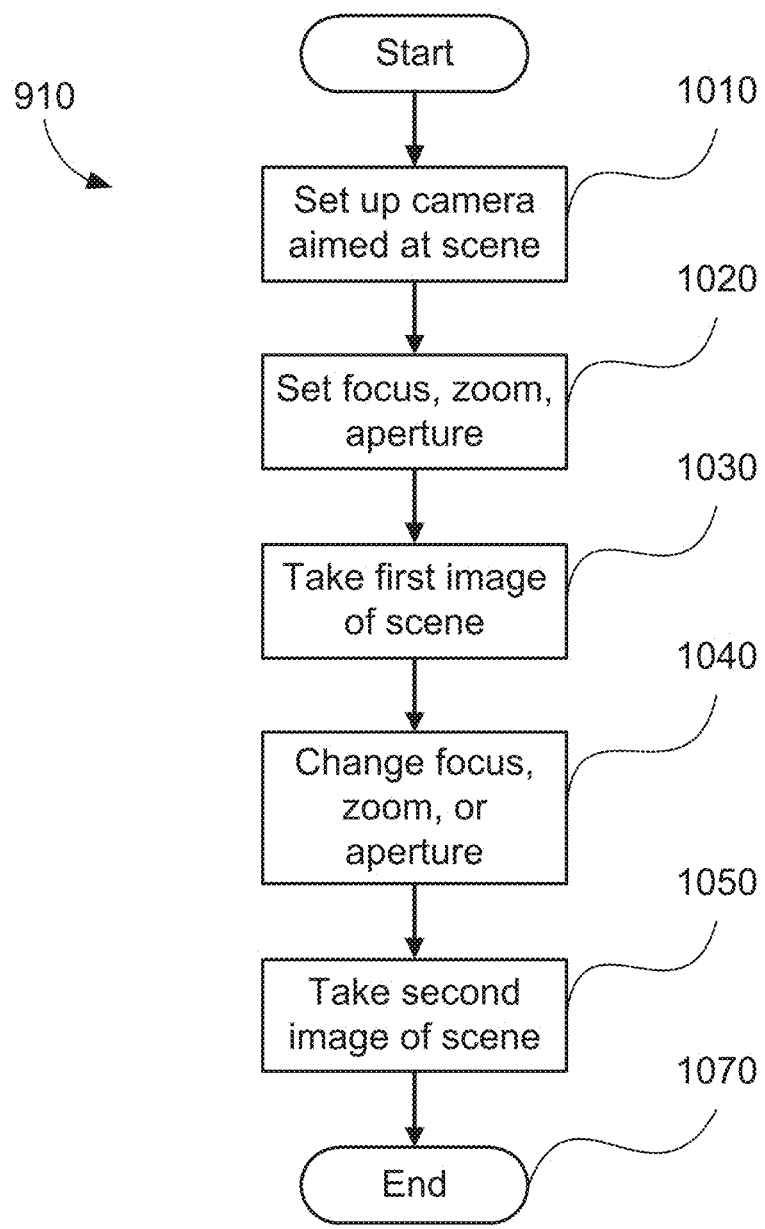
FIG. 10 is a schematic flow diagram illustrating one example of a method of capturing two images as used in the method of FIG. 9.

A specific implementation of the image capture step 910 is described in more detail below with reference to FIG. 10. Typically the images 800 and 810 are captured by the camera 1627 and communicated to and received by the computer 1601 for storage in one or both of the HDD 1610 and memory 1606. Where the process 900 is performed within the camera 1627, the images 800 and 810 are stored in a memory of the camera 1627 for subsequent processing by an embedded processor thereof.

Steps 920-980 of the process 900 in the present implementation are preferably embodied in and implemented by software, for example stored on the HDD 1610 and executable by the processor 1605 in concert with the memory 1606. In a pixel selection step 920 which follows the capture step 910, the corresponding pixels 820 and 830 of the two images 800 and 810 are selected and received by the processor 1605 from the memory 1606. A patch extraction step 930 then follows in which an image patch $f_1$ 840 is extracted from the first image 800 and a corresponding image patch $f_2$ 850 is extracted from the second image 810 by operation of the processor 1605. The first image patch $f_1$ 840 is defined at least by the location of the first selected pixel 820 in the first image 800. The second image patch $f_2$ 850 is defined at least by the location of the second selected pixel 830 in the second image 810. The first and second selected pixels should lie in a portion of the images representing a common part of the scene captured by both images, and largely correspond to an identical point in the scene content.

In an asymmetric patch selection step 940 which then follows, a determination is made regarding which of the patches $f_1$ or $f_2$ is the less blurred patch of the two. Details of a specific implementation of the asymmetric patch selection step 940 will be described below with reference to FIG. 11.

A depth estimation step 950 is then performed in which a depth estimate is determined by the processor 1605 processing the pixel data in the first patch $f_1$ 840 and the second patch $f_2$ 850. The depth estimations are typically stored in the memory 1606. The details of an implementation of the depth estimation step 950 will be described below with reference to FIG. 12.

A pixel decision step 960 then follows where a decision is made by the processor 1605 on whether there remain any pixels in the first image 800 and the second image 810 that have not yet been selected in the pixel selection step 920. If there remain pixels that have not yet been selected, the depth mapping process 900 returns to the pixel selection step 920. In practice, the pixels may be selected in a systematic order such as by iterating along the rows and down the columns of the first image $f_1$ 800. Accordingly, the steps 920-960 proceed for a current patch of all the patches desired to be processed for depth mapping purposes. Each current patch represents a current part of the common part of the scene captured by the images. In some instances, for example the image pair of FIGS. 17A and 17B, because all is common, image patches may span the entirety of the images. In an alternative approach, only a subset of the pixels of the first image $f_1$ 800 may be chosen to be selected, for example by the processor 1605 subsampling the image by selecting only pixels occurring in rows and columns whose pixel coordinate indices are divisible by some integer. In another alternative, a subset of pixels of the first image $f_1$ 800 may be chosen to be selected to avoid any of the resulting patches from covering areas outside the images, thus avoiding any edge effects. In yet another alternative, a subset of pixels of the first image $f_1$ 800 may be chosen to be selected by some other means. Once all required pixels have been selected ('NO' in step 960), the depth mapping process 900 continues to an assembly step 970.

In the assembly step 970, the depth estimates calculated in the depth estimation step 950 are assembled by the processor 1605 to produce a depth map of the scene captured by the image capture device 100. The depth estimates are desirably assembled into an image such that there is a geometric correspondence between the pixel locations of each pixel selected in the pixel selection step 920 and the depth estimate calculated from that pixel in the depth estimation step 950. For example, if the first image 800 is 100×100 pixels and all of the pixels are selected by iterating across rows and down columns, then the consecutive depth estimates can be assembled by placing them into an image 100×100 pixels in size by inserting the depth estimates into successive pixels iterating across rows and down columns. Such reveals a depth map image that may be stored by the processor 1605 in the memory 1606 or HDD 1610. In an alternative implementation the assembly step 970 may be skipped and the depth estimates stored in the memory 1606 may be passed directly as a stream output of the process 900 for use as input to other processes that may be executable within the computer 1601.

The depth mapping process 900 then ends at end step 980.

6.1 Image Capture

One example of the image capture step 910 will now be described with reference to FIG. 10. In a camera set up step 1010, the image capture device 100 (camera 1627) is aimed at the desired scene. This can be done for example by aiming a hand-held camera, or by setting up a camera on a tripod.

In a camera setting step 1020, various settings associated with the image capture device are set. This refers to settings that have some effect on the amount of blur recorded in the image and includes setting the lens focus position, the zoom position of the lens if it is capable of zooming, and the aperture of the lens. Other image capture device settings which change the amount of blur in the image are possible. These settings may be performed manually by the operator, or automatically by control software executing within the camera based on the scene to be captured.

A first image taking step 1030 then follows, where a (first) image of the scene is captured using the settings set in the camera setting step 1020.

A camera setting change step 1040 follows where the settings of the image capture device are changed from the values set in the camera setting step 1020. This may involve changing one or more of: the lens focus position, the lens zoom position, the lens aperture setting, and any other setting which affects the amount of blur recorded in the image. This change may be performed manually or by the camera control software.

In a second image taking step 1050, a (second) image of the scene is captured using the settings set in the camera setting change step 1040. The image capture process 910 then ends at end step 1070.

In one implementation, the first image taking step 1030, the camera setting change step 1040, and the second image taking step 1050 are performed automatically by the image capture device 100 in response to a single activation of an image capture function of the device 100, for example pressing the shutter button on a camera.

6.2 Asymmetric Patch Selection

Figure 11:
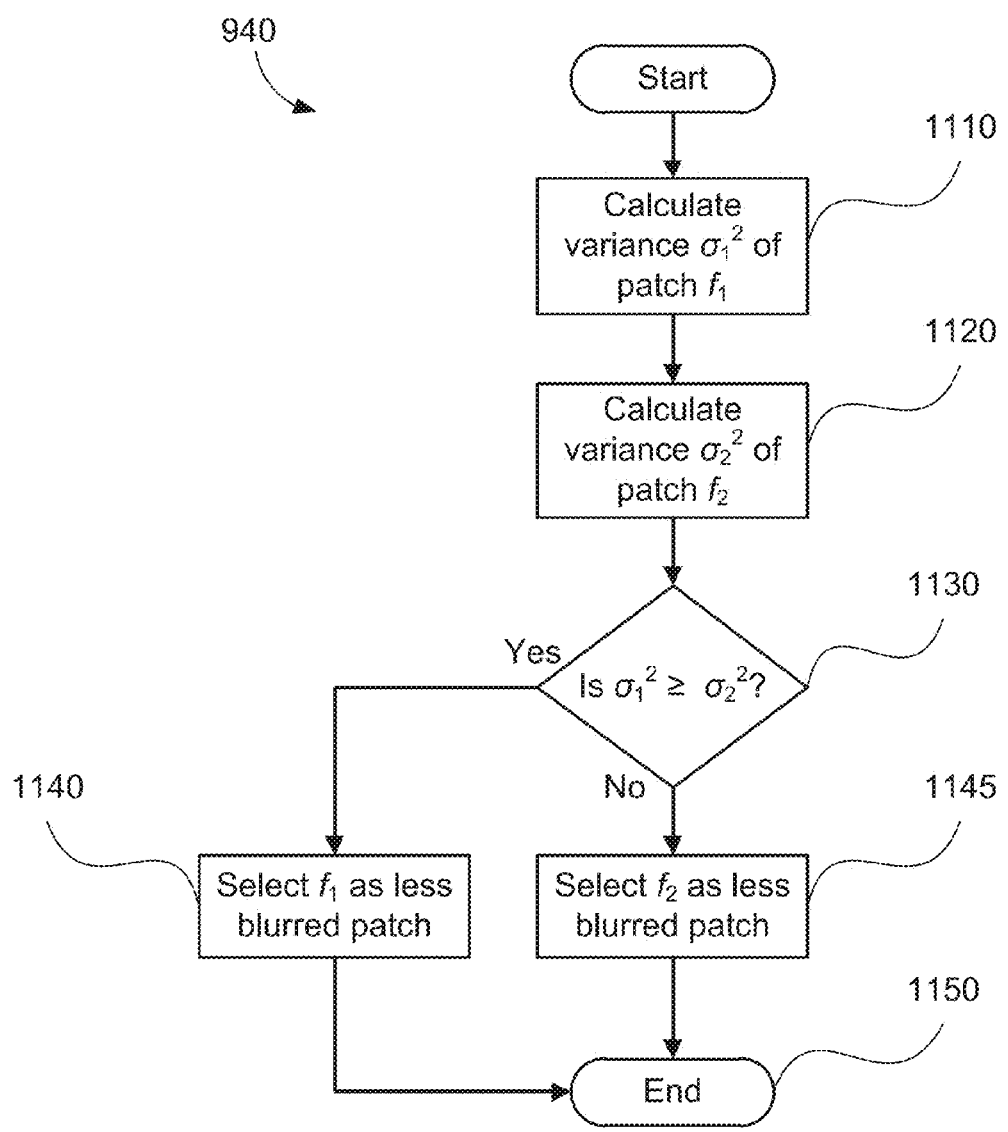
FIG. 11 is a schematic flow diagram illustrating one example of a method of asymmetrical patch selection as used in the method of FIG. 9.

One implementation of the asymmetric patch selection step 940 will now be described with reference to FIG. 11. The asymmetric patch selection process 940 begins with the first image patch $f_1$ 840 and the second image patch $f_2$ 850 as data inputs.

In a first variance calculation step 1110, the variance $\sigma_1^2$ of the pixel values in the patch $f_1$ 840 is calculated, using the well-known definition of variance. In a second variance calculation step 1120, the variance $\sigma_2^2$ of the pixel values in the patch $f_2$ 850 is calculated.

In a variance comparison step 1130, the variance $\sigma_1^2$ of the pixel values in patch $f_1$ 840 is compared to the variance $\sigma_2^2$ of the pixel values in patch $f_2$ 850. If the variance $\sigma_1^2$ of the pixel values in patch $f_1$ 840 is greater than or equal to the variance $\sigma_2^2$ of the pixel values in patch $f_2$ 850, processing continues with a first patch selection step 1140. On the other hand, if the variance $\sigma_1^2$ of the pixel values in patch $f_1$ 840 is less than the variance $\sigma_2^2$ of the pixel values in patch $f_2$ 850, processing continues to a second patch selection step 1145.

In the first patch selection step 1140, patch $f_1$ is selected as the less blurred patch.

In the second patch selection step 1145, patch $f_2$ is selected as the less blurred patch. The asymmetric patch selection process 940 then ends at end step 1150.

Other approaches to performing the asymmetric patch selection step 940 are possible. For example, the patches may first be smoothed using a filter to reduce the effects of outlying pixel values caused by imaging noise. The variances of the filtered patches may then be calculated, and the patch with the highest variance after filtering may then be selected as the less blurred patch. In another example, a two-dimensional gradient operator, such as the Laplacian operator, may be applied to the patches, and then the patch with the greatest range of pixel values (i.e. maximum pixel value minus minimum pixel value) in the Laplacian gradient image may be selected as the less blurred patch. In another example, it may be known that the two images 800 and 810 were captured with the aperture value being the only parameter changed between the captures, in which case the patch from the image captured with the narrower aperture may simply be selected as the less blurred patch.

6.3 Depth Estimation Using Adaptive Spectral Weighting and Parabolic Fit

Figure 12:
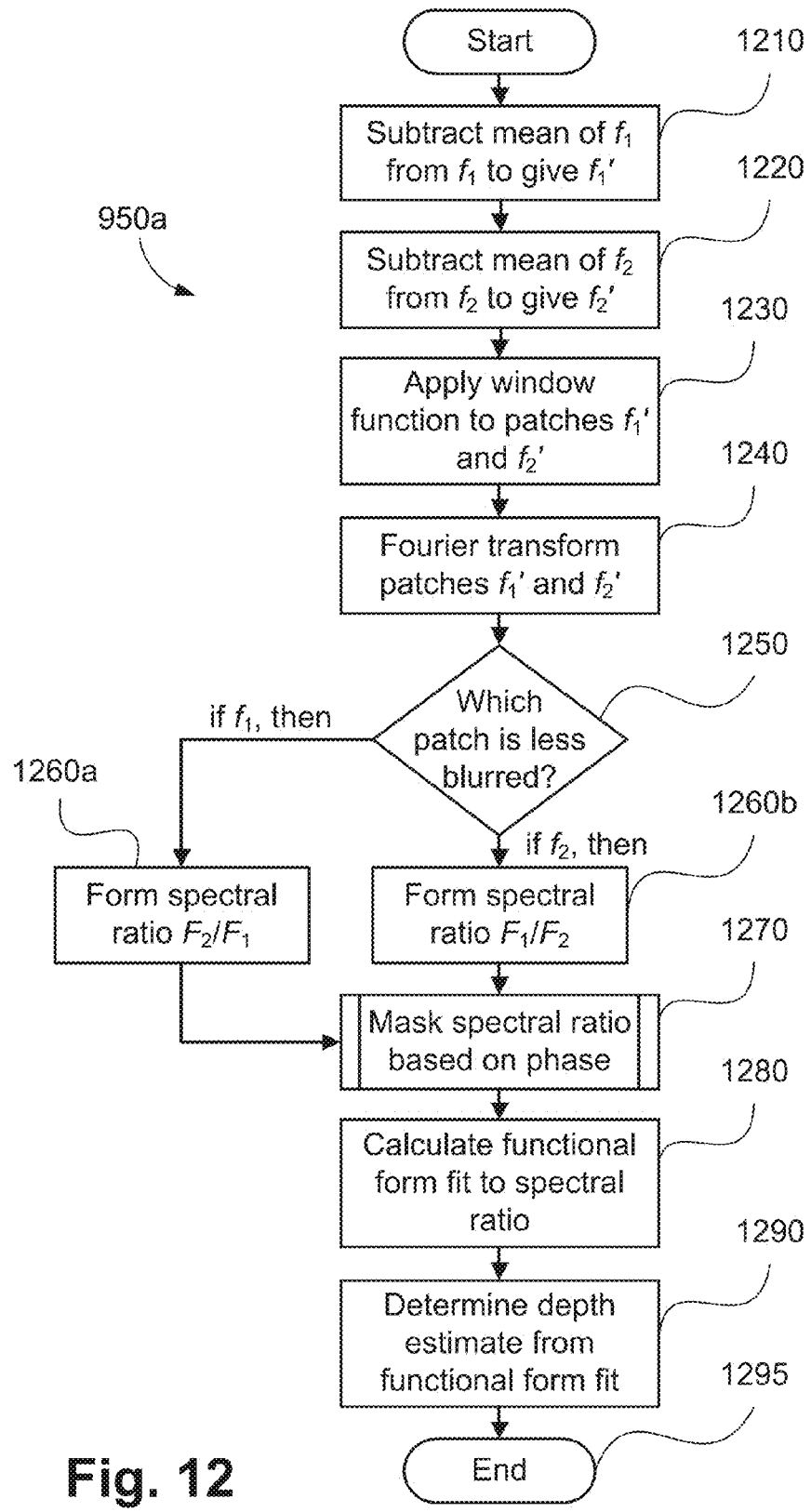
FIG. 12 is a schematic flow diagram illustrating one example of a method of determining a depth estimate from two corresponding patches of two images of a scene as used in the method of FIG. 9.

One implementation 950a of the depth estimation step 950 will now be described with reference to FIG. 12. The depth estimation process 950a begins with the image patch $f_1$ 840 and the image patch $f_2$ 850 as data inputs. In a first zero mean step 1210, the mean value of the pixel values in the first patch $f_1$ is calculated, and this mean value is then subtracted from the pixel values of all of the pixels in the first patch $f_1$. The result of this calculation is a first zero mean patch, designated $f_1'$.

In a second zero mean step 1220, the mean value of the pixel values in the second patch $f_2$ is calculated, and this mean value is then subtracted from the pixel values of all of the pixels in the second patch $f_2$. The result of this calculation is a second zero mean patch, designated $f_2'$.

In a windowing step 1230, the patches $f_1'$ and $f_2'$ are windowed using a window function that falls to zero or some small value near the edges of the patches. Example window functions include Hann windows, Hamming windows, and similar functions known to those skilled in the art.

A Fourier transform step 1240 follows in which the windowed patches $f_1'$ and $f_2'$ are Fourier transformed, for example using a Fast Fourier Transform (FFT) algorithm, to form Fourier transformed image patches $F_1$ and $F_2$ respectively. The Fourier transformed image patches $F_1$ and $F_2$ will contain complex number values at each pixel.

A blur determination step 1250 follows where reference is made to which of the patches $f_1$ or $f_2$ was selected as the less blurred patch in asymmetric patch selection step 940. If the image patch $f_1$ 840 was selected as the less blurred patch, the depth estimation process 950a continues to a first spectral ratio step 1260a. On the other hand, if the image patch $f_2$ 850 was selected as the less blurred patch, the depth estimation process 950a continues to a second spectral ratio step 1260b.

In the first spectral ratio step 1260a, the Fourier transformed patches $F_1$ and $F_2$ are divided pixel-wise to form the spectral ratio image patch $F_2/F_1$, using complex number division. In the second spectral ratio step 1260b, the Fourier transformed patches $F_1$ and $F_2$ are divided pixel-wise to form the spectral ratio image patch $F_1/F_2$, using complex number division. In both of the spectral ratio steps 1260a and 1260b, the DC pixel in the spectral ratio is a special case and is set to unity. In both of the spectral ratio steps 1260a and 1260b, the Fourier transformed patch in the denominator of the formed ratio is the Fourier transformed patch of the image patch determined to be the least blurred. As such, a combination of data from the first and second patches is used to calculate at least one Fourier transform value which in turn is based on the determination in the asymmetric patch selection step 940 of which of the patches is the more focussed image patch.

In a variant of the first spectral ratio step 1260a, the moduli of the Fourier transformed patches $F_1$ and $F_2$ are divided pixel-wise to form the modulus component $|F_2|/|F_1|$ of an arctan spectral ratio, and the phases of the Fourier transformed patches $F_1$ and $F_2$ are subtracted pixel-wise to form the phase component $\arg(F_2)-\arg(F_1)$ of an arctan spectral ratio, then the modulus component and phase component are combined to form a complex-valued arctan spectral ratio image patch $|F_2|/|F_1|\exp(i(\arg(F_2)-\arg(F_1)))$. In a variant of the first spectral ratio step 1260b, the moduli of the Fourier transformed patches $F_1$ and $F_2$ are divided pixel-wise to form the modulus component $|F_1|/|F_2|$ of an arctan spectral ratio, and the phases of the Fourier transformed patches $F_1$ and $F_2$ are subtracted pixel-wise to form the phase component $\arg(F_1)-\arg(F_2)$ of an arctan spectral ratio, then the modulus component and phase component are combined to form a complex-valued arctan spectral ratio image patch $|F_1|/|F_2|\exp(i(\arg(F_1)-\arg(F_2)))$. In both of the variant spectral ratio steps 1260a and 1260b, the DC pixel in the spectral ratio is a special case and is set to unity.

A weighting step 1270 is then performed, where the pixels in the spectral ratio formed from the two image patches 840 and 850 are assigned weights. Thus step 1270 takes as input the current spectral ratio determined from step 1260a or 1260b. The weights are numbers, typically in the range 0 to 1, assigned so that each pixel has its own weight. This results in the formation of a single masked spectral ratio based on the phase. Details of four implementations of weighting step 1270 will be described below with reference to FIGS. 13, 14, 15, and 22.

In a functional form fitting step 1280, a two-dimensional function is fitted to the pixels of the masked spectral ratio, thus taking account of the weights assigned in weighting step 1270. Many such weighted fitting methods are known in the art, one example being a weighted least squares fit. The functional form of the two-dimensional function is preferably one with a single parameter to be determined, for example a paraboloid of the form $1+a(x^2+y^2)$, where a is the parameter to be determined. Other functional forms may be used, for example Gaussian functions such as $\exp(-a(x^2+y^2))$, or Bessel functions such as $J_0(a(x^2+y^2))$.

In a depth determination step 1290, the functional form fit parameter or parameters calculated in functional form fitting step 1280, combined with the determination of which patch is less blurred as determined in asymmetric patch selection step 940, are used to determine a depth estimate for the image patches $f_1$ and $f_2$. This can be done using the set of camera parameters used to capture the images and either using a theoretical model relating the functional form fit parameter or parameters to the depth of the object in the scene shown in the image patches for the camera parameters, or by reference to a calibration look-up table which lists depth versus functional form fit parameter or parameters for the camera parameters. The calibration look-up table may be assembled using either theoretical or experimental results. For example, a theoretical calibration can be compiled by simulating the OTF for a range of object distances and camera parameters, calculating the resulting functional form fit parameter or parameters for a range of object distances and camera parameters, and storing the simulated functional form fit parameter or parameters in a look-up table. Then the closest match between the look-up table values and the functional form fit parameter or parameters calculated from two image patches can be used as an estimate of the depth to the object shown in the image patches.

In another example of step 1290, an experimental calibration can be compiled by placing an object at a range of different distances from a camera, taking two photos of the object at each position with different camera parameters, calculating the functional form fit parameter or parameters of image patches showing the object, and storing the functional form fit parameters in a look-up table referenced by distance to the object.

Optionally in step 1290, a confidence measure for the determined depth estimate may be calculated. The confidence measure may be a function of the pixel weights calculated in step 1270 or the functional form calculated in step 1280, or both. An example of a confidence measure is the number of pixels assigned a weight of 1 in step 1270. Another example of a confidence measure is the RMS residual of the functional form fitted to the pixels of the spectral ratio in step 1280. The residuals at each pixel may be weighted by a function of the weights assigned in step 1270.

The depth estimation process 950a then ends at end step 1295.

6.4 Adaptive Spectral Weighting with Zero Phase Condition

Figure 13:
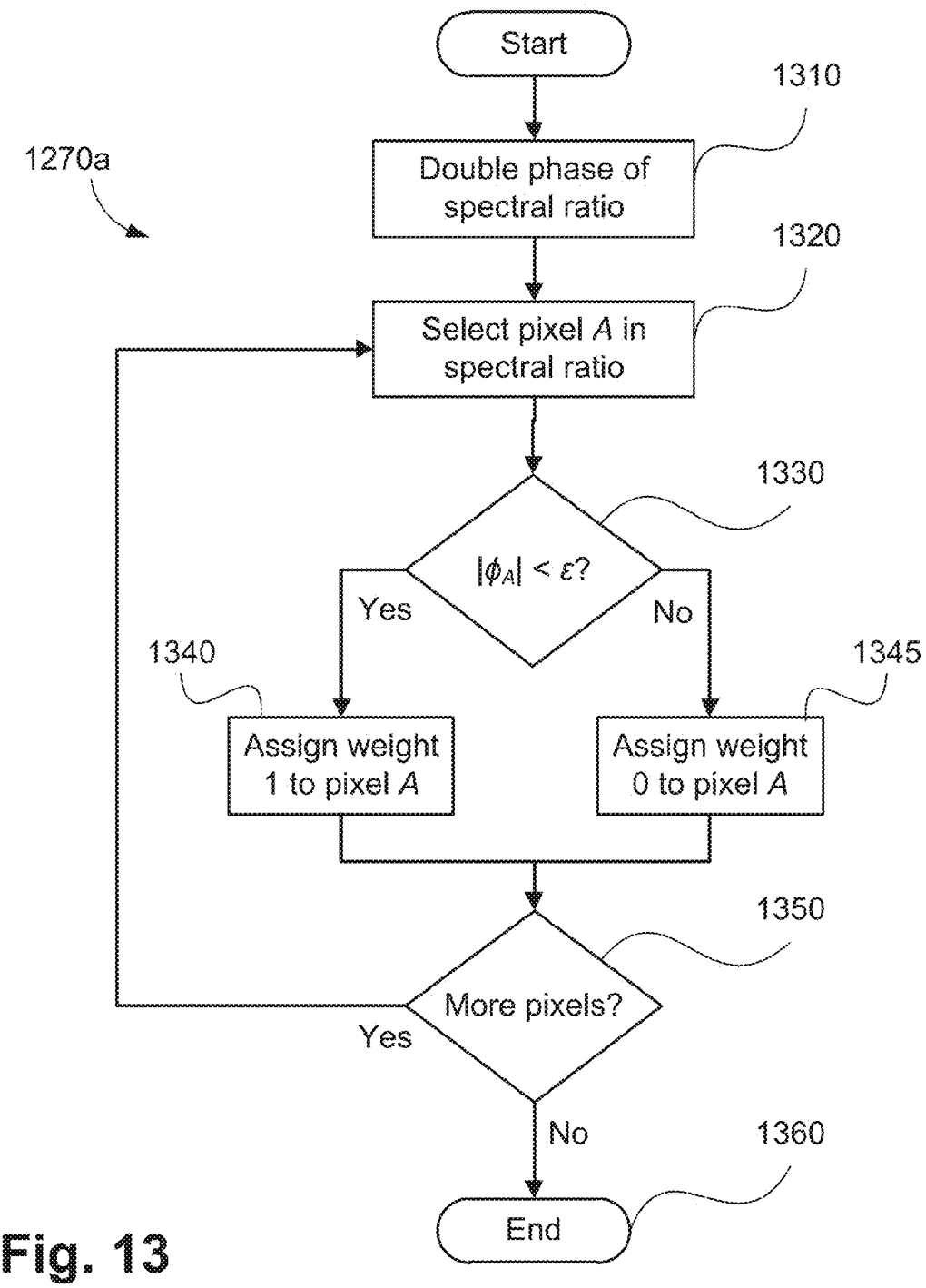
FIG. 13 is a schematic flow diagram illustrating one example of a method of assigning weights to pixels of a spectral ratio as used in the method of FIG. 9 or FIG. 19.

One implementation 1270a of weighting step 1270 will now be described with reference to FIG. 13. The weighting process 1270a begins with the spectral ratio calculated in step 1260a or 1260b as an input.

In a phase doubling step 1310, the phase of every pixel in the spectral ratio is multiplied by 2, without modifying the magnitudes and respecting the wrapping of phase angle within the range −π to +π radians. For example a phase angle of 3 radians would become 6−π, or approximately 2.858 radians after this operation. In a variation of the implementation 1270a of the weighting step 1270, the phase doubling step 1310 is omitted.

In a spectral ratio pixel selection step 1320, a pixel A in the spectral ratio is selected from amongst the pixels not already assigned a weight by the weighting process 1270a.

In a phase decision step 1330, the phase $\phi_A$ of the selected pixel A is examined to see whether the pixel A satisfies the condition that the absolute value of the phase $\phi_A$ is less than some pre-determined threshold value ε. If the pixel A satisfies this condition, processing continues to a first weighting step 1340, otherwise processing continues to an alternate weighting step 1345.

In the first weighting step 1340, the pixel A is assigned a weight of 1. In the alternate weighting step 1345, the pixel A is assigned a weight of 0. Following either weighting step 1340 or 1345, processing continues with a pixel decision step 1350.

In the pixel decision step 1350 a decision is made on whether there remain any pixels in the spectral ratio that have not yet been selected in the spectral ratio pixel selection step 1320. If there remain pixels that have not yet been selected, the weighting process 1270a returns to the pixel selection step 1320. In practice, the pixels may be selected in a systematic order such as by iterating along the rows and down the columns of the spectral ratio patch. If no pixels remain to be selected, the weighting process 1270a ends at end step 1360.

6.5 Adaptive Spectral Weighting with Phase Continuity Condition

Figure 14:
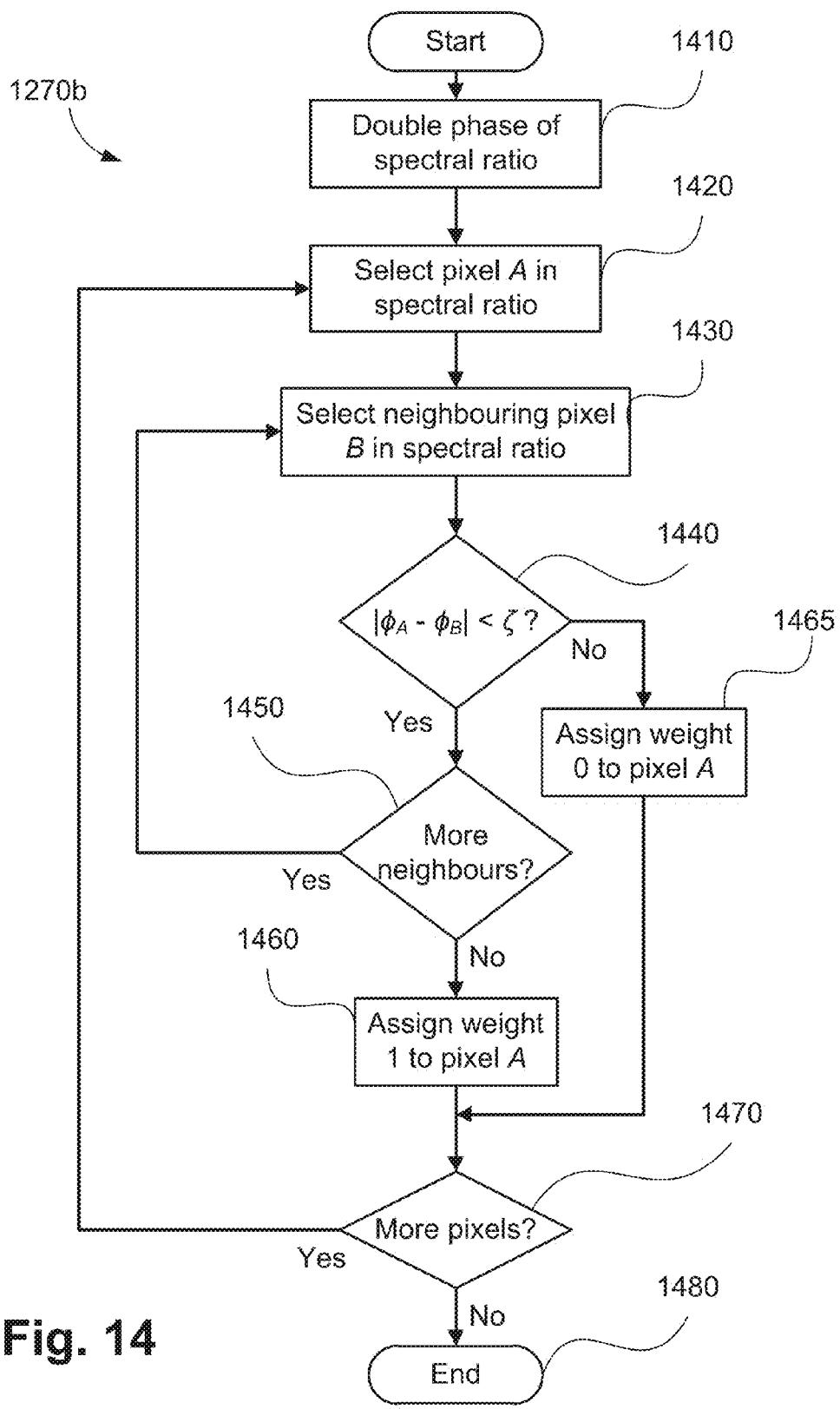
FIG. 14 is a schematic flow diagram illustrating another example of a method of assigning weights to pixels of a spectral ratio as used in the method of FIG. 9 or FIG. 19.

Another implementation 1270b of weighting step 1270 will now be described with reference to FIG. 14. The weighting process 1270b begins with the spectral ratio calculated in step 1260a or 1260b as an input.

In a phase doubling step 1410, the phase of every pixel in the spectral ratio is multiplied by 2, without modifying the magnitudes and respecting the wrapping of phase angle within the range −π to +π radians. For example a phase angle of 3 radians would become 6−π, or approximately 2.858 radians after this operation. In a variation of the implementation 1270b of weighting step 1270, the phase doubling step 1410 is omitted.

In a spectral ratio pixel selection step 1420, a pixel A in the spectral ratio is selected from amongst the pixels not already assigned a weight by the weighting process 1270b.

In a neighbouring pixel selection step 1430, a pixel B in the spectral ratio that is a neighbour of the pixel A is selected. By preference, a pair of pixels are defined as being neighbours if they are immediately adjacent in the x direction or in they direction. Other methods of defining whether pixels are adjacent are possible. For example: if they are immediately adjacent in the x direction or in they direction or in a diagonal direction; or if they are within a predetermined number of pixels of one another measured using Euclidean distance, L1 distance, or some other distance metric.

In a phase decision step 1440, the phase $\phi_A$ of the selected pixel A is examined to see whether it satisfies the condition that the absolute value of the difference in phases between pixel A and pixel B, $|\phi_A - \phi_B|$, is less than some pre-determined threshold value ζ. If the pixel A satisfies this condition, processing continues with the neighbour decision step 1450, otherwise processing continues with an alternate weighting step 1465.

In a neighbour decision step 1450, a decision is made on whether there remain any pixels which are neighbours of pixel A that have not yet been selected in the neighbouring pixel selection step 1430. If there remain neighbouring pixels that have not yet been selected, the weighting process 1270b returns to the neighbouring pixel selection step 1430, otherwise processing continues with a first weighting step 1460.

In the first weighting step 1460, the pixel A is assigned a weight of 1. In the alternate weighting step 1465, the pixel A is assigned a weight of 0. Following either weighting step, processing continues with a pixel decision step 1470.

In the pixel decision step 1470 a decision is made on whether there remain any pixels in the spectral ratio that have not yet been selected in the spectral ratio pixel selection step 1420. If there remain pixels that have not yet been selected, the weighting process 1270b returns to the pixel selection step 1420. In practice, the pixels may be selected in a systematic order such as by iterating along the rows and down the columns of the spectral ratio patch. If no pixels remain to be selected, the weighting process 1270b ends at end step 1480.

6.6 Adaptive Spectral Weighting with Phase Curvature Condition

Figure 22:
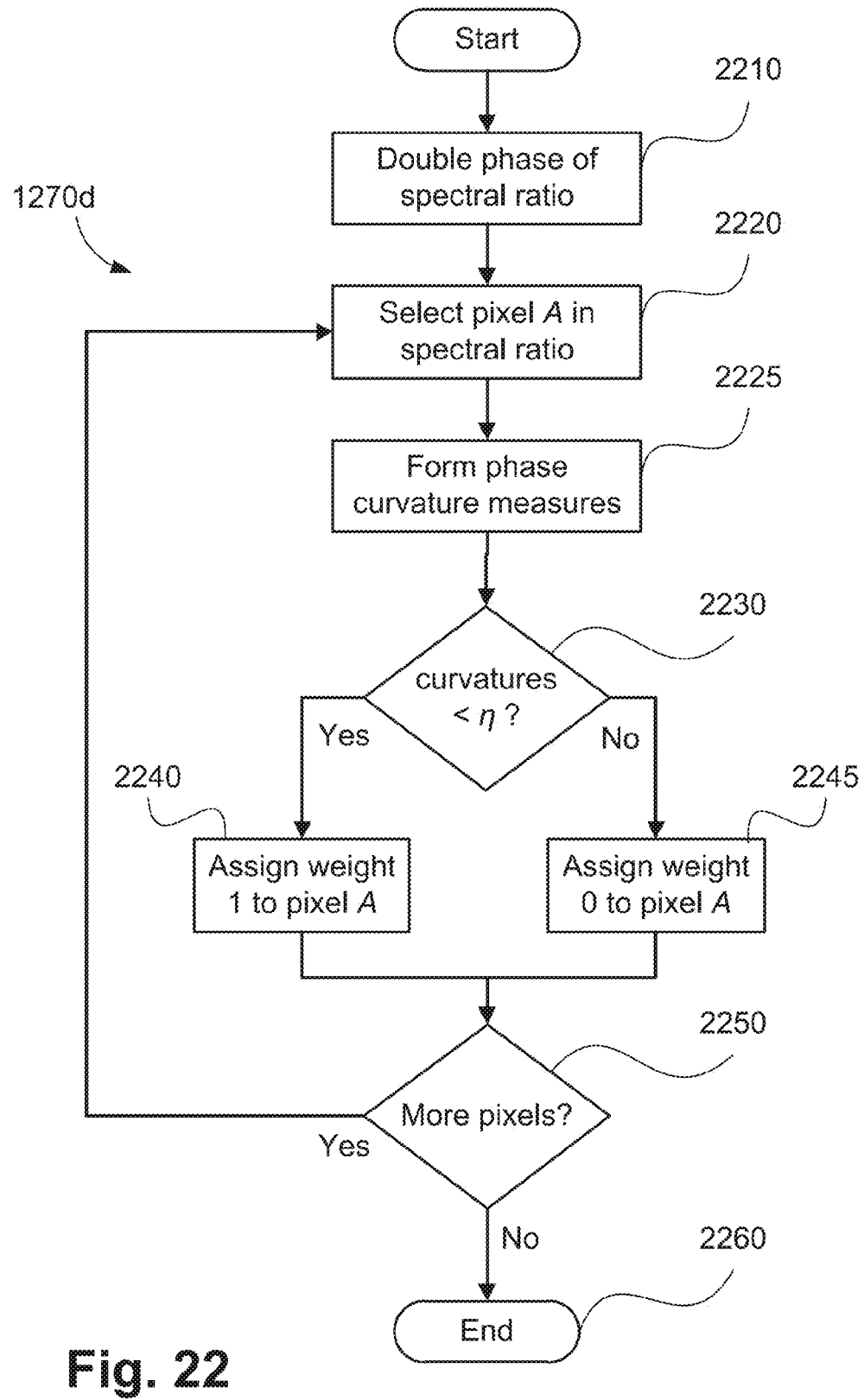
FIG. 22 is a schematic flow diagram illustrating another example of a method of assigning weights to pixels of a spectral ratio as used in the method of FIG. 9 or FIG. 19.

One implementation 1270d of weighting step 1270 will now be described with reference to FIG. 22. The weighting process 1270d begins with the spectral ratio calculated in step 1260a or 1260b as an input.

In a phase doubling step 2210, the phase of every pixel in the spectral ratio is multiplied by 2, without modifying the magnitudes and respecting the wrapping of phase angle within the range −π to +π radians. For example a phase angle of 3 radians would become 6−π, or approximately 2.858 radians after this operation. In a variation of the implementation 1270d of the weighting step 1270, the phase doubling step 2210 is omitted.

In a spectral ratio pixel selection step 2220, a pixel A in the spectral ratio is selected from amongst the pixels not already assigned a weight by the weighting process 1270d.

In a phase curvature measure step 2225, one or more measures of phase curvature at the pixel A are formed. An example phase curvature in the x direction is the value given by $|\phi_W + \phi_X - 2\phi_A|$, where $\phi_W$, $\phi_X$, and $\phi_A$ are the phases of pixels W 2110, X 2120, and A 2100 respectively as defined with reference to FIG. 21. An example phase curvature in the y direction is the value given by $|\phi_Y + \phi_Z - 2\phi_A|$, where $\phi_Y$, $\phi_Y$, and $\phi_A$ are the phases of pixels Y 2130, Z 2140, and A 2100 respectively as defined with reference to FIG. 21.

In a phase curvature decision step 2230, the one or more phase curvatures formed in phase curvature measure step 2225 are examined to see whether the values of the phase curvatures are less than some pre-determined threshold value η. If the pixel A satisfies this condition, processing continues to a first weighting step 2240, otherwise processing continues to an alternate weighting step 2245.

In the first weighting step 2240, the pixel A is assigned a weight of 1. In the alternate weighting step 2245, the pixel A is assigned a weight of 0. Following either weighting step 2240 or 2245, processing continues with a pixel decision step 2250.

In the pixel decision step 2250 a decision is made on whether there remain any pixels in the spectral ratio that have not yet been selected in the spectral ratio pixel selection step 2220. If there remain pixels that have not yet been selected, the weighting process 1270*d* returns to the pixel selection step 2220. In practice, the pixels may be selected in a systematic order such as by iterating along the rows and down the columns of the spectral ratio patch. If no pixels remain to be selected, the weighting process 1270*d* ends at end step 2260.

6.7 Adaptive Spectral Weighting with Phase-based Weighting

Figure 15:
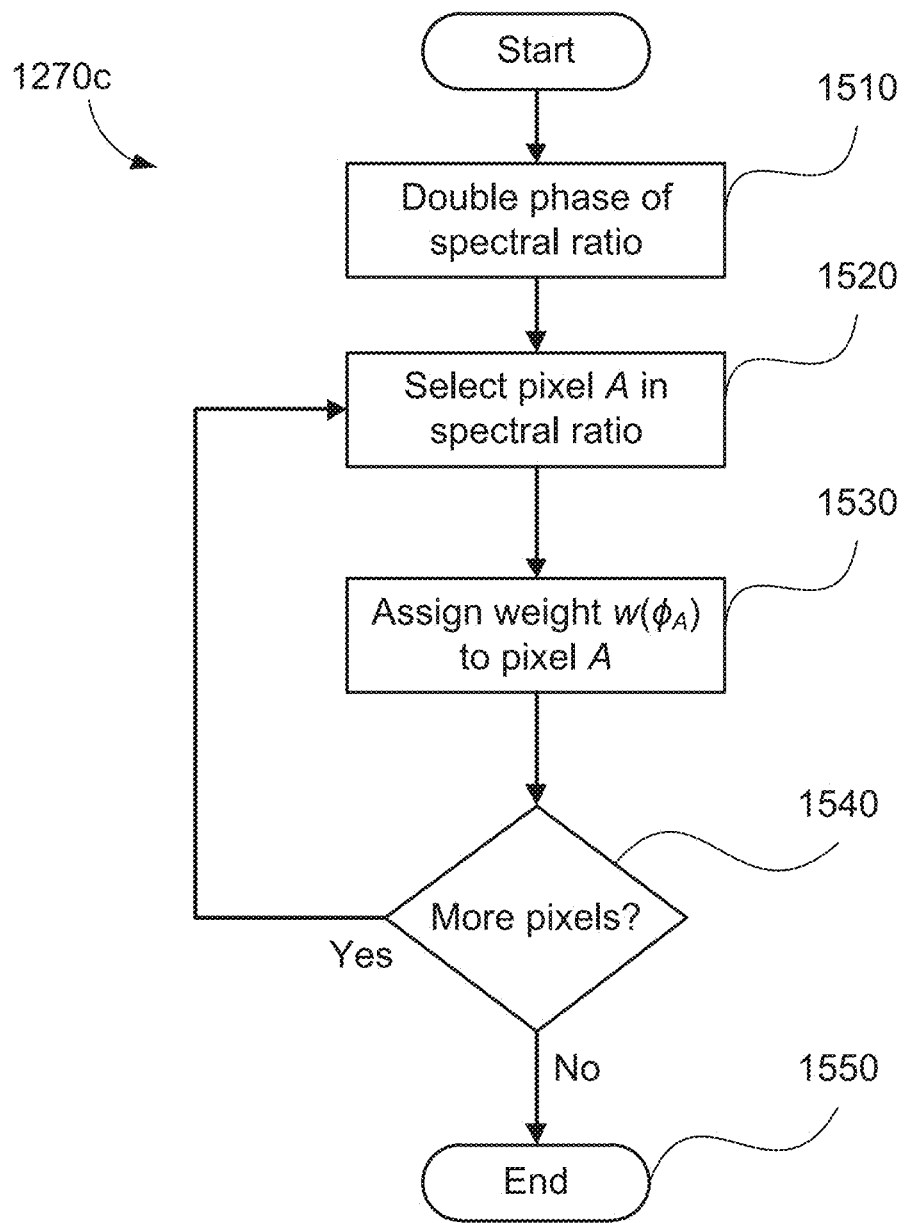
FIG. 15 is a schematic flow diagram illustrating another example of a method of assigning weights to pixels of a spectral ratio as used in the method of FIG. 9 or FIG. 19.

Another implementation 1270*c* of weighting step 1270 will now be described with reference to FIG. 15. The weighting process 1270*b* begins with the spectral ratio calculated in step 1260*a* or 1260*b* as an input.

In a phase doubling step 1510, the phase of every pixel in the spectral ratio is multiplied by 2, without modifying the magnitudes and respecting the wrapping of phase angle within the range $-\pi$ to $+\pi$ radians. For example a phase angle of 3 radians would become 6-$\pi$, or approximately 2.858 radians after this operation. In a variation of the implementation 1270*c* of weighting step 1270, the phase doubling step 1510 is omitted.

In a spectral ratio pixel selection step 1520, a pixel A in the spectral ratio is selected from amongst the pixels not already assigned a weight by the weighting process 1270*c*.

In a weighting step 1530, the pixel A is assigned a weight given by a weighting function $w(\phi_A)$ of the phase $\phi_A$ of the pixel A. An example weighting function is given by $$w(\phi_A) = \left(\frac{\pi - |\phi_A|}{\pi}\right)^k, \qquad (19)$$

where k is a predetermined number. The number k may be 1, or 2, or some other real number. Other weighting functions $w(\phi_A)$ for evaluating to real numbers are possible. Preferably the weighting function $w(\phi_A)$ evaluates to 1 for $\phi_A$=0, to 0 for $\phi_A$=±$\pi$, and to intermediate values for intermediate values of $\phi_A$. In a variation, the weighting function w may also take the phases of pixels other than pixel A as parameters, for example the phases of pixels neighbouring pixel A. In a further variation, the weighting function w may also take the magnitude of the pixel A or other pixels as parameters.

In the pixel decision step 1540 a decision is made on whether there remain any pixels in the spectral ratio that have not yet been selected in the spectral ratio pixel selection step 1520. If there remain pixels that have not yet been selected, the weighting process 1270*c* returns to the pixel selection step 1520. In practice, the pixels may be selected in a systematic order such as by iterating along the rows and down the columns of the spectral ratio patch. If no pixels remain to be selected, the weighting process 1270*c* ends at end step 1550.

6.8 Application to Shift Estimation

Another application of adaptive spectral weighting, namely to the problem of image alignment by shift estimation, will now be described with reference to FIG. 19.

Figure 19:
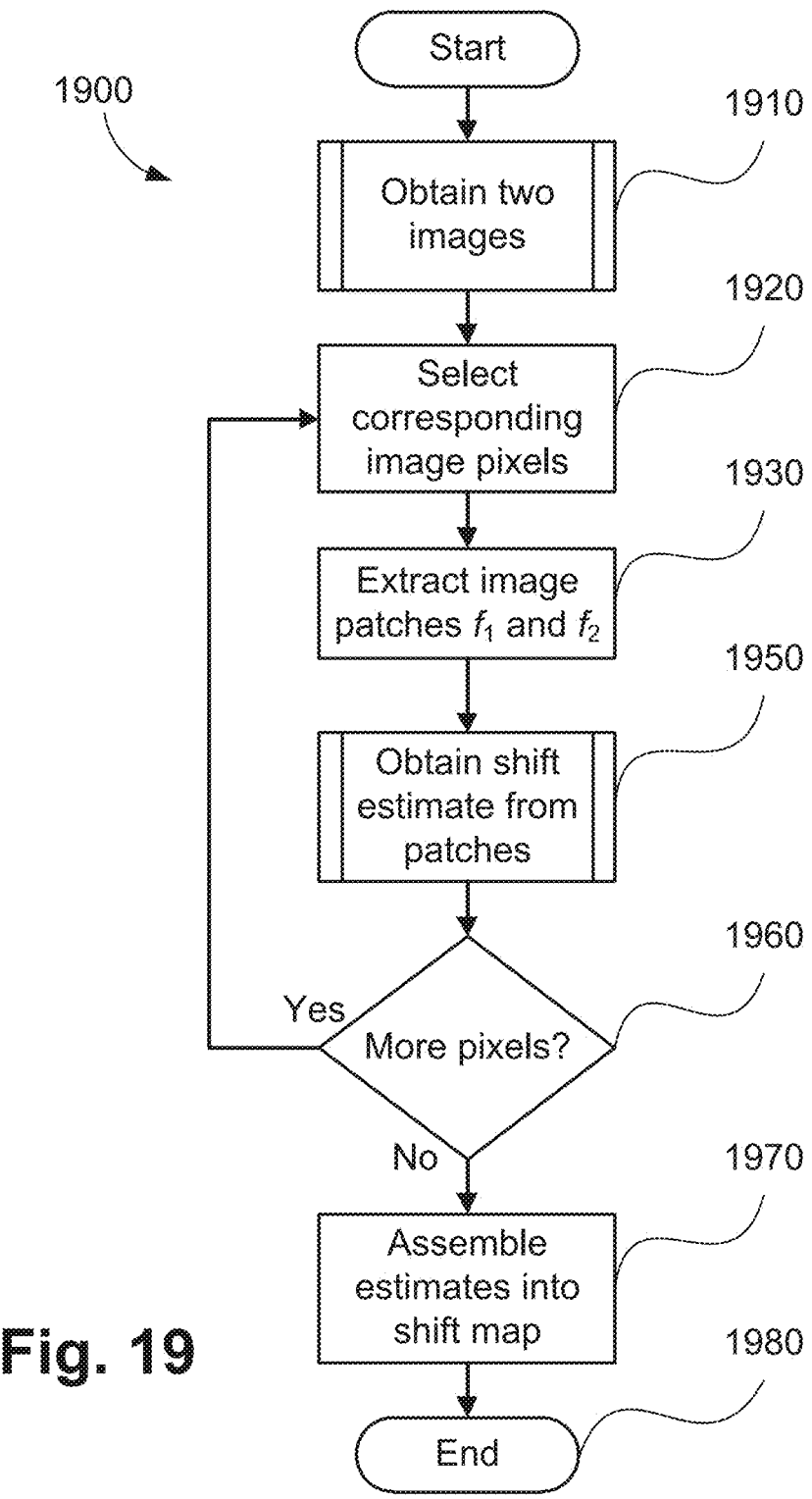
FIG. 19 is a schematic flow diagram illustrating an exemplary method of determining a shift map from two images, according to the present disclosure.

FIG. 19 illustrates a shift estimation process 1900 in which an alignment shift map is determined using a shift estimation method. In an image obtaining step 1910, two images 800 and 810 are obtained. For example, the images 800 and 810 may be of a scene captured by an image capture device 100, such as the camera 1627.

A specific implementation of the image obtaining step 1910 is identical to the process 910 described above with reference to FIG. 10. Typically the images 800 and 810 are captured by the camera 1627 and communicated to and received by the computer 1601 for storage in one or both of the HDD 1610 and memory 1606. Where the process 1900 is performed within the camera 1627, the images 800 and 810 are stored in a memory of the camera 1627 for subsequent processing by an embedded processor thereof.

Steps 1920-1980 of the process 1900 in the present implementation are preferably embodied in and implemented by software, for example stored on the HDD 1610 and executable by the processor 1605 in concert with the memory 1606. In a pixel selection step 1920 which follows the image obtaining step 1910, the corresponding pixels 820 and 830 of the two images 800 and 810 are selected and received by the processor 1605 from the memory 1606. A patch extraction step 1930 then follows in which an image patch $f_1$ 840 is extracted from the first image 800 and a corresponding image patch $f_2$ 850 is extracted from the second image 810 by operation of the processor 1605. The first image patch $f_1$ 840 is defined at least by the location of the first selected pixel 820 in the first image 800. The second image patch $f_2$ 850 is defined at least by the location of the second selected pixel 830 in the second image 810. The first and second selected pixels should lie in a portion of the images representing some common content, perhaps misaligned by some amount.

A shift estimation step 1950 is then performed in which a shift estimate is determined by the processor 1605 processing the pixel data in the first patch $f_1$ 840 and the second patch $f_2$ 850. The shift estimations are typically stored in the memory 1606. The details of an implementation of the shift estimation step 1950 will be described below with reference to FIG. 20.

A pixel decision step 1960 then follows where a decision is made by the processor 1605 on whether there remain any pixels in the first image 800 and the second image 810 that have not yet been selected in the pixel selection step 1920. If there remain pixels that have not yet been selected, the shift estimation process 1900 returns to the pixel selection step 1920. In practice, the pixels may be selected in a systematic order such as by iterating along the rows and down the columns of the first image $f_1$ 800. Accordingly, the steps 1920-1960 proceed for a current patch of all the patches desired to be processed for shift estimation purposes. Each current patch represents a current part of the common content of the images. In some instances, for example the image pair of FIGS. 17A and 17B, because all is common, image patches may span the entirety of the images. In an alternative approach, only a subset of the pixels of the first image $f_1$ 800 may be chosen to be selected, for example by the processor 1605 subsampling the image by selecting only pixels occurring in rows and columns whose pixel coordinate indices are divisible by some integer. In another alternative, a subset of pixels of the first image $f_1$ 800 may be chosen to be selected to avoid any of the resulting patches from covering areas outside the images, thus avoiding any edge effects. In yet another alternative, a subset of pixels of the first image $f_1$ 800 may be chosen to be selected by some other means. Once all required pixels have been selected ('NO' in step 1960), the shift estimation process 1900 continues to an assembly step 1970.

In the assembly step 1970, the shift estimates calculated in the shift estimation step 1950 are assembled by the processor 1605 to produce a shift map of the two obtained images 800 and 810. The shift estimates are desirably assembled into an image such that there is a geometric correspondence between the pixel locations of each pixel selected in the pixel selection step 1920 and the shift estimate calculated from that pixel in the shift estimation step 1950. For example, if the first image 800 is 100×100 pixels and all of the pixels are selected by iterating across rows and down columns, then the consecutive shift estimates can be assembled by placing them into an image 100×100 pixels in size by inserting the shift estimates into successive pixels iterating across rows and down columns. Such reveals a shift map image that may be stored by the processor 1605 in the memory 1606 or HDD 1610. In an alternative implementation the assembly step 1970 may be skipped and the shift estimates stored in the memory 1606 may be passed directly as a stream output of the process 1900 for use as input to other processes that may be executable within the computer 1601.

The shift mapping process 1900 then ends at end step 1980.

Figure 20:
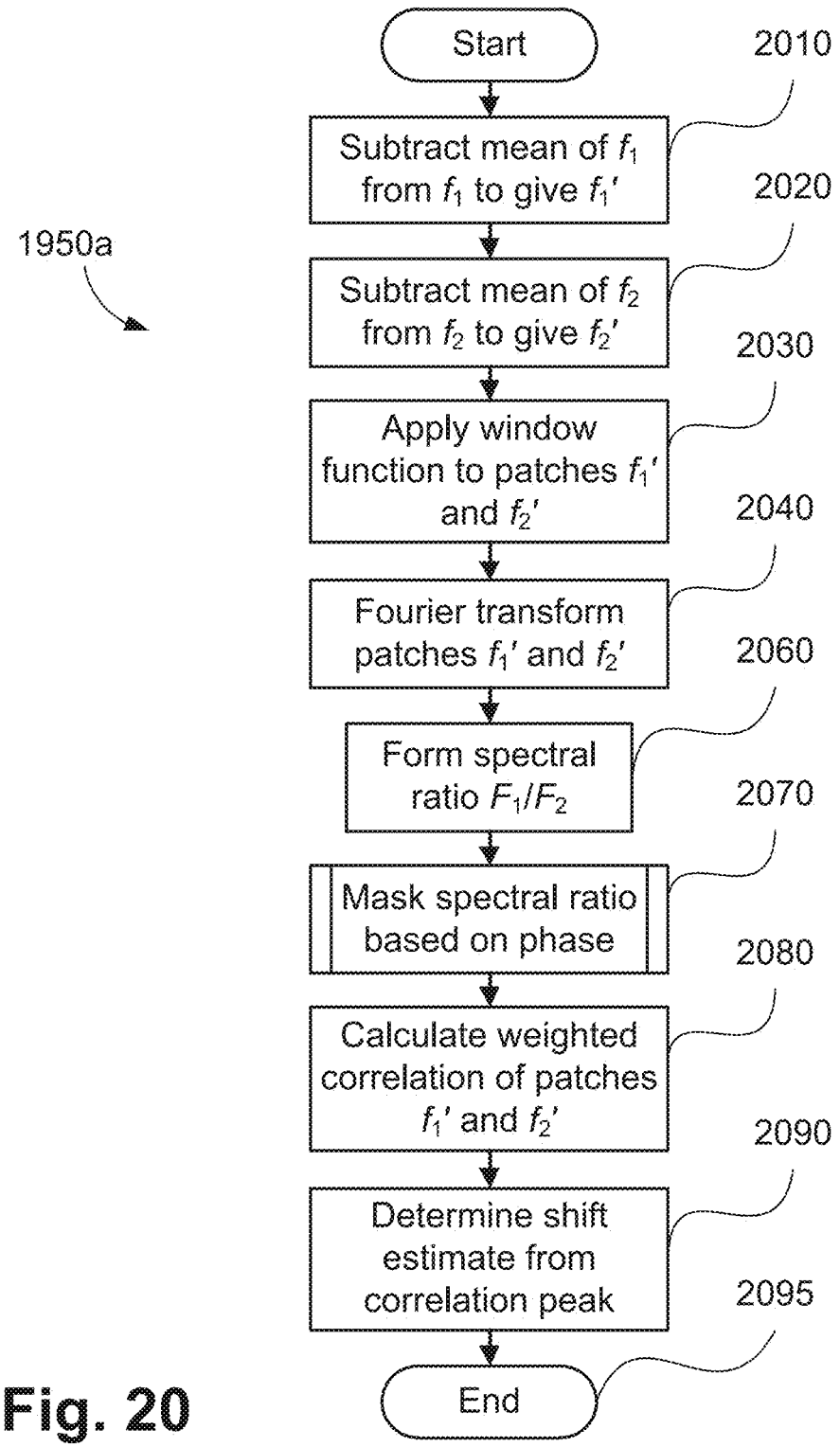
FIG. 20 is a schematic flow diagram illustrating one example of a method of determining a shift estimate from two corresponding patches of two images as used in the method of FIG. 19.

One implementation 1950*a* of the shift estimation step 1950 will now be described with reference to FIG. 20. The shift estimation process 1950*a* begins with the image patch $f_1$ 840 and the image patch $f_2$ 850 as data inputs. In a first zero mean step 2010, the mean value of the pixel values in the first patch $f_1$ is calculated, and this mean value is then subtracted from the pixel values of all of the pixels in the first patch $f_1$. The result of this calculation is a first zero mean patch, designated $f_1'$.

In a second zero mean step 2020, the mean value of the pixel values in the second patch $f_2$ is calculated, and this mean value is then subtracted from the pixel values of all of the pixels in the second patch $f_2$. The result of this calculation is a second zero mean patch, designated $f_2'$.

In a windowing step 2030, the patches $f_1'$ and $f_2'$ are windowed using a window function that falls to zero or some small value near the edges of the patches. Example window functions include Hann windows, Hamming windows, and similar functions known to those skilled in the art.

A Fourier transform step 2040 follows in which the windowed patches $f_1'$ and $f_2'$ are Fourier transformed, for example using a Fast Fourier Transform (FFT) algorithm, to form Fourier transformed image patches $F_1$ and $F_2$ respectively. The Fourier transformed image patches $F_1$ and $F_2$ will contain complex number values at each pixel.

In a spectral ratio step 2060, the Fourier transformed patches $F_1$ and $F_2$ are divided pixel-wise to form the spectral ratio image patch $F_2/F_1$, using complex number division. The DC pixel in the spectral ratio is a special case and is set to unity.

A weighting step 2070 is then performed, where the pixels in the spectral ratio formed from the two image patches 840 and 850 are assigned weights. Thus step 2070 takes as input the current spectral ratio determined from step 2060. The weights are numbers, typically in the range 0 to 1, assigned so that each pixel has its own weight. This results in the formation of a single masked spectral ratio based on the phase. Details of three implementations 1270*a*, 1270*b*, and 1270*c* of weighting step 2070 are described above with reference to FIGS. 13, 14, and 15.

In a correlation step 2080, a cross-correlation of the windowed patches $f_1'$ and $f_2'$ is calculated, taking account of the weights assigned in weighting step 2070. This may be done for example by setting to zero all pixels in the Fourier transformed patches $F_1$ and $F_2$ that correspond with pixels with weight zero in the spectral ratio, then forming the product of the complex conjugate of Fourier transformed patch $F_1$ with Fourier transformed patch $F_2$, then taking the inverse Fourier transform of the resulting product. In an alternative implementation, the cross-correlation may be calculated by forming the product of the complex conjugate of Fourier transformed patch $F_1$ with Fourier transformed patch $F_2$, then setting the magnitude values of this product to the corresponding weight values determined from the phase of the spectral ratio, then taking the inverse Fourier transform of the weighted product, resulting in a masked phase correlation.

In a shift determination step 2090, the cross-correlation calculated in correlation step 2080, is used to determine a shift estimate for the image patches $f_1$ and $f_2$. This can be done by estimating the pixel coordinates of the highest peak in the cross-correlation. The shape of the peak can be used to estimate the pixel coordinates to subpixel accuracy using techniques known in the prior art. The estimated coordinates of the correlation peak relative to the origin of the cross-correlation form the shift estimate.

In a variant of correlation step 2080 and shift determination step 2090, the shift estimate is determined by fitting a planar ramp to the phase of the pixels of the spectral ratio, weighted by the weights assigned in weighting step 2070. Potential wrapping of the phase at increments of $2\pi$ need to be taken into account when fitting a planar ramp to the phase of the pixels of the spectral ratio. Techniques for performing such a fit in the presence of phase wrapping are known in the prior art. The slope of the fitted planar ramp then gives an estimate of the shift, using techniques known in the prior art. This allows the shift estimate to be determined without forming the cross-correlation of the windowed patches $f_1'$ and $f_2'$. The use of the weights based on the phase of the spectral ratio allows the fitting of a planar ramp to be achieved with improved accuracy over the prior art.

The shift estimation process 1950*a* then ends at end step 2095.

6.9 Variations

Many variations of the processes of FIGS. 12, 13, 14, 15, and 22 may be performed. For example, the processes may be applied to different colour channels of the input image patches, thereby calculating multiple depth estimate values for each image patch.

In another variation, multiple depth estimate values may be calculated from each pair of input image patches by using different variations of weighting step 1270.

In a further variation, two or more of the processes of FIGS. 13, 14, 15, and 22 may be performed, simultaneously for example, to give multiple depth estimate values.

In each of these variations, corresponding depth estimates may be obtained from the multiple values and then averaged or combined in some other manner, or selected from using some selection criterion, to give a depth estimate for the patches under consideration.

Many variations of the weighting processes of FIGS. 13, 14, 15, and 22 may be performed.

For example, the weighting process variation 1270*a* and the weighting process variation 1270*b* may be performed, simultaneously for example, and weights assigned to the spectral ratio pixels based on combinations of the separate weights assigned by weighting process variation 1270*a* and weighting process variation 1270*b*. For example, if weighting process variation 1270*a* and weighting process variation 1270*b* both assign weight 1 to a pixel A then assign weight 1 to the pixel A; if weighting process variation 1270*a* and weighting process variation 1270*b* both assign weight 0 to a pixel A then assign weight 0 to the pixel A; and if weighting process variation 1270*a* and weighting process variation 1270*b* assign differing weights to a pixel A then assign weight 0 to the pixel A. In a variation of this arrangement, if weighting process variation 1270*a* and weighting process variation 1270*b* assign differing weights to a pixel A then assign weight 1 to the pixel A. In another variation of this arrangement, if weighting process variation 1270a and weighting process variation 1270b assign differing weights to a pixel A then assign some weight intermediate to 0 and 1 to the pixel A. Similar combinations of weighting processes variations may be performed with any subset of two or more of the weighting process variations 1270a, 1270b, and 1270d.

In a further example variation, a weighting function may be defined as a function of the phase of pixel A and some or all neighbouring pixels B within the neighbourhood of pixel A, rather than just a function of the phase of pixel A.

All of the above variations with respect to calculating depth estimate values may also be applied to the calculation of shift estimate values.

7. Gabor Spectral Ratio 7.1. Sparse Spectral Ratio

Pentland's method required 2D Fourier transforms to compute the spectral ratios at all sampled frequencies. Fourier transforms are costly to implement in hardware, and therefore a spatial-domain implementation is desirable. Instead of using Fourier transforms of local image patches to compute the spectral responses at all sampled frequencies, Gabor filters can be used to extract local spectral responses over a sparse set of tuning frequencies $\omega_t$. A functional form, such as a paraboloid, Gaussian or Bessel function, can then be fitted to the spectral ratios over this sparse set of frequencies. This depth from defocus method using spectral ratios over a sparse set of frequencies is hereafter referred to as the sparse spectral ratio method. Because the Gabor responses can be computed in the spatial domain using a filter bank, the computationally intensive Fourier transform can be avoided.

A Gabor filter is an orientation- and frequency-tuned complex filter, of the form:

$$g(x,y)=2a^2 \cdot \exp(-\pi a^2(x^2+y^2)) \cdot \exp(i\omega_t(x \cdot \cos\theta + y \cdot \sin\theta)) \quad (20)$$

where a is the frequency bandwidth, $\omega_t$ is the tuning radial frequency and $\theta$ is the orientation of the filter. The Gabor filter is a real/imaginary filter pair constructed by windowing a complex sinusoid, $\exp(i\omega_t(x \cdot \cos\theta + y \cdot \sin\theta))$, with a Gaussian function, $\exp(-\pi a^2(x^2+y^2))$. The wider the scale of the Gaussian window, $\sigma=1/(a \cdot \text{sqrt}(2\pi))$, in the spatial domain, the narrower the bandwidth, a, of the filter in the spectral domain. The Gabor filter responds to signals around the tuning frequency $[u_t, v_t]=[\omega_t \cos\theta, \omega_t \sin\theta]$. Due to the finite-size bandwidth, the Gabor filter effectively averages the spectral response in a neighbourhood around the tuning frequency.

The local response of an image f(x, y) to a complex Gabor filter can be seen as an average spectrum around the tuning frequency $\omega_t$, the average spectrum being:

$$\overline{F}(\omega_t) = \int_{\omega \in \mathcal{N}(\omega_t)} w(\omega) F(\omega),$$

where $\mathcal{N}(\omega_t)$ is the neighbourhood around $\omega_t$ and $w(\omega_t)$ is the weight of the local Gaussian bandwidth. If the relative transfer function between two local image spectra $$\frac{F_2}{F_1} = \frac{F_0 \cdot OTF_2}{F_0 \cdot OTF_1} = \frac{OTF_2}{OTF_1}$$

does not vary significantly within this bandwidth, the ratio of the corresponding Gabor responses can be approximated as the spectral ratio at the tuning frequency:

$$\frac{\overline{F_2}(\omega_t)}{\overline{F_1}(\omega_t)} \approx \frac{\int_\omega w F_2}{\int_\omega w F_1} = \frac{\int_\omega w F_0 \cdot OTF_2}{\int_\omega w F_0 \cdot OTF_1} \approx \frac{OTF_2(\omega_t)}{OTF_1(\omega_t)} \quad (21)$$

where $\omega \in N(\omega_t)$

The approximation above generally holds for images under small blur difference because the transfer function is relatively smooth as a function of the spatial frequency $\omega$. The approximation also assumes a small lens aperture, which means that the depth of field is large and the optical transfer function has no zeros for image regions within the depth of field. Under these conditions, the relative transfer function $OTF_2/OTF_1$ changes slowly and hence can be taken out of the average operator in the above equation (21). The Gabor response ratio is then equivalent to the spectral ratio at the tuning frequency. Using a set of frequencies at different orientations and scales, a sparse set of spectral ratios can be obtained.

Figure 23:
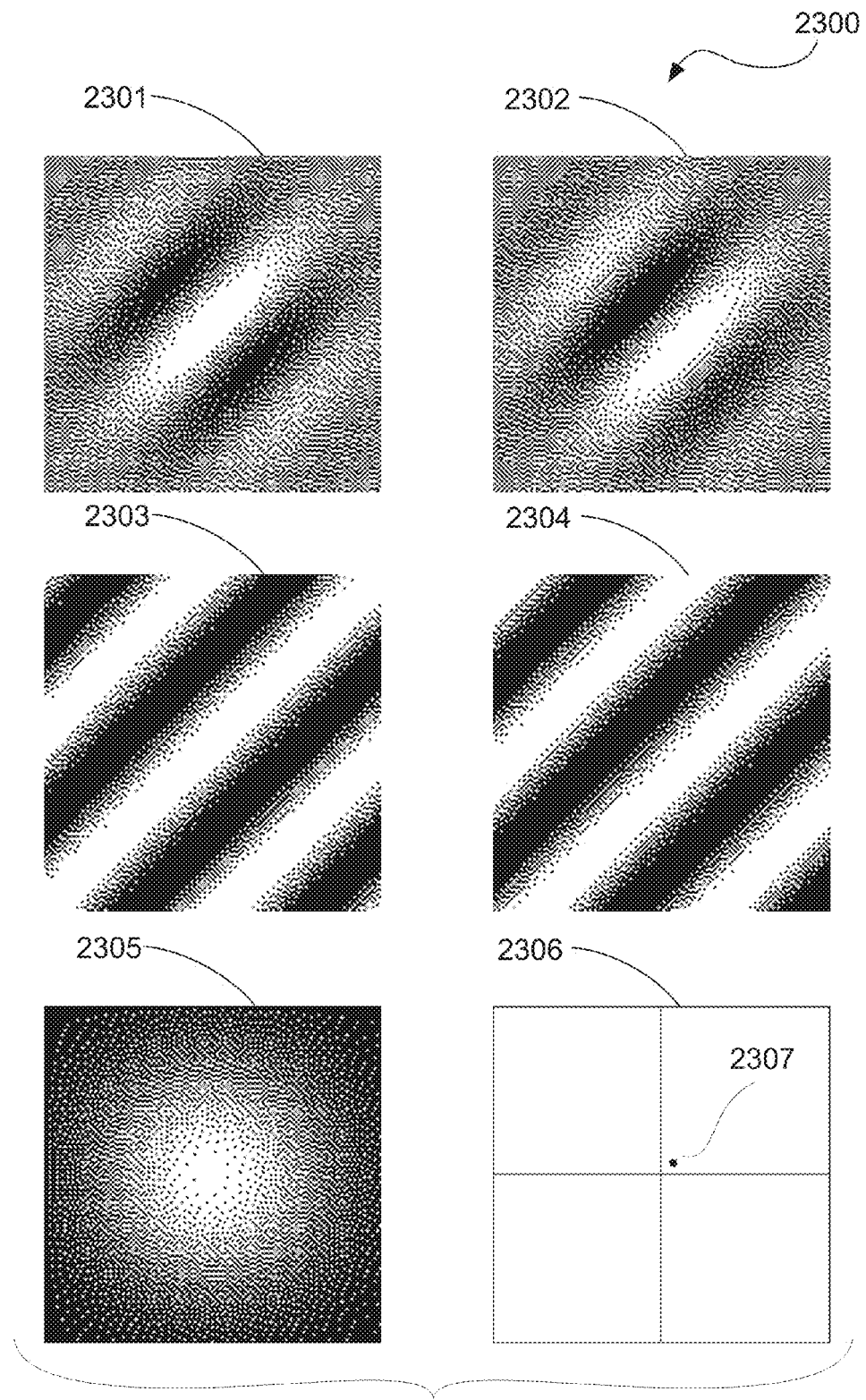
FIG. 23 illustrates an example of constructing a complex Gabor filter from a complex sinusoid and a Gaussian window function.

FIG. 23 illustrates an example of constructing a complex Gabor filter 2300 from a complex sinusoid and a Gaussian windowing function. The complex Gabor filter 2300 comprises a real filter 2301 and an imaginary filter 2302. The real filter 2301 is a pixel-wise product of a real sinusoid pattern 2303 with a Gaussian window function 2305; and the imaginary filter 2302 is a product of an imaginary sinusoid pattern 2304 with the same Gaussian window function 2305. The frequency and orientation of the sinusoidal patterns 2303 and 2304 corresponds to the tuning radial frequency $\omega_t$ and the orientation $\theta$ of the Gabor filter 2300. Due to the low frequency of the sinusoid patterns 2303 and 2304, the Gabor filter 2300 responds to a low-frequency part of the image spectrum only. This low-frequency spectral coverage is represented by a small dot 2307 in the image spectrum 2306. This spectral coverage centres around the tuning frequency of the complex sinusoid 2303 and 2304. The frequency spread (i.e. the bandwidth a) of the spectral coverage 2307 is narrow due to the wide Gaussian window 2305. Because the spatial window 2305 has a Gaussian shape, the shape of the spectral coverage 2307 is also a Gaussian.

The complex Gabor filter 2300 is an instance of a family or plurality of quadrature filters whose spectral response covers a Gaussian bandwidth around the tuning frequency. In general, a quadrature filter is a complex filter whose imaginary part is the Hilbert transform of the real part. In the specific implementations described the quadrature filters operate in the spatial domain. Quadrature filters other than the Gabor filter can be used to obtain different coverage in the spectral domain. Quadrature filters such as log-Gabor filters (i.e. loglets), Gaussian derivative filters, difference-of-Gaussian filters, and Cauchy filters can all be used in the sparse spectral ratio method. Some complex wavelet transforms, such as the dual-tree complex wavelet transform, are also quadrature filters and can therefore be used for spatial-domain depth from defocus using sparse spectral ratios.

7.2. Efficient Gabor Filter Bank

Because each Gabor filter only covers a small spectral window around the tuning frequency, a set of Gabor filters at different radial frequencies and orientations can be used to cover the whole image spectrum. This set of filters is commonly known as a filter bank. A commonly used Gabor filter bank in texture analysis spans over six orientations [0°, 30°, 60°, 90°, 120°, 150°] and four scales [0.05, 0.1, 0.2, 0.4]×$\omega_N$, where $\omega_N$ is the Nyquist radial frequency, which is equal to twice the maximum frequency representable by the sampled image. However, most of these filters are not separable and therefore cannot be implemented efficiently. Filters at low tuning frequencies also have large spatial supports, which require a lot of computation if implemented directly in the spatial domain.

To address the first problem of filter separability, the present inventors configure preferred Gabor filter banks for use according to the present disclosure along four orientations: 0°, 45°, 90° and 135°. The filters along 0° and 90° orientations are separable along the sampling axes x and y:

$$g^{0°}(x, y) = 2a^2 \cdot \exp(-\pi a^2(x^2 + y^2))\exp(i\omega_t(x \cdot \cos 0° + y \cdot \sin 0°)) \quad (22)$$
$$= 2a \cdot \exp(-\pi a^2 x^2) \cdot a \cdot \exp(-\pi a^2 y^2)\exp(i\omega_t x)$$
$$= 2a \cdot \exp(-\pi a^2 x^2) \cdot a \cdot \exp(-\pi a^2 y^2)\cos(\omega_t x) + i \cdot 2a \cdot$$
$$\exp(-\pi a^2 x^2) \cdot a \cdot \exp(-\pi a^2 y^2)\sin(\omega_t x)$$

$$g^{90°}(x, y) = 2a^2 \cdot \exp(-\pi a^2(x^2 + y^2)) \cdot \exp(i\omega_t(x \cdot \cos 90° + y \cdot \sin 90°)) \quad (23)$$
$$= a \cdot \exp(-\pi a^2 x^2) \cdot 2a \cdot \exp(-\pi a^2 y^2) \cdot \exp(i\omega_t y)$$
$$= a \cdot \exp(-\pi a^2 x^2) \cdot 2a \cdot \exp(-\pi a^2 y^2)\cos(\omega_t y) + i \cdot a \cdot$$
$$\exp(-\pi a^2 x^2) \cdot 2a \cdot \exp(-\pi a^2 y^2)\sin(\omega_t y)$$

Figure 24A:
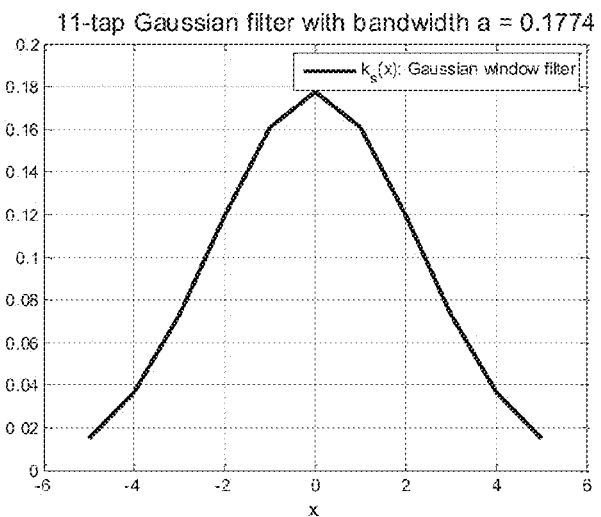
FIGS. 24A, 24B and 24C illustrate one-dimensional Gaussian and Gabor filters used in a separable implementation of the two-dimensional Gabor filters used in the present disclosure.
Figure 24B:
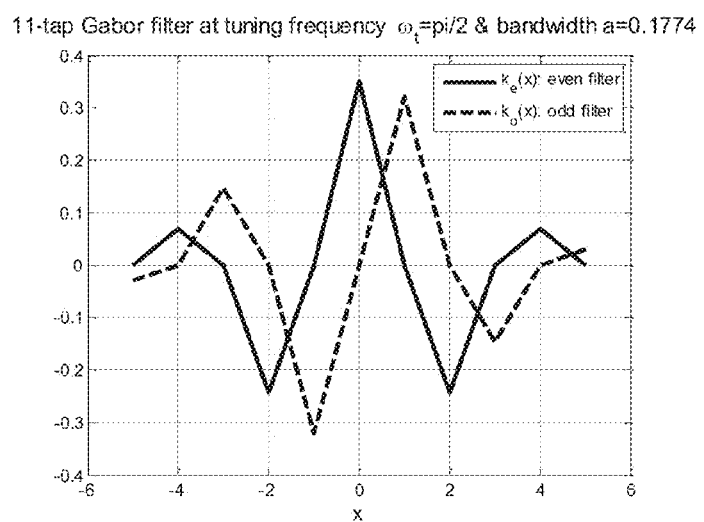

A Gabor filter at the highest tuning frequency of $\omega_t = \pi/2$ radian is configured with a bandwidth of $a = (12\sqrt{\ln 2/\pi})^{-1} \approx 0.1774$, which corresponds to a Gaussian smoothing scale of $\sigma = (6\sqrt{2\ln 2})/\pi \approx 2.2487$ pixels. Using eleven taps at location offsets $x = [-5 \ -4 \ -3 \ -2 \ -1 \ 0 \ 1 \ 2 \ 3 \ 4 \ 5]$ and $y = [-5 \ -4 \ -3 \ -2 \ -1 \ 0 \ 1 \ 2 \ 3 \ 4 \ 5]^T$ pixels, the component 1D filters are:

$$k_s(x) = a \cdot \exp(-\pi a^2 x^2) = [.0150 \ .0365 \ .0729 \ .1195 \ .1607 \ .1774 \ .1607 \ .1195 \ .0729 \ .0365 \ .0150] \quad (24)$$
$$k_e(x) = 2k_s(x)\cos(\omega_t x) \approx [0 \ .0684 \ 0 \ -.2435 \ 0 \ .3502 \ 0 \ -.2435 \ 0 \ .0684 \ 0]$$
$$k_o(x) = 2k_s(x)\sin(\omega_t x) = [-.0300 \ 0 \ .1457 \ 0 \ -.3214 \ 0 \ .3214 \ 0 \ -0.1457 \ 0 \ .0300]$$

where $k_s(x)$ is the Gaussian smoothing filter as shown in FIG. 24A, $k_e(x)$ and $k_o(x)$ are the even and odd Gabor filter as shown in FIG. 24B. Note that a fixed offset (0.0046) has been subtracted from the non-zero taps of the even Gabor filter $k_e(x)$ so that the filter taps sum up to zero. This zero-mean filter is highly desirable so that the Gabor filter is invariant to different DC levels in the image. Using these 1D filters, the 2D Gabor filters at the highest tuning frequency $\omega_t = \pi/2$ along 0° and 90° can be rewritten as:

$$g^{0°}(x,y) = k_e(x) \cdot k_s(y) + i \cdot k_o(x) \cdot k_s(y) \quad (25)$$

$$g^{90°}(x,y) = k_s(x) \cdot k_e(y) + i \cdot k_s(x) \cdot k_o(y) \quad (26)$$

Note that the real part of the Gabor filter is even due to the cosine term $k_e$, and the imaginary part of the Gabor filter is odd due to the sine term $k_o$. As a result, a complex Gabor filter is sometimes referred to as an even/odd Gabor filter pair.

Figure 24C:
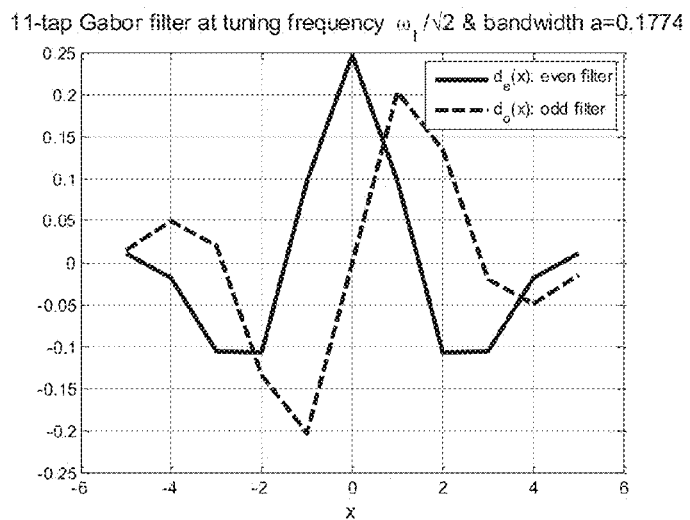

The 2D Gabor filters along the 45° and 135° orientations can be implemented as a linear combination of two 2D separable filters:

$$g^{45°}(x,y) = \{d_e(x) \cdot d_e(y) + d_o(x) \cdot d_o(y)\} + i \cdot \{d_o(x) \cdot d_e(y) + d_e(x) \cdot d_o(y)\} \quad (27)$$

$$g^{135°}(x,y) = \{d_e(x) \cdot d_e(y) - d_o(x) \cdot d_o(y)\} + i \cdot \{d_o(x) \cdot d_e(y) - d_e(x) \cdot d_o(y)\} \quad (28)$$

where $d_e(x)$ and $d_o(x)$ are an even/odd Gabor filter pair at tuning frequency $\omega_t/\sqrt{2}$ radians with the same bandwidth $a = 0.1774$ as shown in FIG. 24C. Similarly, the even Gabor filter has been offset to be zero-mean:

$$d_e(x) = \sqrt{2}\exp(-\pi a^2 x^2)\cos(\omega_t/\sqrt{2}\,x) \approx [.0113 \ -.0183 \ -.1057 \ -.1069 \ .0964 \ .2464 \ .0964 \ -.1069 \ -.1057 \ -.0183 \ .0113] \quad (29)$$
$$d_o(x) = \sqrt{2}\exp(-\pi a^2 x^2)\sin(\omega_t/\sqrt{2}\,x) = [.0141 \ .0497 \ .0195 \ -.1344 \ -.2036 \ 0 \ .2036 \ .1344 \ -.0195 \ -.0497 \ -.0141]$$

To address the second problem of large spatial supports for low tuning frequency filters, the set of 11×11 separable Gabor filters is applied at the highest tuning frequency to a set of down-sampled images. This approach follows the fact that filtering a properly down-sampled image with a high tuning-frequency Gabor filter produces similar responses as filtering the original input image with a low tuning-frequency Gabor filter. The Gabor response image will be at a down-sampled resolution, but the Gabor response image can be up-sampled to the original input resolution with little information loss if the input image is properly down-sampled in the first place (i.e. the input image should be sufficiently blurred before subsampling to reduce aliasing). Filtering a down-sampled image by a small filter is very efficient due to two reasons. First, the filter is small (an 11×11 separable filter), so the filtering can be performed faster. Second, the down-sampled image is also smaller than the original input image, and thus can be filtered in less time.

If the down-sampled images are generated from the input image by successive halving, the effective tuning frequencies of the Gabor filter bank are also halved successively starting from the highest tuning radial frequency $\omega_t = \pi/2$ radian. The successively halved images form a dyadic image pyramid.

Using four pyramid levels leads to four successively halved tuning radial frequencies $\omega_t = [\pi/2 \ \pi/4 \ \pi/8 \ \pi/16]$ radian. The bandwidths of these effective filters are proportional to the tuning radial frequency, which also form a power series:

$$a = [(12\sqrt{\ln 2/\pi})^{-1}(24\sqrt{\ln 2/\pi})^{-1}(48\sqrt{\ln 2/\pi})^{-1}(96\sqrt{\ln 2/\pi})^{-1}].$$

Figure 25:
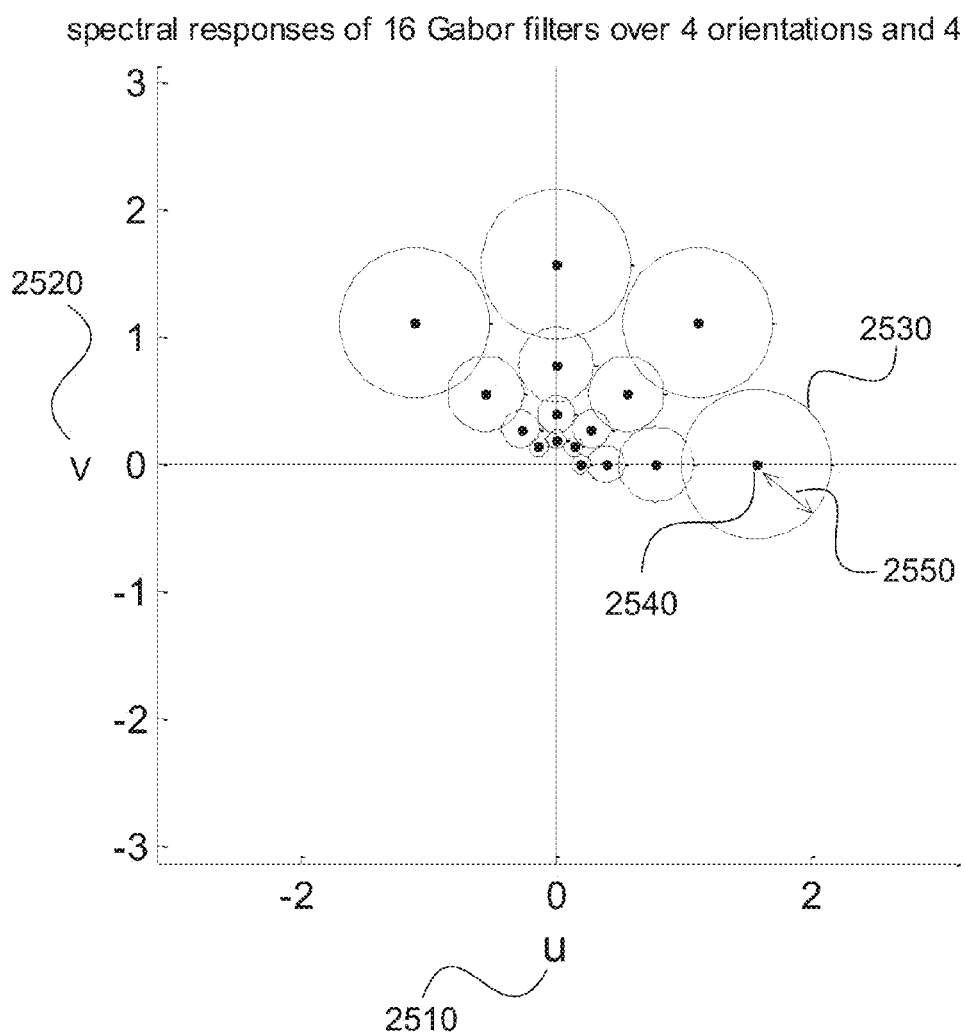
FIG. 25 illustrates the spectral coverage of the 16 two-dimensional Gabor filters used in the present disclosure.

The Gabor filter bank over four orientations and four tuning radial frequencies, hereafter called 4×4 Gabor filter bank, produces 16 Gabor responses per pixel. The spectral coverage of these 16 Gabor filters are shown as 16 circular regions in FIG. 25. The coordinates of FIG. 25 are the two spatial frequency coordinates u, 2510, and v, 2520, with dimensions indicated in radians. The region 2530 represents the spectral coverage of the Gabor filter at a tuning radial frequency $\omega_t = \pi/2$ and orientation 0°. The spectral coverage of this Gabor filter centres around the tuning frequency 2540 and has a bandwidth 2550 of $a = 0.1774$ radians. Together, these 16 Gabor filters cover a substantial part of the upper half of the image spectrum. The very high frequency spectrum beyond the coverage 2530 of the predetermined highest tuning frequency filter, seen at frequency 2540, usually has very low signal strength and is often dominated by noise. Because of this good coverage of the image spectrum, the 4×4 Gabor filter bank captures the majority of the available signal content for further analysis.

The 4×4 Gabor filter bank, having the spectral coverage illustrated in FIG. 25, is not the only possible arrangement of the tuning frequencies. Other choices of tuning orientations and radial frequencies can be used. A common design rule is to have equally-spaced orientations and exponentially-spaced radial frequencies with proportional bandwidths so that altogether these tuning frequencies cover the whole image spectrum. For example, 6 orientations [0°, 30°, 60°, 90°, 120°, 150°] and five scales [0.025, 0.05, 0.1, 0.2, 0.4]× $\omega_N$, where $\omega_N$ is the Nyquist radial frequency, can be used. For efficiency, the 2D Gabor filter at any orientation θ can be implemented as a sum of two separable filters:

$$\begin{aligned}
\text{real}(g(x, y)) &= 2a^2 \cdot \exp(-\pi a^2(x^2 + y^2)) \cdot \cos(\omega_t(x \cdot \cos\theta + y \cdot \sin\theta)) \quad (30) \\
&= \exp(-\pi a^2(x^2 + y^2)) \cdot [\cos(\omega_t \cdot x \cdot \cos\theta) \cdot \cos(\omega_t \cdot y \cdot \sin\theta) - \sin(\omega_t \cdot x \cdot \cos\theta) \cdot \sin(\omega_t \cdot y \cdot \sin\theta)] \\
&= \exp(-\pi a^2 x^2) \cdot \cos(\omega_t \cdot x \cdot \cos\theta) \cdot \exp(-\pi a^2 y^2) \cdot \cos(\omega_t \cdot y \cdot \sin\theta) - \\
&\quad \exp(-\pi a^2 x^2) \cdot \sin(\omega_t \cdot x \cdot \cos\theta) \cdot \exp(-\pi a^2 y^2) \cdot \sin(\omega_t \cdot y \cdot \sin\theta) \\
&= h_{e1}(x) \cdot h_{e2}(y) - h_{o1}(x) \cdot h_{o2}(y) \\[6pt]
\text{imag}(g(x, y)) &= 2a^2 \cdot \exp(-\pi a^2(x^2 + y^2)) \cdot \sin(\omega_t(x \cdot \cos\theta + y \cdot \sin\theta)) \\
&= \exp(-\pi a^2(x^2 + y^2)) \cdot [\sin(\omega_t \cdot x \cdot \cos\theta) \cdot \cos(\omega_t \cdot y \cdot \sin\theta) + \cos(\omega_t \cdot x \cdot \cos\theta) \cdot \sin(\omega_t \cdot y \cdot \sin\theta)] \\
&= \exp(-\pi a^2 x^2) \cdot \sin(\omega_t \cdot x \cdot \cos\theta) \cdot \exp(-\pi a^2 y^2) \cdot \cos(\omega_t \cdot y \cdot \sin\theta) + \exp(-\pi a^2 x^2) \cdot \cos(\omega_t \cdot x \cdot \cos\theta) \cdot \exp(-\pi a^2 y^2) \cdot \sin(\omega_t \cdot y \cdot \sin\theta) \\
&= h_{o1}(x) \cdot h_{e2}(y) - h_{e1}(x) \cdot h_{o2}(y)
\end{aligned}$$

where $$\begin{aligned}
h_{e1}(x) &= \exp(-\pi a^2 x^2) \cdot \cos(\omega_t \cdot x \cdot \cos\theta), \quad (31) \\
h_{o1}(x) &= \exp(-\pi a^2 x^2) \cdot \sin(\omega_t \cdot x \cdot \cos\theta), \\
h_{e2}(x) &= \exp(-\pi a^2 x^2) \cdot \cos(\omega_t \cdot x \cdot \sin\theta), \text{ and} \\
h_{o2}(x) &= \exp(-\pi a^2 x^2) \cdot \sin(\omega_t \cdot x \cdot \sin\theta)
\end{aligned}$$

are each 1D Gabor filters.

7.3. Temporal Phase Check

Similar to the spectral ratio method in the Fourier domain discussed in section 4.4 above, the phase of the sparse spectral ratios can be used as a measure of Signal-to-Noise Ratio (SNR). Under an ideal situation of no noise, two aligned images produce coherent-phase Gabor responses. The sparse spectral ratio of the Gabor responses will have zero-phase and the complex ratio is therefore equivalent to the ratio of the spectral response magnitudes as used in Pentland's method. In practice, noise is always present. Depending on the SNR, the phases of the measured Gabor responses between two input images may change slightly (for high SNR as shown in FIGS. 6A-6B) or significantly (for low SNR as shown in FIGS. 7A-7B). While high SNR only introduces a small deviation in the spectral ratio, low SNR destroys both the magnitude and the zero-phase property of the spectral ratio. To address this problem, it is possible to mask out the sparse spectral ratios at those frequencies whose absolute phase of the spectral ratio is greater than some threshold ϵ (e.g. ϵ=0.2 radian or 11.45°). This temporal phase check (i.e. the phase comparison between images) prevents the spectral ratios with low-SNR Gabor responses from corrupting a later step of functional fitting, which maps raw spectral ratios to a depth measurement.

Figure 26:
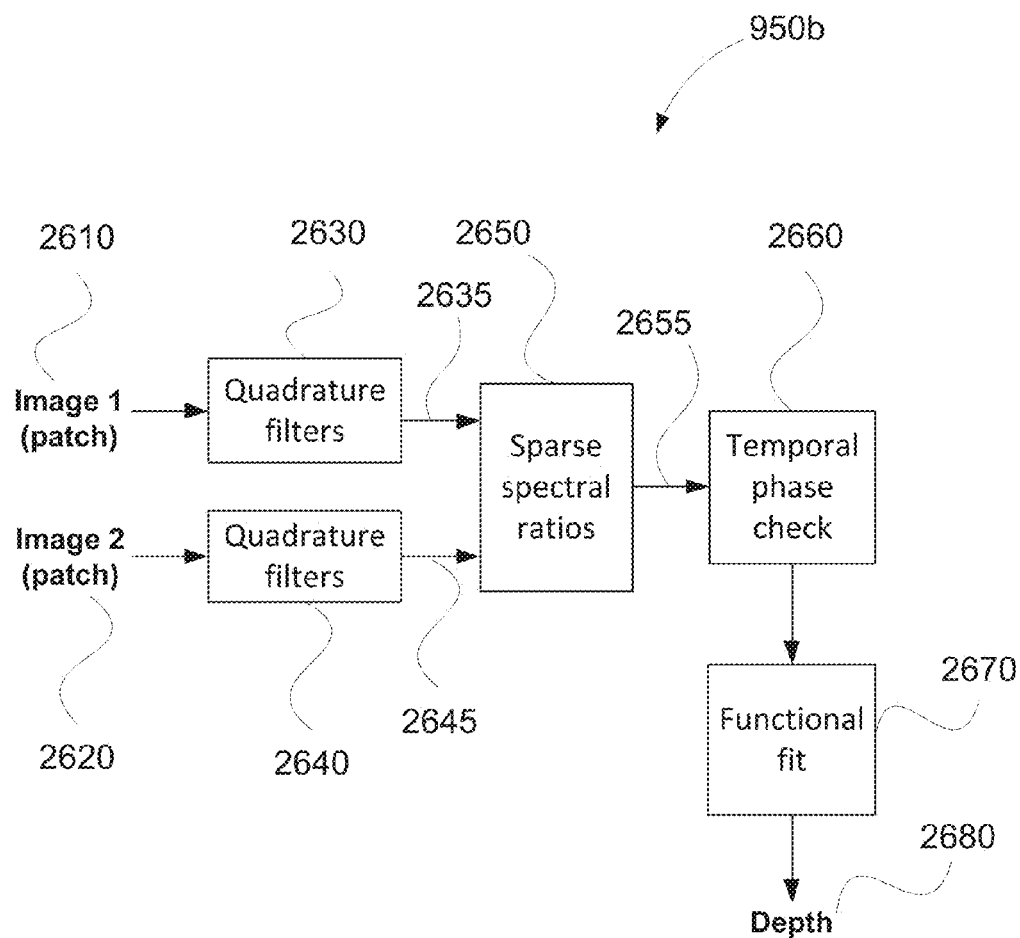
FIG. 26 is a schematic flow diagram illustrating a spatial-domain method of determining a depth measurement from two corresponding patches of two images, according to the present disclosure.

A spatial-domain implementation 950b of the depth estimation step 950, but based on sparse spectral ratios, will now be described with reference to FIG. 26. The sparse spectral ratio method requires two input images or image patches, 2610 and 2620. The images 2610, 2620 were ideally captured under slightly different camera parameters such as bracketed focus or aperture. Each input image 2610, 2620 is then filtered using an respective set of quadrature filters 2630 and 2640, the actual filter sets 2630, 2640 being identical. Each set of quadrature filters comprises a plurality of different quadrature filters configured to operate in the spatial domain with at least one of radial frequency, orientation and bandwidth varying across the plurality of quadrature filters. In preferred implementations at least both of orientation and radial frequency are varied. The quadrature filter sets 2630, 2640 each produce a set of complex responses 2635, 2645 per pixel in the input images. The complex responses from the same quadrature filter pair are provided to a calculate sparse spectral ratio process 2650 to derive a set of sparse spectral ratios 2655. The phases of these sparse spectral ratios 2655 are compared against a threshold in a temporal phase check step 2660. The threshold can be a pre-determined threshold or an adaptive threshold based on properties of the images, for example SNR. If a temporal phase difference modulo 2π is smaller than the threshold, the corresponding spectral ratio has high SNR and is used in a functional fit step 2670. If the temporal phase difference modulo 2π is larger than the threshold, the corresponding spectral ratio has low SNR and is not be used in the functional fit. The use of a threshold provides for a binary weighting (0 or 1) to the complex responses of the quadrature filters. Alternatively, a weight may be assigned to each of the sparse spectral ratios based on how close the temporal phase difference is to 0 (the closer to 0, the higher the weight, and vice versa). The phase doubling followed by phase wrapping by 2π, as used in step 1310, can be optionally applied to the temporal phase difference before determining the weight. The functional fit in step 2670 maps a set of sparse spectral ratios to a single depth measurement 2680.

In one implementation, the quadrature filters 2630 and 2640 come from a Gabor filter bank over four tuning radial frequencies $\omega_t$=[π/2 π/4 π/8 π/16] radian and four orientations θ=[0°, 45°, 90°, 135°]. The functional fit 2670 is a paraboloid fit over the magnitude of the high SNR spectral ratios as selected by the temporal phase check step 2660 representing a combination of the weighted complex responses of the image patches. The depth 2680 is derived from the curvature of the fitted paraboloid.

Similar to the Fourier-domain implementation of the spectral ratio method, the shift between the two local image (patches) 2610 and 2620 can be estimated by fitting a planar ramp to the phase of the sparse spectral ratios. The weight determined during the temporal phase check step 2660 can be used to reduce the contribution of low-SNR spectral ratios in the planar phase fit. Potential wrapping of the phase at increments of 2π needs to be taken into account when fitting a planar ramp to the phases of the sparse spectral ratios. Techniques for performing such a fit in the presence of phase wrapping are known in the art. The slope of the fitted planar ramp then gives an estimate of the shift, using techniques known in the art. This allows the shift estimate to be determined without a need to form the cross-correlation of the image patches 2610 and 2620. The use of the weights based on the phases of the sparse spectral ratios allows the fitting of a planar ramp to be achieved with improved accuracy over prior art approaches.

Returning to FIG. 12, the previously described steps 1260a and 1260b of forming the spectral ratios may alternatively be implemented using one of more sets of quadrature filters, such as those discussed above. Such a modification provides for the method of FIG. 12 to calculate an output set of pixel values, essentially a spectral ratio, from a combined complex response of the image patches to the set of quadrature filters, each pixel value in the output set of pixel values having a magnitude and a phase, for example as depicted in FIGS. 6 and 7. The set of pixel values (spectral ratio) may then be provided to step 1270 for processing as described above. The remaining steps of FIG. 12 may then be performed to determine a depth measurement.

8. Summary

The process 900 and the various alternatives by which the process 900 may be implemented results in a depth map image or a stream of depth map values that offer utility in manners known widely in the art but which has been obtained via the process 900 in a significantly more efficient or accurate manner compared to prior processes.

The process 1900 and the various alternatives by which the process 1900 may be implemented results in a shift map image or a stream of shift map values that offer utility in manners known widely in the art but which has been obtained via the process 1900 in a significantly more efficient or accurate manner compared to prior processes.

Both the processes 900 and 1900 gain these improvements in efficiency or accuracy by the use of a weighting system based on the phase values of the spectral ratio.

INDUSTRIAL APPLICABILITY

The arrangements described are applicable to the computer and data processing industries and particularly for the formation of depth map data from images captured using cameras and like capture devices.

The foregoing describes only some embodiments of the present invention, and modifications and/or changes can be made thereto without departing from the scope and spirit of the invention, the embodiments being illustrative and not restrictive.

The invention claimed is:

1. A method of determining a depth measurement of a scene, the method comprising:
    capturing at least two images of the scene with different camera parameters;
    selecting corresponding image patches in each scene;
    calculating a plurality of complex responses for each image patch using a plurality of different quadrature filters, each said complex response having a magnitude and a phase,
    assigning, for each quadrature filter, a weighting to the complex responses in the corresponding image patches, said weighting being determined by a relationship of the phases of the complex responses; and
    determining the depth measurement of the scene from a combination of the weighted complex responses.

2. A method according to claim 1, wherein the different quadrature filters are configured to operate in the spatial domain and at least one of radial frequency, orientation and bandwidth vary across the plurality of quadrature filters.

3. A method according to claim 2, wherein the quadrature filters are Gabor filters, each with orientation one of 0°, 45°, 90°, 135°, implemented separably using one-dimensional filters.

4. A method according to claim 1, where in the quadrature filters are one of log-Gabor filters, Gaussian derivative filters, difference-of-Gaussian filters, or Cauchy filters.

5. A method according to claim 1, where in the quadrature filters are the filters used in a complex wavelet transform such as the dual-tree complex wavelet transform.

6. A method according to claim 1, wherein the weighting for each pixel is assigned to be the value of a function of the phase of the pixel value.

7. A method according to claim 1, wherein the depth measurement is determined from the weighted pixel values by performing a weighted fit to a functional form with a free parameter, and the depth measurement is determined by the fitted value of the free parameter.

8. A method according to claim 7, wherein the functional form approximates the weighted pixel values of the combined function.

9. A method according to claim 1, wherein the phase of each spectral ratio is multiplied by 2 and wrapped, with this multiplied and wrapped phase then being used to determine the weightings.

10. A method according to claim 1, wherein a confidence measure of the depth measurement is also calculated from the weighted pixel values of the combined function.

11. A method of determining a shift estimation between two images comprising the steps of:
    selecting corresponding image patches in each image;
    calculating an output set of pixel values from a combined complex response of the image patches to a set of quadrature filters, each said pixel value in the output set of pixel values having a magnitude and a phase;
    assigning a weighting to each of the pixel values in the output set of pixel values, said weighting being determined by the phase of at least some of the output set of pixel values and at least some of the pixel values being assigned a weighting different to the weighting assigned to other pixel values; and
    determining the shift estimation between the two images from the weighted pixel values of the combined function.

12. A method according to claim 11, wherein the shift estimate is calculated by forming a weighted phase correlation.

13. A method according to claim 11, wherein the shift estimate is calculated by fitting a planar ramp to the phase of the pixels of the spectral ratio.

14. A non-transitory computer readable storage medium having a program recorded thereon, the program being executable by computerized apparatus to determine a depth measurement of a scene, the program comprising:
    code for capturing at least two images of the scene with different camera parameters;
    code for selecting corresponding image patches in each scene;
    code for calculating a plurality of complex responses for each image patch using a plurality of quadrature filters, each said complex response having a magnitude and a phase, with at least one of radial frequency, orientation and bandwidth varying across the plurality of quadrature filters;
    code for assigning, for each quadrature filter, a weighting to the complex responses in the corresponding image patches, said weighting being determined by a relationship of the phases of the complex responses; and
    code for determining the depth measurement of the scene from a combination of the weighted complex responses.

15. A non-transitory computer readable storage medium having a program recorded thereon, the program being executable by computerized apparatus to determine a shift estimation between two images, the program comprising:
    code for capturing at least two images of the scene with different camera parameters;
    code for selecting corresponding image patches in each scene;
    code for calculating a plurality of complex responses for each image patch using a plurality of quadrature filters, each said complex response having a magnitude and a phase, and at least one of radial frequency, orientation and bandwidth varying across the plurality of quadrature filters;

code for assigning, for each quadrature filter, a weighting to the complex responses in the corresponding image patches, said weighting being determined by a relationship of the phases of the complex responses; and code for determining the depth measurement of the scene and the shift estimation between the two images of the scene from a weighted combination of the complex responses.

16. A method of determining a depth measurement of a scene comprising the steps of:

capturing at least two images of the scene with different camera parameters;

selecting corresponding image patches in each scene;

calculating an output set of pixel values from a combined complex-valued function of Fourier transforms of the image patches, each said pixel value in the output set of pixel values having a magnitude and a phase;

assigning a weighting to each of the pixel values in the output set of pixel values, said weighting being determined by the phase of at least some of the output set of pixel values and at least some of the pixel values being assigned a weighting different to the weighting assigned to other pixel values; and determining the depth measurement of the scene from the weighted pixel values of the combined function.

17. A method according to claim 16, wherein the weighting for each pixel is assigned to be the value of a function of the phase of the pixel value.

18. A method according to claim 16, wherein each pixel is defined to have a set of neighbouring pixels and the weighting for each pixel is assigned to be the value of a function of the phase of the pixel values and of the phases of the neighbouring pixel values.

19. A method according to claim 16, wherein the depth measurement is determined from the weighted pixel values by performing a weighted fit to a functional form with a free parameter, and the depth measurement is determined by the fitted value of the free parameter.

20. A method according to claim 19, wherein the functional form approximates the weighted pixel values of the combined function.

21. A method according to claim 16, wherein the phase of each pixel value is multiplied by 2 and wrapped, with this multiplied and wrapped phase then being used to determine the weightings.

22. A method according to claim 16, wherein a confidence measure of the depth measurement is also calculated from the weighted pixel values of the combined function.

23. A method of determining a shift estimation between two images comprising the steps of:

selecting corresponding image patches in each image;

calculating an output set of pixel values from a combined complex-valued function of Fourier transforms of the image patches, each said pixel value in the output set of pixel values having a magnitude and a phase;

assigning a weighting to each of the pixel values in the output set of pixel values, said weighting being determined by the phase of at least some of the output set of pixel values and at least some of the pixel values being assigned a weighting different to the weighting assigned to other pixel values; and determining the shift estimation between the two images from the weighted pixel values of the combined function.

24. A method according to claim 23, wherein the shift estimate is calculated by forming a weighted phase correlation.

25. A method according to claim 23, wherein the shift estimate is calculated by fitting a planar ramp to the phase of the pixels of the spectral ratio.

26. A non-transitory computer readable storage medium having a program recorded thereon, the program being executable by computerized apparatus to determine a depth measurement of a scene, the program comprising:

code for obtaining at least two images of the scene captured with different camera parameters;

code for selecting corresponding image patches in each scene;

code for calculating an output set of pixel values from a combined complex-valued function of Fourier transforms of the image patches, each said pixel value in the output set of pixel values having a magnitude and a phase;

code for assigning a weighting to each of the pixel values in the output set of pixel values, said weighting being determined by the phase of at least some of the output set of pixel values and at least some of the pixel values being assigned a weighting different to the weighting assigned to other pixel values; and code for determining the depth measurement of the scene from the weighted pixel values of the combined function.

27. A non-transitory computer readable storage medium having a program recorded thereon, the program being executable by computerized apparatus to determine a shift estimation between two images, the program comprising:

code for selecting corresponding image patches in each image;

code for calculating an output set of pixel values from a combined complex-valued function of Fourier transforms of the image patches, each said pixel value in the output set of pixel values having a magnitude and a phase;

code for assigning a weighting to each of the pixel values in the output set of pixel values, said weighting being determined by the phase of at least some of the output set of pixel values and at least some of the pixel values being assigned a weighting different to the weighting assigned to other pixel values; and code for determining the shift estimation between the two images from the weighted pixel values of the combined function.

* * * * *